(12) United States Patent
Hatano et al.

(10) Patent No.: US 6,480,670 B1
(45) Date of Patent: Nov. 12, 2002

(54) VIDEO SIGNAL ENCODING METHOD AND SYSTEM

(75) Inventors: Yoshiko Hatano, Nagaokakyo (JP); Tadashi Kasezawa, Nagaokakyo (JP); Koji Okazaki, Nagaokakyo (JP); Takashi Shinohara, Nagaokakyo (JP); Hiromu Hasegawa, Nagaokakyo (JP); Hidetoshi Mishima, Nagaokakyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/449,494

(22) Filed: Nov. 29, 1999

Related U.S. Application Data

(62) Division of application No. 08/948,589, filed on Oct. 10, 1997, now Pat. No. 6,091,460, which is a continuation of application No. 08/415,474, filed on Mar. 31, 1995, now abandoned.

(30) Foreign Application Priority Data

| Nov. 24, 1994 | (JP) | 6-87894 |
| Nov. 24, 1994 | (JP) | 6-87895 |
| Nov. 24, 1994 | (JP) | 6-174469 |
| Nov. 24, 1994 | (JP) | 6-241311 |
| Nov. 24, 1994 | (JP) | 6-289668 |

(51) Int. Cl.$^7$ ............................................. H04N 7/36
(52) U.S. Cl. ............. 386/109; 375/240.01; 375/240.21; 348/699
(58) Field of Search ................. 375/240.12, 240.13, 375/240.14, 240.15, 240.16, 240.17, 240.21, 240.22; 348/677, 700, 701; H04N 7/36

(56) References Cited

U.S. PATENT DOCUMENTS

| 4,937,666 A | | 6/1990 | Yang |
| 5,091,782 A | * | 2/1992 | Krause et al. ......... 375/240.16 |
| 5,128,756 A | * | 7/1992 | Johnston et al. ....... 375/240.12 |
| 5,408,328 A | * | 4/1995 | Boliek et al. ............ 358/261.4 |
| 5,489,949 A | | 2/1996 | Jeong et al. |
| 6,091,460 A | * | 7/2000 | Hantano et al. ............ 348/699 |

FOREIGN PATENT DOCUMENTS

| JP | 2214283 | 8/1990 |
| JP | 3216089 | 9/1991 |

OTHER PUBLICATIONS

International Organization for Standardization, ISO–IEC/JTC1/SC29/WG11, Coded Representation of Picture and Audio Information, Jul. 1992, Test Model 2.

* cited by examiner

*Primary Examiner*—Vincent Boccio
(74) *Attorney, Agent, or Firm*—Birch, Stewart, Kolasch & Birch, LLP

(57) ABSTRACT

In an image signal encoding method for encoding an image signal using motion compensation, a motion vector is found by means of a block matching method, a first distortion SEmc of motion compensated prediction associated with the motion vector, and a second distortion SEnomc of prediction without motion compensation are detected, the motion vector is used for for inter-picture prediction encoding when SEnomc>SEmc+K, with K being a constant greater than 0, and a vector having a value zero is used, in place of the motion vector, for inter-picture prediction encoding when SEnomc≦SEmc+K. In another aspect, a speed of motion in a sequence of pictures is detected, and for a part of the sequence of pictures detected to contain a quick motion, the prediction encoding is performed using one-way prediction encoding, and for a part of the sequence of pictures without a quick motion, prediction encoding is performed using bi-directional prediction encoding. In another aspect, the image signal is subsampled for each field, and a motion vector is determined using the field-subsampled image signal.

3 Claims, 36 Drawing Sheets

FIRST  SECOND      FIRST   SECOND
FIELD  FIELD       FIELD   FIELD
                 VERTICAL
                 SUBSAMPLING

ONE PIXEL INTERVAL

ONE PIXEL INTERVAL

FIRST SECOND → FIRST SECOND
FIELD FIELD    FIELD FIELD
       VERTICAL
       SUBSAMPLING

FIRST SECOND → FIRST SECOND
FIELD FIELD    FIELD FIELD
       VERTICAL
       SUBSAMPLING

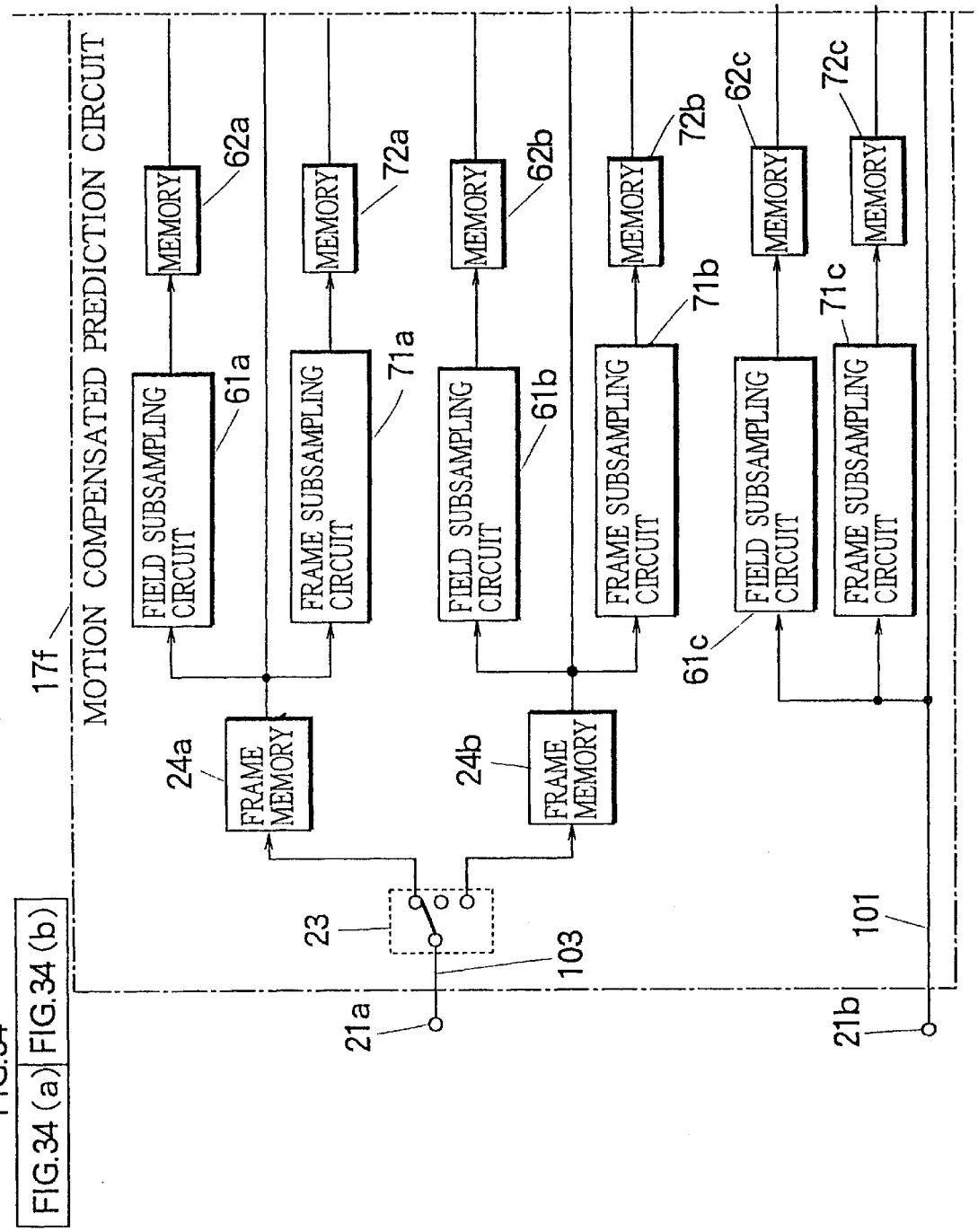

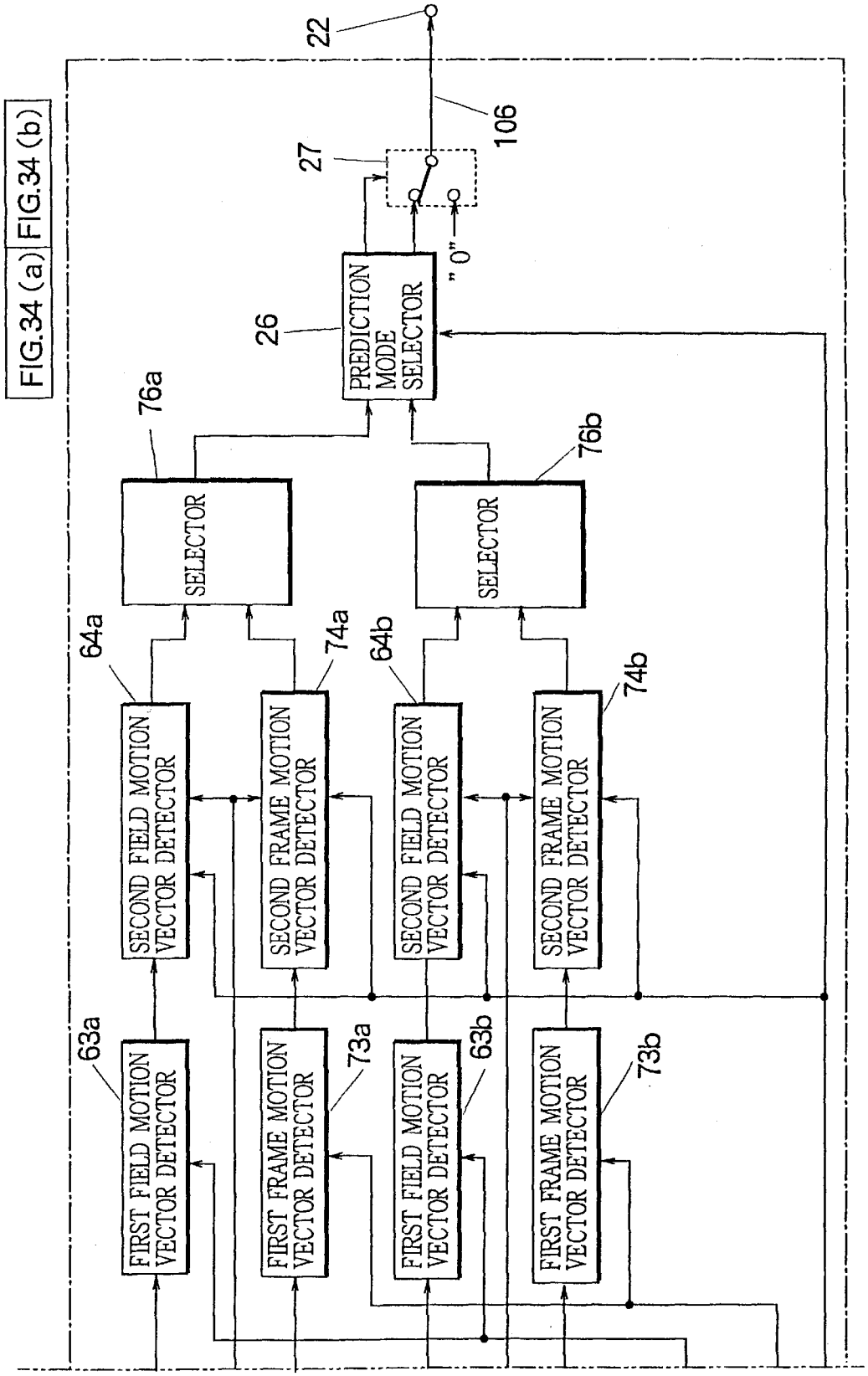

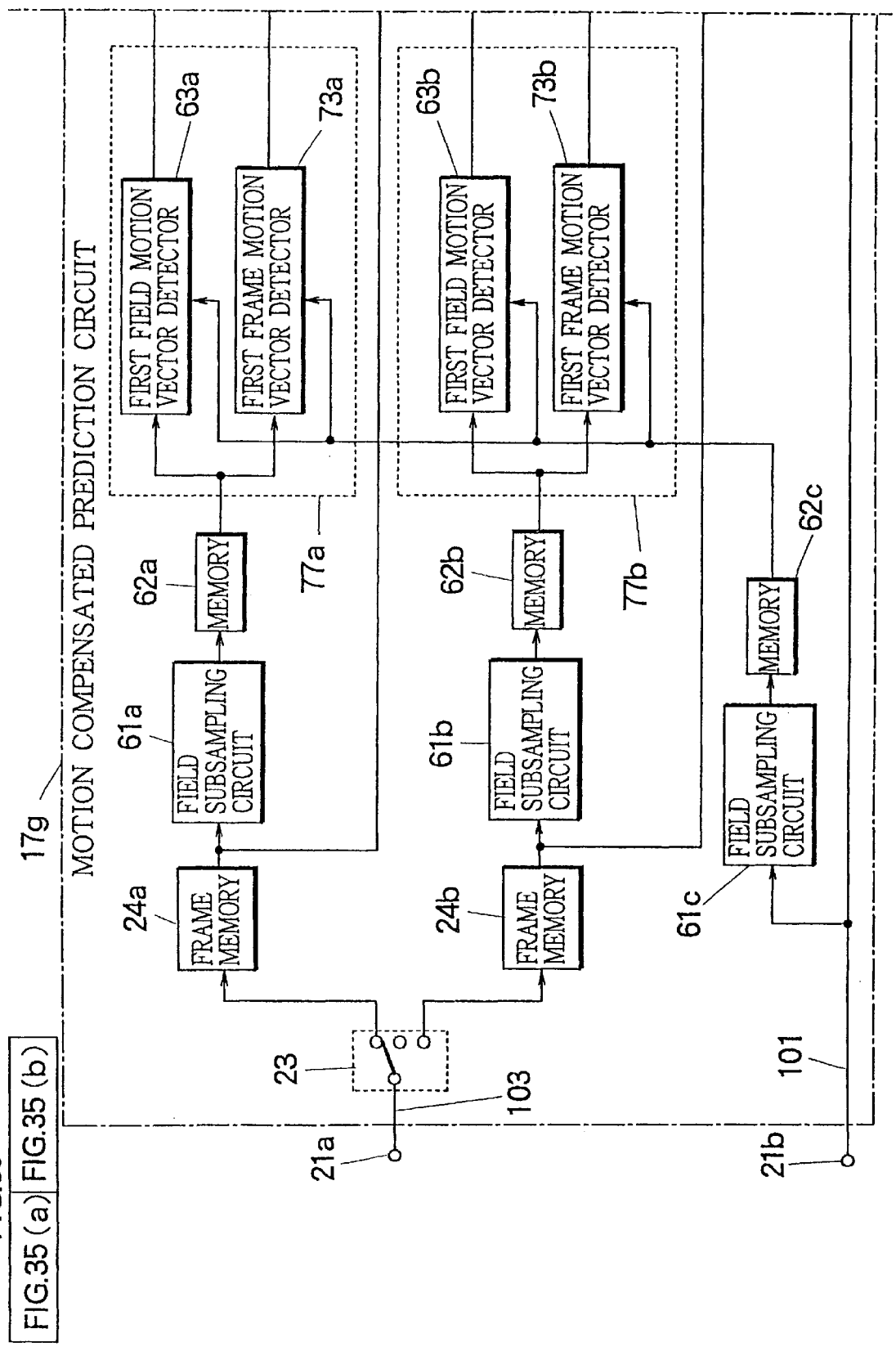

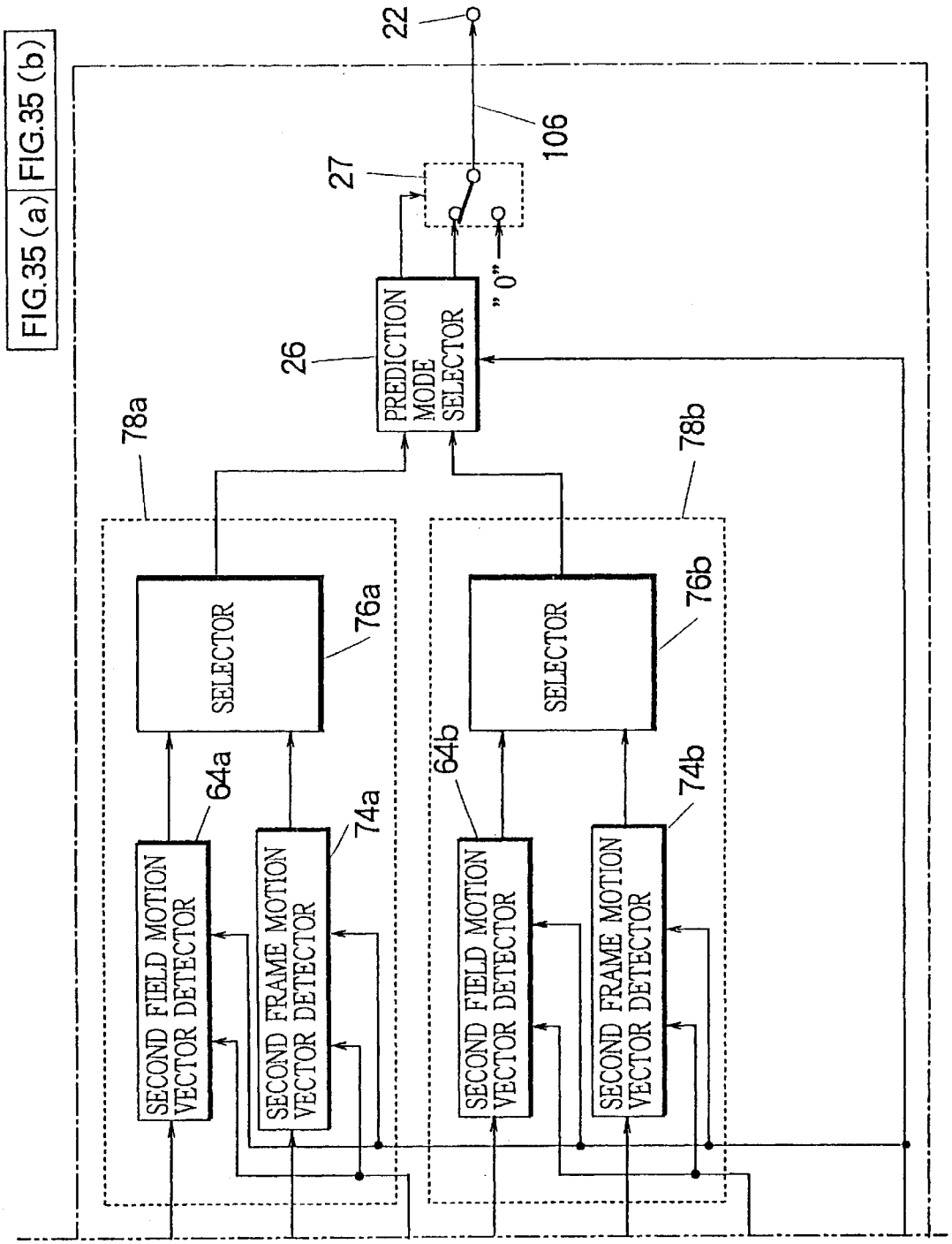

ONE PIXEL INTERVAL

ONE PIXEL INTERVAL

ONE PIXEL INTERVAL

ONE PIXEL INTERVAL

VIDEO SIGNAL ENCODING METHOD AND SYSTEM

This application is a divisional of application Ser. No. 08/948,589, filed on Oct. 10, 1997 now U.S. Pat. No. 6,091,460, which is a Rule 62 Cont. of application Ser. No. 08/415,474 filed on Mar. 31, 1995 now abandoned, the entire contents of which are hereby incorporated by reference.

BACKGROUND OF THE INVENTION

The present invention relates to a video signal encoding method and system, and in particular to a video signal encoding method and system with motion compensated prediction.

A high-efficiency encoding system for use in encoding video signals employs a hybrid encoding system combining inter-picture prediction encoding utilizing motion compensation and intra-picture encoding.

FIG. 1 is a block diagram showing an encoding system utilizing a conventional hybrid encoding method described in ISO-IEC/JTC/SC29/WG11 MPEG 92/N0245 Test Model 2. As illustrated, a digital video signal 101 received at an input terminal 1 is supplied to a first input of a subtractor 10, a first input of a motion compensated prediction circuit 17, and a second input of a quantizer 12. The output of the subtractor 10 is supplied to a DCT (discrete cosine transform) circuit 11, and its output is supplied to a first input of the quantizer 12. The output 102 of the quantizer 12 is supplied to a first input of a variable-length encoder 19, and to an inverse quantizer 13, and its output is supplied to an IDCT (inverse discrete cosine transform) circuit 14, and its output is supplied to a first input of an adder 15. The output of the adder 15 is supplied to a memory 16, and data (reference image signal 103) read from the memory 16 is supplied to a second input of the motion compensated prediction circuit 17 and a first input of a selector 18. A first output 104 of the motion compensated prediction circuit 17 is supplied to the memory 16.

A zero signal (data representing a value "0") is supplied to a second input of the selector 18, and a second output 107 of the motion compensated prediction circuit 17 is supplied to a third input of the selector 18. The output 106 of the selector 18 is supplied to a second input of the subtractor 10 and a second input of the adder 15. A third output 107 of the motion compensated prediction circuit 17 is supplied to a second input of the variable-length encoder 19. The output of the variable-length encoder 19 is input to a transmitting buffer 20, and a first output of the transmitting buffer 20 is output via an output terminal 2. A second output 108 of the transmitting buffer 20 is supplied to a third input of the quantizer 12.

FIG. 2 is a block diagram showing an example of configuration of a conventional motion compensated prediction circuit 17. The digital video signal 101 is supplied to a first input of a motion vector search circuit 3a. A reference image signal 103 input from the memory 16 is supplied to a second input of the motion vector search circuit 3a. The motion vector 109 output from the motion vector search circuit 3a is supplied to a first input of a selector 4a. A zero vector ("0") is supplied to a second input of the selector 4a.

The prediction image 110 output from the motion vector search circuit 3a is supplied to a first input of a distortion calculator 5a. Applied to a second input of the distortion calculator 5a is the video signal 101 from the input terminal 1. A distortion output 111 from the distortion calculator 5a is supplied to a first input of a comparing and selecting circuit 7a.

The video signal 101 is also supplied to a first input of a distortion calculator 5b. The reference image signal 103 is also supplied to a second input of the distortion calculator 5b. A distortion output 112 from the distortion calculator 5b is supplied to a second input of the comparing and selecting circuit 7a. A selection mode 113 output from the comparing and selecting circuit 7a is supplied to a first input of a comparing and selecting circuit 7b. A distortion output 114 from the comparing and selecting circuit 7a is supplied to a second input of the comparing and selecting circuit 7b.

The selection mode output 113 from the comparing and selecting circuit 7a is also supplied to a third input of the selector 4a. A motion vector 107 output from the selector 4a is supplied to the variable-length encoder 19.

The prediction image 110 output from the motion vector search circuit 3a is supplied to a first input of a selector 4b. The reference image signal 103 from the input terminal 1a is also supplied to a second input of the selector 4b. The selection mode 113 from the comparing and selecting circuit 7a is supplied to a third input of the selector 4b.

The prediction image 104 from the selector 4b is supplied to the memory 16. The video signal 101 from the input terminal 1 is also input to a variance calculator 9. An output 115 of the variance calculator 9 is supplied to a third input of the comparing and selecting circuit 7b. The selection mode 105 from the comparing and selecting circuit 7b is supplied to the selector 18.

The operation is described next. The digital input signal 101 is supplied to the subtractor 10, where a difference between the input picture (frame or field) and the picture from the motion compensated prediction circuit 17 is taken to reduce the temporal redundancy (redundancy in the direction of the time axis), and DCT is performed in the directions of the spatial axes. Coefficient obtained are quantized, and variable-length encoded, and then transmitted via the transmitting buffer 20.

Motion compensated prediction is schematically illustrated in FIG. 3. The picture that is to be encoded is divided into matching blocks each consisting of 16 pixels by 16 lines. For each matching block, examination is made as to which part of the reference picture, if used as a prediction image, minimizes the distortion. For instance, in the case of a still picture, if the 16 pixels by 16 lines at the same position as the matching block are used as the prediction image, the distortion will be zero. In the case of a motion picture, it may be that the block shifted leftward by 8 pixels and downward by 17 lines for instance yields the minimum distortion. Then, this block at the shifted position is regarded as a block corresponding to the matching block in question, and used as the prediction image, and (−8, 17) is transmitted as the motion vector.

Further explanation of the motion compensated prediction is explained with reference to FIG. 2. First, in the motion vector search circuit 3a, the motion vector is determined on the basis of the input image 101 and the reference image 103. This is effected by finding a block in the reference picture which minimizes the distortion for each matching block, as explained in connection with FIG. 3, and the the block thus found to give the minimum distortion is used as the prediction image, and the position of the block thus found to give the minimum distortion relative to the matching block is used as the motion vector. The distortion may be defined in terms of the sum of the absolute values of the differences.

In the distortion calculator 5a, the distortion defined as the sum of the squares of the differences between the input image 101 and the prediction image 110 output from the motion vector search circuit 3a is calculated for each matching block. The distortion 111 is also denoted by SEmc. In the distortion calculator 5b, the distortion defined as the sum of the squares of the differences between the input image 101 and the reference image 103 (of the same position) is calculated for each matching block. This distortion 112 is also denoted by SEnomc. The SEnomc is a particular value of the distortion SEmc where the vector representing the relative position between the input image 101 and the prediction image is zero.

For the purpose of the following explanation, it is assumed that the whole picture consists of I pixels by J lines, and the input picture is represented by F(i,j) where i represents the pixel number in the horizontal direction and $0 \leq i < I$, and j represents the pixel number in the vertical direction and $0 \leq j < J$. The matching blocks are so defined as not to overlap each other. Then, each matching block is represented by F(n*16+i, m*16+j) where $0 \leq i \leq 15$, and $0 \leq j \leq 15$, and (n, m) represent the position of the matching block ((n*16, m*16) represents the left, upper corner of the matching block). The (n, m)-th matching block is denoted by:

$$M(i,j)=F(n*16+i,m*16+j)(0 \leq i \leq 15, 0 \leq j \leq 15) \quad (F1)$$

The reference image is represented by G(i,j) ($0 \leq i < I$, $0 \leq j < J$), and the vector between the input image and the reference image is represented by (H,V), the prediction image PH,V(i,j) is given by:

$$PH,V(i,j)=G(n*16+i+H,m*16+j+V) \quad (F2)$$

The distortion S is evaluated using the following evaluation function:

$$S = \sum_{i=0}^{15} \sum_{j=0}^{15} |M(i,j) - PH, V(i,j)| \quad (F3)$$

The motion vector finding circuit 3a finds a vector (H, V) which minimizes the distortion S given by the above evaluation function (F3), and regards this vector H,V as the motion vector, and-outputs this motion vector (H,V) and the prediction image PH,V(i,j).

When SEmc<SEnomc, the comparing and selecting circuit 7a outputs a signal 113 indicating motion compensation (MC) mode and the distortion SEmc (111). When SEmc≧SEnomc, the comparing and selecting circuit 7a outputs a signal 113 indicating no motion compensation (NOMC) mode and the distortion SEnomc (112). When the mode selected by the comparing and selecting circuit 7a is the MC mode, the selector 4a outputs the motion vector 109 selected by the motion vector search circuit 3a, and the selector 4b selects the prediction image 110 selected by the motion vector search circuit 3a.

When the mode selected by the comparing and selecting circuit 7a is the NoMC mode, the selector 4a outputs the zero vector, and the selector 4b selects the reference image 103.

The variance calculator 9 calculates the variance of each matching block of the input image signal 101. The comparing and selecting circuit 7b compares the distortion 114 from the comparing and selecting circuit 7a and the variance 115 from the variance calculator 9, and selects the intra mode for intra-picture encoding, or a selection mode output from the comparing and selecting circuit 7a.

The motion vector output from the motion compensated prediction circuit 17 is encoded at the variable-length encoder 19, an example of which is shown in FIG. 4. Referring to FIG. 4, the motion vector 107 output from the motion compensated prediction circuit 17 is supplied to a first input of a subtractor 30. An output of the subtractor 30 is input to the variable-length code selector 31, and supplied via a memory 32 to a first input of a selector 33. Applied to a second input of the selector 33 is a zero vector. The output 102 of the quantizer 12 is variable-length-encoded at an encoder 34. An output of the variable-length code selector 31 and an output of the encoder 34 are multiplexed at a multiplexer 35, and supplied to the transmitting buffer 20.

As shown in FIG. 4, a difference between the motion vector for each matching block and the motion vector for the preceding matching block is determined at the subtractor 30, and the variable-length code for the difference vector is output. When the current matching block is in the intra mode or the NoMC mode, the motion vector is not encoded. When the preceding matching block is in the intra mode or the NoMC mode, or in the initial state of the encoding, the zero vector is used in place of the preceding motion vector. The variable-length code representing the difference vector is assigned a shorter code when it is closer to the zero vector.

In the conventional motion compensated prediction for the image signal encoding, transfer efficiency of the motion vector is low. Moreover, the motion vector is selected depending on the magnitude of the predicted distortion, so that when similar patterns are present over a wide area of the picture, or where the picture is featureless and flat, the difference in the predicted distortion may be small, and a block different from a truly corresponding block may erroneously found as a corresponding block. If a block farther away from the truly corresponding block is found as a corresponding block, an unnecessarily large motion vector is transmitted, and the picture is distorted.

Another problem associated with the conventional system is that the motion vectors for adjacent blocks sometimes differ so much, causing picture quality degradation. Moreover, the selection of the vector depends on the magnitude of the distortion, and the efficiency of transmission of the motion vectors is low.

A further problem associated with the conventional system is that if the range of motion vector search is expanded the amount of information of the codes of the vectors is increased. If on the other hand the range of the motion vector search is narrowed rapid motion cannot be traced.

FIG. 5 is another way of presenting the conventional image signal encoding system shown in the previously mentioned publication, ISO-IEC/JTC1/SC29/WG11 MPEG 92/N0245 Test Model 2. Reference numerals identical to those in FIG. 1 denote identical or corresponding elements. The memory 16 and the selector 18 in FIG. 1 are not shown, but instead a memory 21 is added. The digital video signal 101a received at the input terminal 1 is input to and stored in the memory 21, and the video signal 101b read out of the memory 21 is supplied to the first input of the subtractor 10 and to the motion compensated prediction circuit 17. The output of the motion compensated prediction circuit 17 is supplied to the second input of the subtractor 10, and to the second input of the adder 15. The rest of the configuration is similar to that of FIG. 1.

FIG. 6 is a schematic diagram showing the concept of motion compensated prediction in the prior art image signal encoding system. FIG. 7 is a schematic diagram showing the operation of the memory 21.

FIG. 8 shows an example of the motion compensated prediction circuit 17 used in the system of FIG. 5. The output 103 of the adder 15 (FIG. 5) is supplied via an input terminal 21a to a switching circuit 23. A first output of the switching circuit 23 is supplied to a first frame memory 24a. a second output of the switching circuit 23 is supplied to a second frame memory 24b. Reference images stored in and read out from the frame memories 24a and 24b are respectively supplied to first inputs of motion vector detectors 25a and 25b. The reference image from the memory 21 is supplied via a second input terminal 21b to second inputs of the motion vector detectors 25a and 25b. Outputs of the motion vector detectors 25a and 25b are supplied to first and second inputs of a prediction mode selector 26. The reference image 101b from the memory 21 is supplied to a third input of the prediction mode selector 26. A first output of the prediction mode selector 26 is input to a first input of a selector 27, a zero vector ("0") is supplied to a second input of the selector 27, and a second output of the prediction mode selector 26 is supplied to a third input of the selector 27. An output of the selector 27 is output via the output terminal 106.

Referring now to FIG. 6, the pictures are classified into intra-picture encoded picture (called I-picture), a one-way predictive-encoded picture (called P-picture), and a bi-directionally predictive-encoded picture (called B-picture). For instance, let us assume that it is desired that one out of every N pictures is an I-picture, and one out of M every pictures is a P-picture or an I-picture. If n and m are integers, and $1 \leq m \leq N/M$, then (N*n+M)-th pictures are made to be I-pictures, (N*n+M*m)-th pictures (m≠1) are made to be P-pictures, and (N*n+M*m+1)-th to (N*n+M*m+M−1)-th pictures are made to be B-pictures. An assembly of (N*n+1)-th to (N*n+N)-th pictures are called a group of pictures or a GOP. FIG. 6 shows the case where N=15, and M=3.

With respect to the I-pictures, intra-picture encoding, without inter-picture prediction, is conducted. With respect to P-pictures, prediction from an immediately preceding I- or P-picture is conducted. For instance, the sixth picture in FIG. 6 is a P-picture, and is predicted from the third, P-picture. The ninth, P-picture is predicted from the sixth, P-picture. With respect to the B-pictures, prediction from both the preceding and succeeding I- and P-pictures is conducted. For instance, the fourth and fifth, B-pictures are predicted from the third, I-picture and the sixth, P-picture. Accordingly, the fourth and fifth pictures are encoded, after the sixth picture is encoded.

Next, the operation of the encoding system, shown in FIG. 5, using the hybrid encoding method will be described.

The input digital image signal input via the input terminal 1 is input to the memory 21, and rearranged into the order of the encoding, and output, as shown in FIG. 7, in which "OI" indicates the order of input, while "OE" indicates the order of encoding. The order of the image signals is changed from that shown at the top of FIG. 7 into that shown at the bottom of FIG. 7. This is because, the first, B-picture in FIG. 6, for instance, cannot be encoded until after the third, I-picture is encoded, as described above.

The image signals 101b output from the memory 21 are supplied to the subtractor 10, where the difference between each image signal 101b and the prediction picture 106 from the motion compensated prediction circuit 17 is obtained, and the difference is subjected to DCT (discrete cosine transform) at the DCT circuit 11 in the direction of the time axis. The coefficients obtained by the DCT are quantized at the quantizer 12, and are then variable-length-encoded at the variable-length encoder 19, and output via the transmitting buffer 20.

The quantized transform coefficients are inverse-quantized at the inverse-quantizer 13, and are subjected to IDCT (inverse DCT) at the IDCT circuit 14, and are then added at the adder 15 to the prediction image 106 to produce a decoded image 103. The decoded image 103 is input to the motion compensated prediction circuit 17, for the purpose of encoding the next image.

The operation of the motion compensated prediction circuit 17 will next be described with reference to FIG. 8. The motion compensated prediction circuit 17 uses two reference images stored in the frame memories 24a and 24b, to perform motion compensated prediction using the image signal 101b, to produce the prediction image 106.

First, where the decoded image 103 is an I- or P-picture, the image 103 is written in the frame memory 24a or 24b for the encoding of the next picture. One of the frame memories 24a and 24b which was updated earlier is selected by the selector 23 for the writing of the newly input image 103. This means the frame memories 24a and 24b are selected alternately when a newly input image 103 is to be written. With such alternate selection, when the first and second, B-pictures in FIG. 6 are to be encoded, the zero-th, P-picture and the third, I-picture are stored in the frame memories 24a and 24b, respectively. When the sixth, P-picture is encoded and decoded, the frame memory 24a is updated with the decoded sixth, P-picture. Accordingly, when the fourth and fifth, B-pictures are to be encoded, the sixth, P-picture and third, I-picture are stored in the frame memories 24a and 24b, respectively. When the ninth, P-picture is encoded and decoded, the frame memory 24b is updated with the decoded ninth, P-picture. Accordingly, when the seventh and eighth, B-pictures are to be encoded, the sixth and ninth, P-pictures are stored in the frame memories 24a and 24b, respectively.

When the image signal 101b output from the memory 21 is input to the motion compensated prediction circuit 17, the two motion vector detectors 25a and 25b detect the motion vector using the reference pictures stored in the frame memories 24a and 24b, and outputs the motion compensated prediction picture.

That is, the image signal 101b for one picture is divided into a plurality of blocks, and for each block, one of the reference blocks which minimizes the prediction distortion is selected, and the relative position of the selected block is output as the motion vector, and the selected block is output as the motion compensated prediction image. The prediction mode selector 26 selects one of the two motion compensated prediction images from the motion vector detectors 25a and 25b and the average image thereof which gives the minimum prediction distortion, and outputs the selected image as the prediction image. If the image signal 101b is an I-picture or a P-picture, the motion compensated prediction image within the reference picture input earlier is selected and output. That is, where the image signal 101b is an I-picture or a P-picture, and if the reference image stored in the frame memory 24b is of the one earlier than the reference image stored in the frame memory 24a, the motion compensated prediction image from the motion vector detector 25b is selected and output. If the reference image stored in the frame memory 24a is of the one earlier than the reference image stored in the frame memory 24b, the motion compensated prediction image from the motion vector detector 25a is selected and output.

The prediction mode selector 26 also selects one of the intra-picture encoding (which does not use prediction), and the inter-picture prediction encoding using the selected prediction image which yields a higher encoding efficiency. If the image signal 101b is an I-picture, the intra-picture encoding is always selected. When the intra-picture encoding is selected, a signal indicating the intra-picture encoding is output as the prediction mode signal. When the inter-picture encoding is selected, a signal indicating the selected prediction image is output as the prediction mode signal. When the prediction mode output from the prediction mode selector 26 is an intra-picture encoding mode, the selector 27 outputs a zero signal ("0"). Otherwise, the selector 27 outputs the prediction image from the prediction mode selector 26.

Thus, it will be understood that when the image signal 101b output from the memory 21 is an I-picture, the motion compensated prediction circuit 17 outputs a zero signal as the prediction image 106, so that no inter-picture prediction is performed for the I-picture and intra-picture conversion encoding is conducted. When the image signal 101b output from the memory 21 is the sixth, P-picture, in FIG. 6, the motion compensated prediction circuit 17 performs motion compensated prediction from the third, I-picture in FIG. 6 to produce the prediction image 106. When the image signal 101b output from the memory 21 is the fourth, B-picture in FIG. 6, the motion compensated prediction circuit 17 performs motion compensated prediction from the third, I-picture and the sixth, P-picture in FIG. 6, to produce the prediction image 106.

Since the conventional image signal encoding system is configured as described above, even if the motion is 30 pixels per frame, if the P-picture interval M is three, the motion vector is of 90 pixels, and the motion vector search range must be wide. That is, the temporal distance between the pictures, in particular for the P-picture prediction, is long, and the motion vector range must be wide, and the hardware size is therefore large, and the amount of information of the motion vector codes is large. If the motion vector search range is narrow, the correct motion vector cannot be found, and the prediction efficiency is low, and the amount of information of the codes is enlarged, or the picture quality is degraded.

Moreover, the conventional image signal encoding system is configured as described does not take account of scene changes. If a scene change occurs at a P-picture or a B-picture, there will be no effects of the motion compensated prediction, so that the amount of information of the codes is enlarged or the picture quality is degraded.

Further problems of the prior art system will next be described. If the input image signal 101b is represented by F(i,j), with i representing the pixel number in the horizontal direction, and j representing the pixel number in the vertical direction, and the reference picture stored in the frame memory 24a is represented by G(i,j), and the whole picture is divided into blocks Bn,m(i,j), each including 16 pixels in the horizontal direction by 16 lines in the vertical direction, with n=0, 1, 2, . . . indicating the position of the block in the horizontal direction, and m=0, 1, 2, . . . indicating the position of the block in the vertical direction, and $0 \leq i \leq 15$, and $0 \leq j \leq 15$. The block is represented by:

$$Bn,m(i,j)=F(n*16+i, m*16+J)$$

For each block, one of the reference blocks which minimizes the prediction distortion is selected by means of block matching, and the relative position of the selected reference block is output as representing the motion vector, and the block is output as the motion compensated prediction image.

When the input image signal 101 is an interlace signal, and each frame is treated as one picture, the block matching is conducted for each frame and for each field, and the result of the block matching which yields a smaller prediction matching is selected. When the block matching is conducted for each frame, the prediction distortion E0(Vh,Vv) for the vector (Vh,Vv) is calculated by:

$$E0(Vh, Vv) = \sum_{i=0}^{15}\sum_{j=0}^{15} |Bn, m(i, j) - G(n*16 + i + Vh, m*16 + j + Vv)| \qquad (F4)$$

If the motion vector search range is ±Mh pixels in the horizontal direction and ±Mv lines in the vertical direction, the vector (Vh,Vv)=(Vh0,Vv0) within $-Mh \leq Vh \leq +Mh$, and $-Mv \leq Vv \leq +Mv$, and giving the minimum E0(Vh,Vv) is determined, and e0 is defined as (written for) the E0(Vh0, Vv0) for the (Vh0, Vv0).

If the block matching is made for each field, the block Bn,m(i,j) is divided into first and second fields. For the first field of the block Bn,m(i,j), the prediction distortion E1(Vh, Vv,f) (f=0,1) for the vector (Vh,Vv) is calculated by:

$$E1(Vh, Vv, 0) = \sum_{i=0}^{15}\sum_{j=0}^{7} |Bn, m(i, 2*j) - G(n*16 + i + Vh, m*16 + 2*j + Vv)| \qquad (F5)$$

$$E1(Vh, Vv, 1) = \sum_{i=0}^{15}\sum_{j=0}^{7} |Bn, m(i, 2*j) - G(n*16 + i + Vh, m*16 + 2*j + 1 + Vv)| \qquad (F6)$$

If the motion vector search range is ±Nh pixels in the horizontal direction and ±Nv lines in the vertical direction, the vector (Vh,Vv)=(Vh1,Vv1) within $-Nh \leq Vh \leq +Nh$, and $-Nv \leq Vv \leq +Nv$, and f=f1 which give in combination the minimum E1(Vh,Vv,f) is determined, and e1 is defined as E1(Vh1,Vv1,f1). f indicates whether the reference image is of a first field or of a second field.

For the second field of the block Bn,m(i,j), the prediction distortion E2(Vh,Vv,f) (f=0,1) for the vector (Vh,Vv) is calculated by:

$$E2(Vh, Vv, 0) = \sum_{i=0}^{15}\sum_{j=0}^{7} |Bn, m(i, 2*j+1) - G(n*16 + i + Vh, m*16 + 2*j + Vv)| \qquad (F7)$$

$$E2(Vh, Vv, 1) = \sum_{i=0}^{15} \sum_{j=0}^{7} |Bn, m(i, 2*j+1) - G(n*16 + i + Vh, m*16 + 2*j + 1 + Vv)| \qquad (F8)$$

The vector (Vh,Vv)=(Vh2,Vv2) and f=f2 giving the minimum E2(Vh,Vv,f) is determined, and e2 is defined as E2(Vh1,Vv1,f2).

Finally, e0 and e1+e2 are compared with each other. If e0 is larger, the two vectors (Vh1,Vv1), (Vh2,Vv2) and f1, f2 indicating the fields, and the corresponding motion compensated prediction images B'n,m(i,j):

$$B'(n,m(i,2*j)=G(n*16+i+Vh1,m *16+2*j+f1+Vv1)$$

$$B'(n,m(i,2*j+1)=G(n*16+i+Vh2,m *16+2*j+f2+Vv1)$$

are output.

If $e0 \leq e1+e2$, the vector (Vh0,Vv0) and the motion compensated prediction image B'n,m(i,j)

$$B'(n,m(i,j)) = G(n*16+i+Vh0, m*16+j+Vv0)$$

are output.

The operation of the motion vector detector 25b is identical to that of the motion vector detection circuit 25a, except that the reference images used are those stored in the frame memory 24b.

Because the conventional image signal encoding system is required to conduct the calculations of the equations (F4) to (F8), when the motion vector search range is widened to cope with the quickly moving pictures, the amount of calculation is increased, and as a result the size of the hardware had to be increased.

SUMMARY OF THE INVENTION

An object of the invention to solve the above problems.

Another object of the invention to reduce fluctuation in the motion vector between adjacent blocks.

A further object of the invention is to provide a system in which the range of motion vector search can be easily varied depending on the content of the picture.

Another object of the invention is to provide an image signal encoding system which can provide an adequate motion vector search range for a sequence of pictures with quick motion, without increasing the amount of information of motion vector codes, and with which the efficiency of coding is high.

Another object of the invention is to restrain an increase of the amount of codes, and to perform encoding with a high efficiency, even when a scene change occurs.

Another object of the invention is to enable encoding of quickly moving picture without increasing the size of the hardware and without degradation of the picture quality.

According to a first aspect of the invention, there is provided an image signal encoding method for encoding an image signal using motion compensation, comprising the step of:

finding a motion vector by means of a block matching method;

detecting a first distortion SEmc of motion compensated prediction associated with the motion vector;

detecting a second distortion SEnomc of prediction without motion compensation;

using the motion vector for inter-picture prediction encoding when SEnomc>SEmc+K, with K being a constant greater than 0; and using a vector having a value zero, in place of the motion vector, for inter-picture prediction encoding when SEnomc≦SEmc+K.

The step of finding the motion vector may comprise the steps of:

receiving an input image signal for a first one of pictures in a series of pictures;

providing a reference image signal of a second one of said pictures, said second one of said pictures preceding said first one of said pictures;

dividing said input image signal into matching blocks, each of said matching blocks consisting of signals for pixels adjacent to each other on a display screen;

detecting, for each of said matching blocks in said input image signal, a block in said reference image signal which yields a minimum value of an evaluation functions for evaluating the blocks in said reference image signals; and detecting the motion vector representing a position of said detected block relative to said each of the matching blocks in said input image signal.

When the difference between the distortion of the motion compensated prediction using the motion vector found by the block matching method and the distortion of the prediction obtained without using the motion compensation is small, the motion vector is replaced by a zero vector, and the inter-picture prediction encoding without motion compensation is conducted. As a result, the motion vector need not be transmitted, and the efficiency of transmission of the motion vectors is improved.

According to another aspect of the invention, there is provided an image signal encoding method for encoding an image signal using motion compensation, comprising the step of:

finding a motion vector by means of a block matching method;

detecting a first distortion SEmc of motion compensated prediction associated with the motion vector;

detecting a second distortion SEnomc of prediction without motion compensation;

using the motion vector for inter-picture prediction encoding when SEnomc>SEmc+K, with K being a constant not smaller than 0;

using a vector having a value zero, in place of the motion vector, for inter-picture prediction encoding when SEnomc≦SEmc+K; and varying the value of the constant K according to the content of the image signal.

It may be so arranged that when the difference in the distortion in the block matching is small, the value of the constant K is reduced.

When the difference between the distortion of the motion compensated prediction using the motion vector found by the block matching method and the distortion of the prediction obtained without using the motion compensation is small, the motion vector is replaced by a zero vector, and the inter-picture prediction encoding without motion compensation is conducted. As a result, the motion vector need not be transmitted, and the efficiency of transmission of the motion vectors is improved.

In addition, for the image signals with which the difference in the distortion in the block matching is small, such as where a picture of a low contrast is panned, the value of K is decreased, and the condition for the zero vector to be selected is more difficult. As a result, degradation of picture quality is avoided.

The step of finding the motion vector may comprise the steps of:

receiving an input image signal for a first one of pictures in a series of pictures;

providing a reference image signal of a second one of said pictures, said second one of said pictures preceding said first one of said pictures;

dividing said input image signal into matching blocks, each of said matching blocks consisting of signals for pixels adjacent to each other on a display screen;

detecting, for each of the matching blocks in said input image signal, a block in said reference image signal which yields a minimum value of an evaluation functions for evaluating the blocks in said reference image signals; and detecting the motion vector representing a position of said detected block relative to said each of the matching blocks in said input image signal.

The step of finding the motion vector may selectively use at least two evaluating functions for determining the motion vector;

at least a first one of the evaluating functions contains, as its factor, the magnitude of a vector representing the position of the block in said reference image signal relative to said each of the matching blocks in said input image signal; and the evaluating function is altered in accordance with the content of the picture.

It may be so arranged that at least a second one of the evaluation functions does not contain the magnitude of the motion vector, as its factor; and when the content of the image signal is such that the difference in the distortion in the block matching is small, said second one of the evaluating functions is used.

It may be so arranged that the evaluation function contains, as its factor, values representing differences between signals for pixels in said each of the matching blocks in said input image signal, and signals for pixels in the block in said reference image signal which correspond to said signals for pixels in said each of the matching blocks in said input image signal.

For the image signals with which the difference in the distortion in the block matching is small, such as where a picture of a low contrast is panned, the evaluation function, which does not contain, as its factor, the magnitude of the motion vector, is used, so that the condition for the zero vector to be selected is more difficult, and degradation in picture quality is avoided.

According to another aspect of the invention, there is provided an image signal encoding method for encoding an image signal using motion compensation, comprising the steps of:

receiving an input image signal for a first one of pictures in a series of pictures;

providing a reference image signal of a second one of said pictures, said second one of said pictures preceding said first one of said pictures;

dividing said input image signal into matching blocks, each of said matching blocks consisting of signals for pixels adjacent to each other on a display screen;

detecting, for each of the matching blocks in said input image signal, a block in said reference image signal which yields a minimum value of an evaluation function for evaluating the blocks in said reference image signals;

outputting the detected block as a prediction block; and detecting a motion vector representing a position of said detected block relative to said each of the matching blocks in said input image signal;

wherein said evaluation function contains, as its factor, the magnitude of a vector representing the position of the block in the reference image relative to said each of the matching blocks in said input image.

It may be so arranged that the evaluation function also contains, as its factor, values representing differences between signals for pixels in said each of the matching blocks in said input image signal, and signals for pixels in the block in said reference image signal which correspond to said signals for pixels in said each of the matching blocks in said input image signal.

Because the evaluation function contains, as its factor, the magnitude of the vector, and because the vector giving the smallest value of the evaluation function is found to be the motion vector, the condition for the blocks in the reference image nearer to the block of the input image to be found the prediction image is easier. That is, if other conditions are identical, the block in the reference image nearer to the block in the input image is selected. The value of the motion vector tends to be smaller, and as a result, the efficiency of transmission of the motion vectors is improved, and degradation in the picture quality is also prevented.

According to another aspect of the invention, there is provided an image signal encoding method for encoding an image signal using motion compensation, comprising the steps of:

receiving an input image signal for a first one of pictures in a series of pictures;

providing a reference image signal of a second one of said pictures, said second one of said pictures preceding said first one of said pictures;

dividing said input image signal into matching blocks, each of the matching blocks consisting of signals for pixels adjacent to each other on a display screen;

detecting, for each of the matching blocks in said input image signal, a block in said reference image signal which yields a minimum value of an evaluation function for evaluating blocks in said reference image signals;

detecting a motion vector representing a position of said detected block relative to said each of the matching blocks in said input image signal;

outputting the motion vector (H,V) for use in the motion compensation for said each of the matching blocks when $$S2 \leq S1 + K$$

where S1 represents a prediction distortion for the detected motion vector (Hp,Vp) for a first one of said matching blocks, S2 represents a prediction distortion for the motion vector (Hp,Vp) for a second one of the matching blocks being situated in the neighborhood, on the display screen or along the time axis, of said first one of the matching blocks, and output for use in the motion compensation previously, and K represents a constant not smaller than 0; and outputting the motion vector (H,V) for use in the motion compensation for said each of the matching blocks when the above inequality is not satisfied.

The above-recited method may further comprise the step of:

outputting, as a prediction block, the block corresponding to the motion vector (H,V) or (Hp,Vp) output for use in the motion compensation.

It may be so arranged that the evaluation function also contains, as its factor, values representing differences between signals for pixels in said each of the matching blocks in said input image signal, and signals for pixels in the block in said reference image signal which correspond to said signals for pixels in said each of the matching blocks in said input image signal.

With such an arrangement, when the second motion vector (Hp,Vp) is output, it is sufficient that a signal or code indicating that the motion vector to be sent is identical to the one previously used for encoding. As a result, the amount of information to be transmitted is reduced, and the motion vector transmission efficiency is improved, using a simple configuration. Moreover, as the second motion vector (Hp, Vp) is used more often, fluctuations in the motion vector between neighboring matching blocks is reduced, so that the picture quality is improved.

According to another aspect of the invention, there is provided an image signal encoding method for encoding an image signal using motion compensation, comprising the steps of:

receiving an input image signal for a first one of pictures in a series of pictures;

providing a reference image signal of a second one of said pictures, said second one of said pictures preceding said first one of said pictures;

dividing said input image signal into matching blocks, each of the matching blocks consisting of signals for pixels adjacent to each other on a display screen;

detecting, for each of the matching blocks in said input image signal, a block in said reference image signal which yields a minimum value of an evaluation function for evaluating blocks in said reference image signals;

detecting a motion vector representing a position of said detected block relative to said each of the matching blocks in said input image signal;

outputting the motion vector (Hp,Vp) for use in the motion compensation for said each of the matching blocks when $$S2 \leq S1+K$$

where S1 represents a prediction distortion for the detected motion vector (H,V) for a first one of said matching blocks, S2 represents a prediction distortion for the motion vector (Hp,Vp) for a second one of the matching blocks being situated in the neighborhood, on the display screen or along the time axis, of said first one of the matching blocks, and output for use in the motion compensation previously, and K represents a constant, which is varied depending on the content of the input image signals; and outputting the motion vector (H,V) for use in the motion compensation for said each of the matching blocks when the above inequality is not satisfied.

The above recited method may further comprises the step of:

outputting, as a prediction block, the block corresponding to the motion vector (H,V) or (Hp,Vp) output for use in the motion compensation.

It may be so arranged that the evaluation function also contains, as its factor, values representing differences between signals for pixels in said each of the matching blocks in said input image signal, and signals for pixels in the block in said reference image signal which correspond to said signals for pixels in said each of the matching blocks in said input image signal.

With such an arrangement, when the second motion vector (Vp,Vp) is output, it is sufficient that a signal or code indicating that the motion vector to be sent is identical to the one previously used for encoding. As a result, the amount of information to be transmitted is reduced, and the motion vector transmission efficiency is improved, using a simple configuration. Moreover, as the second motion vector (Hp, Vp) is used more often, fluctuations in the motion vector between neighboring matching blocks is reduced, so that the picture quality is improved.

In addition, where the motion is different from one block to another, the value of K can be made small, so as to restrain use of the second motion vector, and as a result, degradation in the picture quality can be prevented.

According to another aspect of the invention, there is provided an image signal encoding method for encoding an image signal using motion compensation, comprising the steps of:

receiving an input image signal for a first one of pictures in a series of pictures;

providing a reference image signal of a second one of said pictures, said second one of said pictures preceding said first one of said pictures;

dividing said input image signal into matching blocks, each of said matching blocks consisting of signals for pixels adjacent to each other on a display screen;

detecting, for each of the matching blocks in said input image signal, a block in said reference image signal which yields a minimum value of an evaluation function for evaluating the blocks in said reference image signals; and detecting a motion vector representing a position of said detected block relative to said each of the matching blocks in said input image signal;

wherein said evaluation function contains, as its factor, the distance between a vector representing the position of the block in the reference image relative to said each of the matching blocks in said input image, and a motion vector for determined another one of said matching blocks being situated in the neighborhood, on the display screen or along the time axis, of said each of the matching blocks, and output for use in the motion compensation previously.

It may be so arranged that the evaluation function also contains, as its factor, values representing differences between signals for pixels in said each of the matching blocks in said input image signal, and signals for pixels in the block in said reference image signal which correspond to said signals for pixels in said each of the matching blocks in said input image signal.

The fluctuation in the motion vector between the adjacent matching blocks can be restrained, so that the picture quality can be improved. The transmission efficiency of the motion vector can also be improved.

The above recited method may further comprise the steps of:

outputting the motion vector (Hp,Vp) for use in the motion compensation for said each of the matching blocks when $$S2 \leq S1+K$$

where S1 represents a prediction distortion for the detected motion vector (H,V) for a first one of said matching blocks, S2 represents a prediction distortion for the motion vector (Hp,Vp) for a second one of the matching blocks being situated in the neighborhood, on the display screen or along the time axis, of said first one of the matching blocks, and output for use in the motion compensation previously, and K represents a constant, which is varied depending on the content of the input image signals; and outputting the motion vector (H,V) for use in the motion compensation for said each of the matching blocks when the above inequality is not satisfied.

According to another aspect of the invention, there is provided an image signal encoding method for encoding an image signal using motion compensation, comprising the steps of:

receiving an input image signal for a first one of pictures in a series of pictures;

providing a reference image signal of a second one of said pictures, said second one of said pictures preceding said first one of said pictures;

dividing said input image signal into matching blocks, each of said matching blocks consisting of signals for pixels adjacent to each other on a display screen;

detecting, for each of the matching blocks in said input image signal, a block in said reference image signal which yields a minimum value of an evaluation function for evaluating the blocks in said reference image signals; and detecting a motion vector representing a position of said detected block relative to said each of the matching blocks in said input image signal;

wherein said evaluation function is a sum of a distortion representing differences between signals for pixels in said each of the matching blocks in said input image signal, and signals for pixels in the block in said reference image signal which correspond to said signals for pixels in said each of the matching blocks in said input image signal, and an offset value determined in accordance with the magnitude of a vector representing a position of each of said blocks in said reference image signal relative to said each of the matching blocks in said input image signal.

Where the picture includes a number of identical or similar patterns repeated over a wide area, or is featureless, flat, and the difference in the predicted distortion is small, priority is given to the smaller motion vectors in the selection. As a result, the amount of information of the codes of the motion vectors to be transmitted can be reduced, and the quality of the picture is improved.

It may be so arranged that the offset value for the vector having a magnitude exceeding a predetermined value is set to a value larger than the values which said distortion can assume, so as to place a limit to the magnitude of the motion vector.

The range of the motion vector is varied, or is effectively limited in accordance with the content of the picture. In other words.

It may be so arranged that wherein said predetermined value selectively assumes powers of 2, and the length of the code representing the motion vector is selectively decided depending on the range of the motion vector.

The length of the code is changed according to the the range of the motion vector, so that the efficiency of transmission of the motion vector codes is improved.

According to another aspect of the invention, there is provided an image signal encoding method for encoding an image signal using motion compensation, comprising the step of:

receiving an input image signal for each of pictures in a series of pictures;

dividing said input image signal into matching blocks, each of said matching blocks consisting of signals for pixels adjacent to each other on a display screen;

detecting first motion vectors, for said matching blocks, by a block matching method through a search over a fixed search range;

storing the first motion vectors;

detecting second motion vectors, for said matching blocks, by a block matching method through a search over a variable search range within said fixed search range;

outputting the second motion vectors for use in the motion compensation;

updating the variable search range in accordance with the maximum value of the first motion vectors detected for the pictures encoded in the past.

It may be so arranged that said series of pictures include intra-encoded pictures, one-way predictive encoded pictures and bi-directionally predictive encoded pictures; and the variable search range is updated in accordance with the maximum value of the first motion vectors detected for the immediately preceding one-way predictive encoded picture if the image signal being encoded is one forming a one-way predictive encoded picture, and in accordance with the maximum value of the first motion vectors detected for the immediately succeeding one-way predictive encoded picture if the image signal being encoded is one forming a bi-directionally predictive encoded picture.

The above recited method may further comprise the steps of providing a reference image signal of a second one of said pictures, said second one of said pictures preceding said first one of said pictures; wherein each said step of detecting the first motion vector and said step of detecting the second motion vector comprises detecting, for each of said matching blocks in said input image signal, a block in said reference image signal which yields a minimum value of an evaluation functions for evaluating the blocks in said reference image signals, and detecting the motion vector representing a position of said detected block relative to said each of the matching blocks in said input image signal.

The rage of the motion vector can be adaptively varied according to the content of the picture.

It may be so arranged that said evaluation function is a sum of a distortion representing differences between signals for pixels in said each of the matching blocks in said input image signal, and signals for pixels in the block in said reference image signal which correspond to said signals for pixels in said each of the matching blocks in said input image signal, and an offset value determined in accordance with the magnitude of a vector representing a position of each of said blocks in said reference image signal relative to said each of the matching blocks in said input image signal.

According to another aspect of the invention, there is provided an image signal encoding method performing motion compensation inter-picture prediction encoding, comprising the steps of:

detecting a speed of motion in a sequence of pictures;

for a part of the sequence of pictures detected to contain a quick motion, performing the prediction encoding using one-way prediction encoding; and for a part of the sequence of pictures without a quick motion, performing prediction encoding using bi-directional prediction encoding.

The step of detecting the speed of motion may comprise:

detecting a value of an evaluation function representing differences between pixels in a first one of pictures in said series of pictures, and pixels in a second one of pictures in said series of pictures;

detecting a variance of said first one of the pictures;

finding that a quick motion is contained if at least one of the following condition (a) and (b) is satisfied:

(a) $Sa > \alpha 0$ (b) $Sb < \beta 0$ and $Sa > \gamma 0$ where Sa represents the detected value of the evaluation function, Sb represents the detected variance, $\alpha 0$, $\beta 0$ and $\gamma 0$ are predetermined threshold values, with $\alpha 0 > \gamma 0$, finding that no quick motion is contained if none of the above conditions (a) and (b) is satisfied.

For a sequence of pictures with a quick motion, the bi-directional prediction is not performed, so that the temporal distance between the reference picture and the encoded picture in the motion compensated prediction is short, and the motion vector search range can be made narrow, and the amount of motion vector codes is reduced. For a sequence of pictures without a quick motion, bi-directional prediction is used, so that the prediction encoding is achieved with a high efficiency.

According to another aspect of the invention, there is provided an image signal encoding method performing motion compensation inter-picture prediction encoding, comprising the steps of:

encoding, as a rule, every N-th pictures by intra-picture encoding (N being an integer);

detecting a scene change in a sequence of pictures;

encoding the picture at which a scene change is detected, by intra-picture encoding;

encoding every N-th picture as counted from the picture at which the scene change is detected by intra-picture encoding; and encoding pictures which succeed said picture at which the scene change is detected, and which are other than the every N-th picture, by means other than intra-picture encoding.

The step of detecting the scene change may comprise:

detecting a value of an evaluation function representing differences between pixels in a first one of pictures in said series of pictures, and pixels in a second one of pictures in said series of pictures;

detecting a variance of said first one of the pictures;

finding that a scene change has occurred if at least one of the following condition (a) and (b) is satisfied:
  (a) $Sa > \alpha 1$
  (b) $Sb < \beta 1$ and $Sa > \gamma 1$ where Sa represents the detected value of the evaluation function, Sb represents the detected variance, $\alpha 1$, $\beta 1$ and $\gamma 1$ are predetermined threshold values, with $\alpha 1 > \gamma 1$, finding that no scene change has occurred if none of the above conditions (a) and (b) is satisfied.

By performing the intra-picture encoding for the picture at which the scene change is detected, the degradation in the picture quality can be restrained. Increase of the codes can be restrained by not performing the intra-picture encoding until the N-th picture as counted from the picture at which the scene change is detected.

The above-recited method may further comprise the steps of:

encoding, as a rule, every M-th picture (M being an integer, and M<N), by one-way prediction encoding, provided that the picture does not also fall every N-th picture;

encoding, as a rule, pictures other than every N-th and every M-th pictures by bi-directional prediction; and encoding one or more pictures preceding the picture at which a scene change is detected, by one-way prediction.

Because one or more pictures before the scene change are encoded by one-way prediction, the encoding efficiency is further improved.

According to another aspect of the invention, there is provided an image signal encoding method performing motion compensation inter-picture prediction encoding, comprising the steps of:

encoding, as a rule, every N-th pictures by intra-picture encoding (N being an integer);

encoding, as a rule, every M-th picture (M being an integer, and M<N), by one-way prediction encoding, provided that the picture does not also falls every N-th picture;

encoding, as a rule, pictures other than every N-th and every M-th pictures by bi-directional prediction;

detecting a scene change in a sequence of pictures;

encoding the first picture which would be encoded by one-way prediction if the scene change were not detected, by intra-picture encoding;

encoding, after the scene change is detected, every N-th picture as counted from said first picture, by intra-picture encoding; and encoding, after the scene change is detected, every M-th picture as counted from said first picture, by one-way prediction, provided that the every M-th picture does not also falls the every N-th picture.

The step of detecting the scene change may comprise:

detecting a value of an evaluation function representing differences between pixels in a first one of pictures in said series of pictures, and pixels in a second one of pictures in said series of pictures;

detecting a variance of said first one of the pictures;

finding that a scene change has occurred if at least one of the following condition (a) and (b) is satisfied:
  (a) $Sa > \alpha 1$
  (b) $Sb < \beta 1$ and $Sa > \gamma 1$ where Sa represents the detected value of the evaluation function, Sb represents the detected variance, $\alpha 1$, $\beta 1$ and $\gamma 1$ are predetermined threshold values, with $\alpha 1 > \gamma 1$, finding that no scene change has occurred if none of the above conditions (a) and (b) is satisfied.

The method above-recited method may further comprise the step of:

encoding one or more pictures preceding the picture at which a scene change is detected, by one-way prediction.

By performing the intra-picture encoding for the first picture after the scene change for which intra-picture encoding or one-way prediction encoding was planned, degradation in the picture quality is restrained without changing the intervals between intra-picture encodings or prediction encodings.

According to another aspect of the invention, there is provided an image signal encoding method for performing motion compensation inter-picture prediction encoding on an image signal, comprising the steps of:

subsampling the image signal for each field; and determining a motion vector using the field-subsampled image signal.

The amount of calculation for the motion vector search is reduced, and the size of the hardware can be reduced.

According to another aspect of the invention, there is provided an image signal encoding method for performing motion compensation inter-picture prediction encoding on an image signal, comprising the steps of:

subsampling the image signal for each frame; and determining a motion vector using the frame-subsampled image signal.

The amount of calculation for the motion vector search is reduced, and the size of the hardware can be reduced.

According to another aspect of the invention, there is provided an image signal encoding system for performing motion compensation inter-picture prediction encoding, comprising:

means for determining a motion vector using a picture obtained by field-subsampling;

means for determining a motion vector using a picture obtained by frame-subsampling; and means for making a selection between the motion compensation determined by the motion vector of the field subsamples and the motion compensation determined by the motion vector of the frame subsamples.

The amount of calculation for the motion vector search is reduced, and the picture quality can be reduced, because the better one of the motion compensation determined by the motion vector of the field subsamples and the motion compensation determined by the motion vector of the frame subsamples is selected.

According to another aspect of the invention, there is provided an image signal encoding system for performing motion compensation inter-picture prediction encoding, comprising:

means for subsampling field by field, and determining a motion vector using a picture obtained by the field-subsampling;

means for combining two fields of pictures obtained by said field subsampling to form a picture of a frame subsampling, and determining the motion vector using the picture of the frame subsampling; and means for making a selection between the motion compensation determined by the motion vector of the field subsamples and the motion compensation determined by the motion vector of frame subsamples.

The amount of calculation for the motion vector search is reduced, and the picture quality can be reduced, because the better one of the motion compensation determined by the motion vector of the field subsamples and the motion compensation determined by the motion vector of the frame subsamples is selected. Moreover, because the picture of the frame subsampling can be obtained using two fields of field subsampling, both the field subsampling and frame subsampling can be achieved using a simple hardware.

It may be so arranged that when a non-interlace signal is input, said selection means selects the motion compensation determined by the motion vector of frame subsamples.

For non-interlace signals, encoding can be achieved using the motion vector of frame subsamples having a better accuracy.

The subsampling may be conducted such that the picture of said field subsamples maintains interlace configuration.

Where both of the motion vector of the field and motion vector of the frame are determined, the motion vectors can be determined accurately, and the picture quality can be improved.

The subsampling may be conducted such that the picture of the field subsamples has a non-interlace configuration.

Where motion compensation between fields of different parities is conducted, the motion vector can be determined accurately, and the picture quality can be improved.

The subsampling may conducted such that the field subsamples are at positions of the scanning lines of the original picture.

The motion vector between fields of an identical parity, and the motion vector between fields of different parities both have an integer accuracy, so that when motion compensation from both fields can be conducted easily, and control over the motion compensation is facilitated.

According to another aspect of the invention, there is provided an image signal encoding system for performing motion compensation inter-picture prediction encoding, comprising:

first motion vector detecting means for determining a first motion vector using a picture obtained by subsampling;

second motion vector detecting means for determining a second motion vector with an accuracy higher than the first motion vector, by conducting a motion vector search with a half-pixel accuracy of the original picture, over a range centered on a point representing said first motion vector;

wherein said second motion vector detecting means performs interpolation over the entire range of search by the second motion vector detecting means, and the search is conducted with said half-pixel accuracy over the entire search range.

The accuracy of the second motion vector is high, and the picture quality can be improved.

According to another aspect of the invention, there is provided an image signal encoding system for performing motion compensation inter-picture prediction encoding, comprising:

first motion vector detecting means for determining a first motion vector using a picture obtained by subsampling, with decimation factors $1/K$ and $1/L$ in the horizontal and vertical directions, with K and L being natural numbers; and second motion vector detecting means for determining a second motion vector with an accuracy higher than the first motion vector, by conducting a motion vector search over a range centered on a point representing said first motion vector;

wherein said second motion vector detecting means performs interpolation over the range of search equal to wider than $\pm K$ pixels in the horizontal direction by $\pm L$ lines in the vertical direction.

The roughness of the search conducted by the first motion vector detecting means can be compensation by the second motion vector detecting means, so that the motion vector can be determined accurately, and the picture quality can be improved.

BRIEF DESCRIPTION OF THE DRAWINGS

In the accompanying drawings:

FIGS. 34(a)–(b) is a block diagram showing a motion compensated prediction circuit used in another embodiment of the invention;

FIGS. 35(a)–(b) is a block diagram showing a motion compensated prediction circuit used in another embodiment of the invention;

DETAILED DESCRIPTION OF THE PREFERRED EMBODIMENTS

Figure 1:
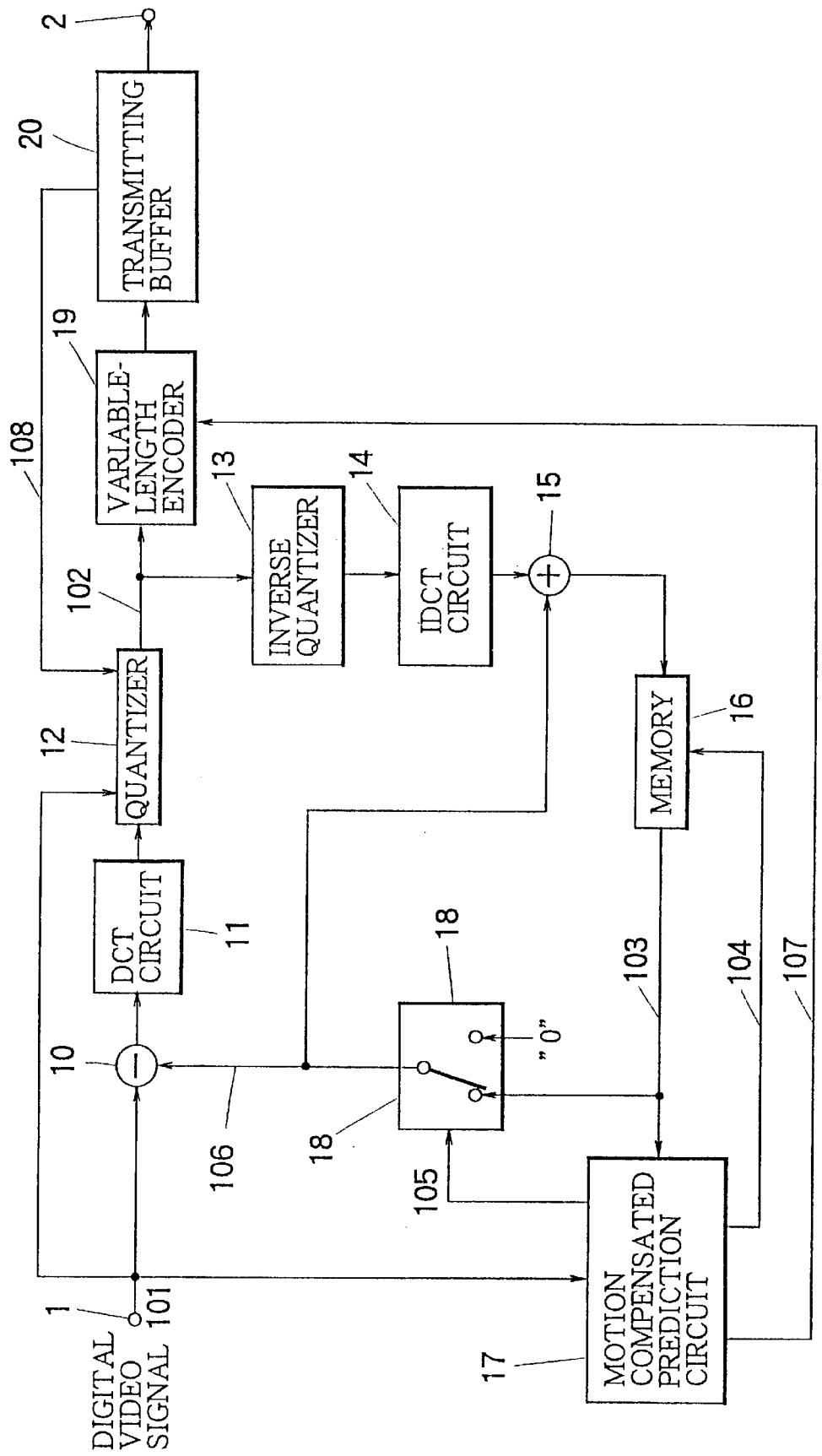
FIG. 1 is a block diagram showing an encoding system utilizing a conventional hybrid encoding method.
Figure 9:
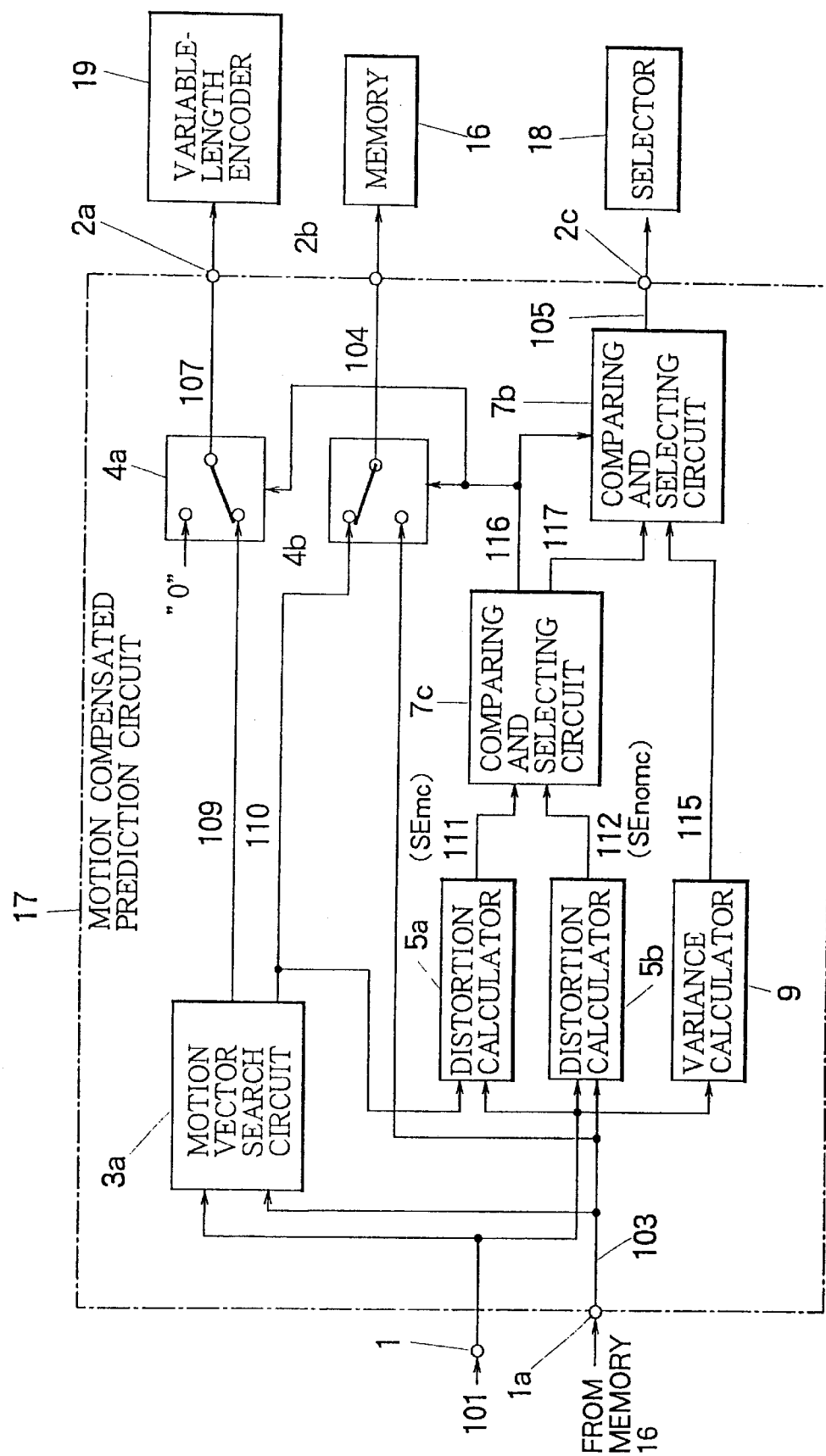
FIG. 9 is a block diagram showing a motion compensated prediction circuit used in an embodiment of the invention.

An embodiment of the invention will now be described with reference to the drawings. FIG. 9 is a block diagram showing a motion compensated prediction circuit used in an image signal encoding system according to the present invention. The general configuration of the image signal encoding system of this embodiment may be as shown in FIG. 1. The motion compensated prediction circuit 17 shown in FIG. 9 is similar to the motion compensated prediction circuit 17 shown in FIG. 2. However, in place of the comparing and selecting circuit 7a, a comparing and selecting circuit 7c is provided. The function of the comparing and selecting circuit 7c is different from the function of the comparing and selecting circuit 7a. That is, the comparing and selecting circuit 7c determines whether $$SEnomc \leq SEmc + K$$

where K is a constant not smaller than "0". When the above inequality is satisfied, the comparing and selecting circuit 7c outputs a signal indicating the NoMC mode and the distortion SEnomc. When the above inequality is not satisfied, then the comparing and selecting circuit 7c outputs a signal indicating the MC mode and the distortion SEmc.

When the selection mode 116 output from the comparing and selecting circuit 7c is the MC mode, the selector 4a outputs the motion vector 109 found by the motion vector search circuit 3a, and the selector 4b outputs the prediction images 110 selected by the motion vector search circuit 3a. When the selection mode 116 output from the comparing and selecting circuit 7c is the NoMC mode, the selector outputs the zero vector, and the selector 4b outputs the reference image.

The function for determining the distortion may be to obtain the sum of the absolute values of the differences, or to obtain the sum of the squares of the differences.

The manner of determining the distortion is next described in further detail. For the purpose of the following explanation, it is assumed, as in the description of the prior art example, that the whole picture consists of I pixels by J lines, and the input picture is represented by F(i,j) where i represents the pixel number in the horizontal direction and $0 \leq i < I$, and j represents the pixel number in the vertical direction and $0 \leq j < J$. The matching blocks are so defined as not to overlap each other. Then, each matching block is represented by F(n*16+i, m*16+j) where $0 \leq i \leq 15$, and $0 \leq j \leq 15$, and (n, m) represent the position of the matching block ((n*16, m*16) represents the left, upper corner of the matching block). The (n, m)-th matching block is denoted by:

$$M(i,j) = F(n*16+i, m*16+j) \quad (0 \leq i \leq 15, 0 \leq j \leq 15) \tag{F1}$$

The reference picture is represented by G(i,j) ($0 \leq i < I$, $0 \leq j < J$), and the vector between the input image and the reference image is represented by (H,V), the prediction image PH,V(i,j) is given by:

$$PH,V(i,j)=G(n*16+i+H, m*16+j+V) \tag{F2}$$

The distortion S is evaluated using the following evaluation function f;

$$S = \sum_{i=0}^{15}\sum_{j=0}^{15} |M(i, j) - PH, V(i, j)|$$

or $$S = \sum_{i=0}^{15}\sum_{j=0}^{15} \{M(i, j) - PH, V(i, j)\}^2$$

The motion vector search circuit 3a finds a vector (H,V) (position of the block PH,V(i,j) in the reference image relative to the matching block in the input image) which minimizes the distortion S given by the above evaluation function, and outputs this vector (H,V) as the motion vector, and outputs the block PH,V(i,j) as the prediction block.

In the above embodiment, the distortion calculators 5a and 5b determine the distortions by calculating the sum of the squares of the differences. It may however alternatively use other functions to determine the distortions. For instance, the sum of the absolute values of the differences may be used. Or a function including, as its factors, the magnitude of the differences and the magnitude of the vectors may be used.

In the above embodiment, the evaluation function used in the motion vector search circuit 3a and the distortion calculated at the distortion calculator 5a are substantially identical, the minimum value of the evaluation function calculated by the motion vector search circuit 3a may be output as a third output, and may be used in place of the distortion output from the distortion calculator 5a. In such a case, the separate distortion calculator 5a is not needed.

In the above embodiment, the constant K is set to be larger than "0". However, it may be so arranged that K may be variable within a range K≧0. The value of K may be varied to vary the degree to which the zero vector is given priority depending on the content of the picture. In particular, when a picture of a low contrast is panned, the difference in the distortion is small. In such a case, where the value of K is large, even if there is a certain motion, the zero vector is selected and the picture quality is degraded. In such a case, K is therefore set to be small.

Another embodiment of the invention will next be described with reference to FIG. 10. The general configuration of this embodiment is similar to that of the embodiment 1 of FIG. 9. The difference is that a motion vector search circuit 3b and a comparing and selecting circuit 7d are used in place of the motion vector search circuit 3a and the comparing and selecting circuit 7c.

The motion vector search circuit 3b finds the motion vector from the input image 101 and the reference image 103. That is, it finds the motion vector which minimizes the distortion for each of the matching blocks each of which consists, for example, of 16 pixels by 16 lines and into which the input picture is divided. The distortion is calculated in accordance with the predicted differences and the magnitude of the motion vector.

For the purpose of the following explanation, it is assumed, as in the description of the prior art example, that the whole picture consists of I pixels by J lines, and the input picture is represented by F(i,j) where i represents the pixel number in the horizontal direction and 0≦i<I, and j represents the pixel number in the vertical direction and 0≦j<J. The matching blocks are so defined as not to overlap each other. Then, each matching block is represented by F(n*16+i, m*16+j) where 0≦i≦15, and 0≦j≦15, and (n, m) represent the position of the matching block ((n*16, m*16) represents the left, upper corner of the matching block). The (n, m)-th matching block is denoted by:

$$M(i,j)=F(n*16+i, m*16+j)(0\leq i \leq 15,\ 0 \leq j \leq 15) \tag{F1}$$

The reference picture is represented by G(i,j) (0≦i<I, 0≦j<J), and the vector between the input image and the reference image is represented by (H,V), the prediction image PH,V(i,j) is given by:

$$PH,V(i,j)=G(n*16+i+H, m*16+j+V) \tag{F2}$$

The distortion S is evaluated using the following evaluation function f;

$$S=f(M(i,j), PH, V(i,j), H, V) \tag{F9}$$

The motion vector search circuit 3b finds a vector (H,V) which minimizes the distortion S given by the above evaluation function f in the equation (F9), and regards this vector (H,V) as the motion vector, and outputs this motion vector (H,V) and the prediction image PH,V(i,j).

The evaluation function may for example be as follows:

$$S = \sum_{i=0}^{15}\sum_{j=0}^{15}\{|M(i, j) - PH, V(i, j)|+\{|H| + |V|\}*\alpha \tag{F10}$$

where α denotes a constant (α>0), or $$S = \sum_{i=0}^{15}\sum_{j=0}^{15}\{M(i, j) - PH, V(i, j)\}^2 + \{H^2 + V^2\}*\beta \tag{F11}$$

where β denotes a constant (β>0), or $$S = \sum_{i=0}^{15}\sum_{j=0}^{15}|M(i, j) - PH, V(i, j)| + \max\{|H|, |V|\}*\gamma \tag{F12}$$

where γ denotes a constant (γ>0)

The distortion calculator 5a determines the sum SEmc of the squares of the differences between the input picture and the prediction image PH,V(i,j) output from the motion vector search circuit 3b, in accordance with the following equation.

$$SEmc = \sum_{i=0}^{15}\sum_{j=0}^{15}\{M(i, j) - PH, V(i, j)\}^2 \tag{F13}$$

The distortion calculator 5b determines the distortion SEnomc defined as the sum of the squares of differences for each matching block, from the input picture and the reference picture G(i,j), in accordance with the following equation.

$$SEnomc = \sum_{i=0}^{15} \sum_{j=0}^{15} \{M(i, j) - G(n*16 + i, m*16 + j)\}^2 \quad \text{(F14)}$$

The distortion calculated by the distortion calculator 5b is identical to the distortion with the motion vector being "0".

When SEmc<SEnomc, the comparing and selecting circuit 7d outputs a signal indicating the MC mode and the distortion SEmc. When SEmc≧SEnomc, the comparing and selecting circuit 7d outputs a signal indicating the NoMC mode and the distortion SEnomc.

When the selection mode 118 output from the comparing and selecting circuit 7d is the MC mode, the selector 4a outputs the motion vector 109 from the motion vector search circuit 3b, and the selector 4b outputs the prediction image 110 from the motion vector search circuit 3b. When the selection mode 118 output from the comparing and selecting circuit 7d is the NOMC mode, the selector 4a outputs the zero vector, and the selector 4b outputs the reference image 103.

In the above embodiment, the distortion calculators 5a and 5b determine the distortions by calculating the sum of the squares of the differences. But the distortion calculators may alternatively use other functions to determine the distortions. For instance, the sum of the absolute values of the differences may be used. Or a function taking account of the magnitude of the vectors may be used, like the motion vector search circuit 3b. Moreover, where the evaluation function used in the motion vector search circuit 3b and the distortion calculated at the distortion calculator 5a are substantially identical, the minimum value of the evaluation function calculated by the motion vector search circuit 3b may be output as a third output, and may used in place of the distortion output from the distortion calculator 5a. In such a case, the separate distortion calculator 5a is not needed.

Figure 10:
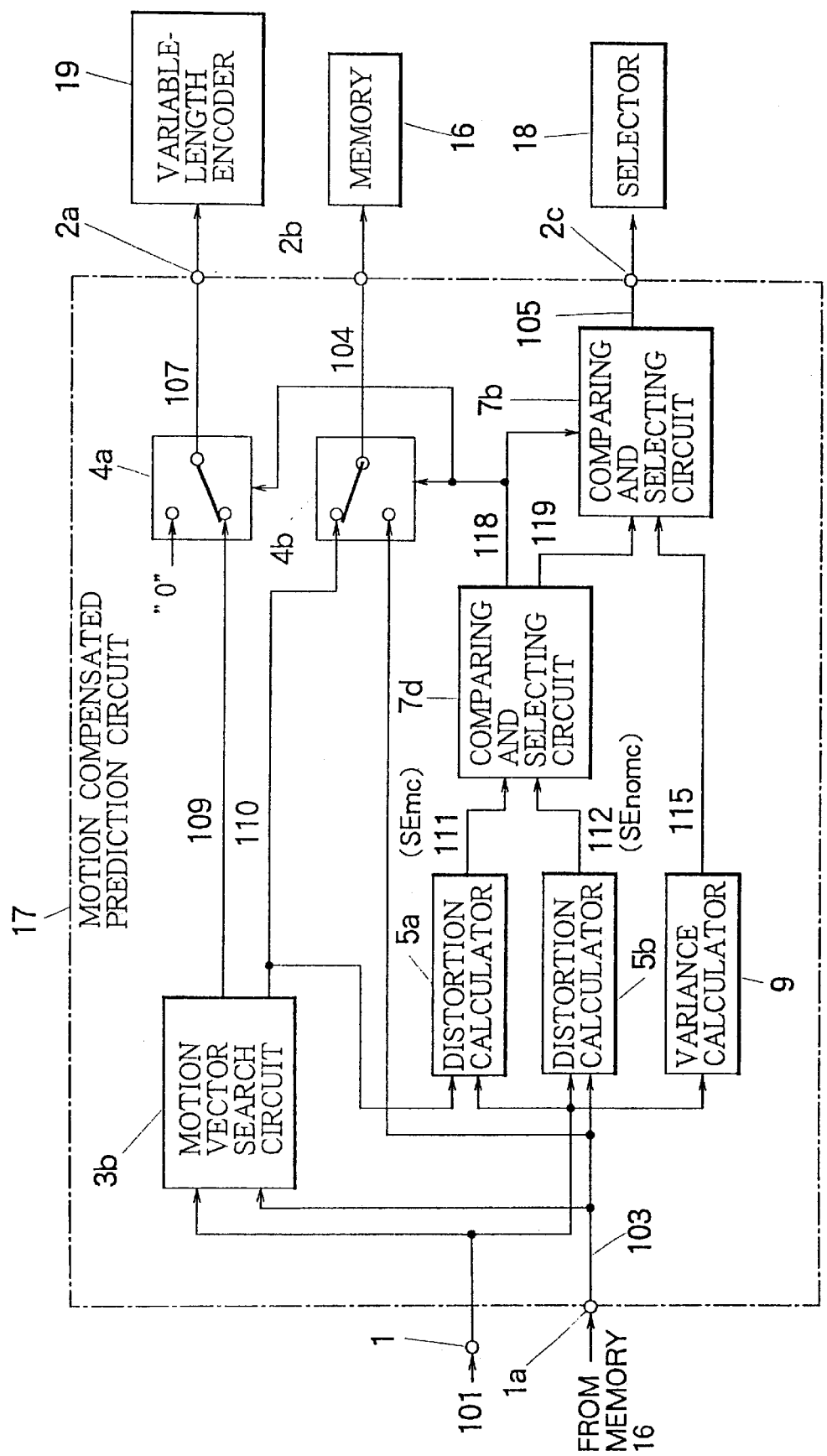
FIG. 10 is a block diagram showing a motion compensated prediction circuit used in another embodiment of the invention.

Since the motion compensated prediction circuits of the above embodiments of FIG. 9 and FIG. 10 are similar in their configuration, a motion compensated prediction circuit combining the features of the two embodiments may be easily obtained. Furthermore, the motion compensated prediction circuits of the embodiments of FIG. 9 and FIG. 10, and additionally a motion compensated prediction circuit combining the features of the embodiments of FIG. 9 and FIG. 10, may be selectively used, according to the content of the picture, with the selection being achieved by means of switches controlled by control signals produced in accordance with the content of the picture.

With ordinary pictures, the use of the evaluating function of the motion vector search circuit includes, as its factor, the magnitude of the motion vector, as in the embodiment of FIG. 10 is advantageous because, even when similar patterns are present over a wide range, unnecessarily large vectors are restrained from being regarded as the true motion vector, so that deterioration of the picture quality is prevented, and the transmission efficiency of the motion vector is improved.

By selecting the motion inter-picture prediction encoding without motion compensation is selected (as in the embodiment of FIG. 9), when the difference in the prediction distortion between the case with motion compensation and a case without motion compensation is small, the transmission efficiency is further improved.

However, with pictures having a small distortion in the block matching, such as those obtained when a low-contrast picture is panned, the motion vector search circuit is made to use an evaluating function which does not take account of the magnitude of the motion vector (like the motion vector detector 3a in FIG. 2 or FIG. 9 which determines the distortion by the sum of the absolute values of the errors, for example), so as not to give priority to the use of the zero vector, and to prevent picture quality degradation. Moreover, with such pictures, the value of K may be determined in accordance with the magnitude of the distortion of the matching block, and inter-picture prediction encoding without motion compensation may be selected if the difference in the prediction distortion between a case with motion compensation and a case without motion compensation is smaller than K. This arrangement also improves the efficiency of transmission of the motion vector.

Figure 11:
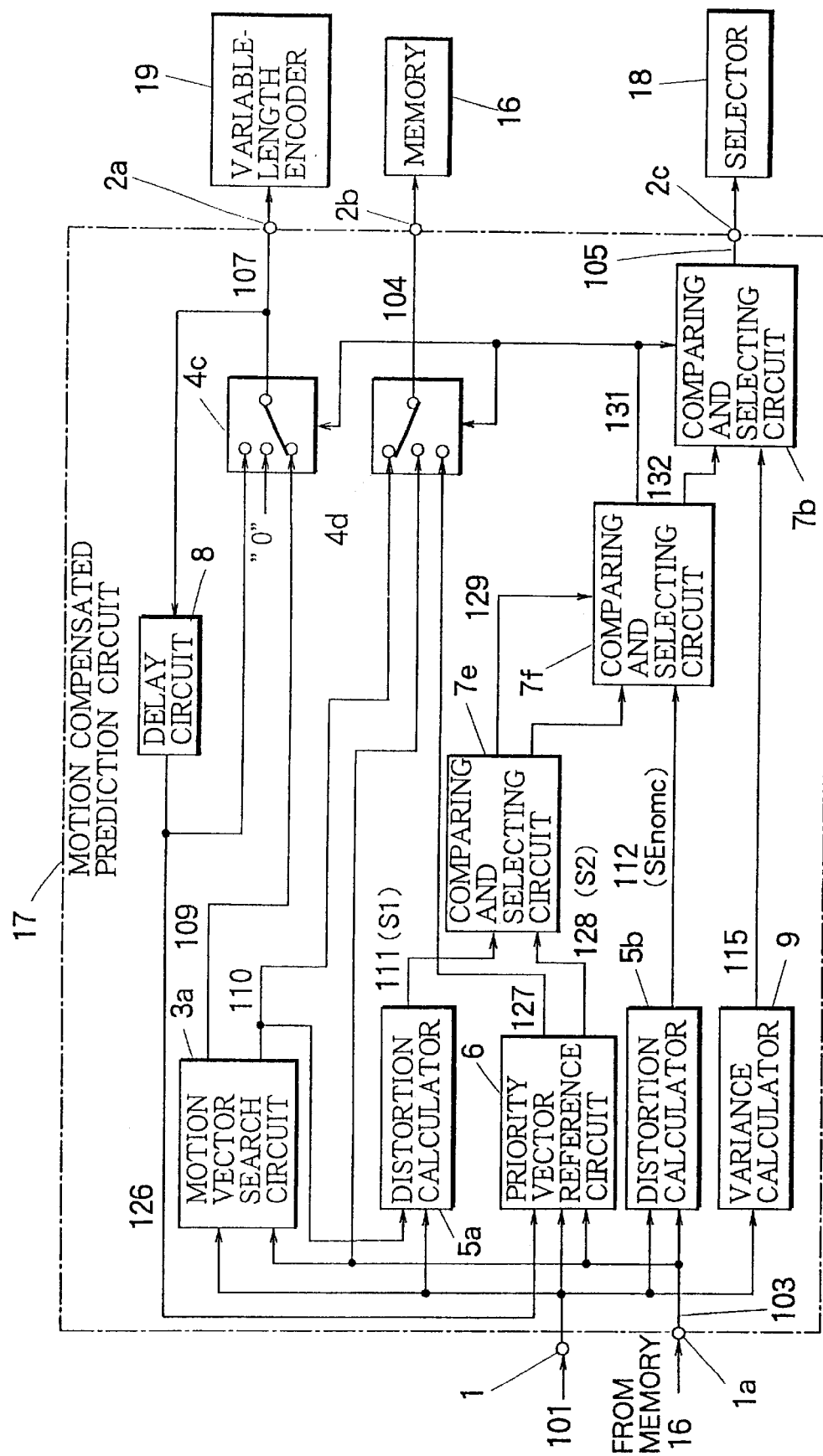
FIG. 11 is a block diagram showing a motion compensated prediction circuit used in another embodiment of the invention.

Another embodiment is shown in FIG. 11. This embodiment is similar to the embodiment of FIG. 9. Additionally provided are a priority vector reference circuit 6 and a delay circuit 8. In place of the comparing and selecting circuit 7c, a pair of comparing and selecting circuits 7e and 7f are provided. In place of the selectors 4a and 4b, selectors 4c and 4d are provided.

The selector 4c receives, in addition to the output 109 of the motion vector search circuit 3a, and the zero vector, an output 126 of the delay circuit 8, whose input is connected to the output of the selector 4c. The output 126 of the delay circuit 8 is also supplied the priority vector reference circuit 6, which also receives the input image signal 101, and the reference image 103. The output of the priority vector reference circuit 127 is supplied to a third input of the selector 4d, which also receives the output 110 of the motion vector search circuit 3a and the reference image 103. The comparing and selecting circuit 7e receives a second output 128 (also denoted by S2) from the priority vector reference circuit 6 and the output 111 (also denoted by S1) of the distortion calculator 5a. The comparing and selecting circuit 7f receives the outputs 129 and 130 (SEmc) from the comparing and selecting circuit 7e and the output 112 (SEnomc) from the distortion calculator 5b.

The priority vector reference circuit 6 produces a prediction image 127 which would result if the vector used for the preceding matching block is used as the motion vector, and calculates the distortion 128 (S2) defined as the sum of the squares of the differences between the prediction image 127 and the input image 101.

When S2≦S1+K (K is a constant, and K≧0), the comparing and selecting circuit 7e outputs a signal 129 indicating the priority MC mode, and a distortion SEmc which is given by SEmc=S2

When S2>S1+K, the comparing and selecting circuit 7e outputs a signal 129 indicating the ordinary MC mode, and a distortion SEmc which is given by:

SEmc=S1

When SEmc<SEnomc, the comparing and selecting circuit 7f outputs the signal indicating the MC mode from the comparing and selecting circuit 7e, and the distortion SEmc. When SEmc≧SEnomc, the comparing and selecting circuit 7f outputs the signal indicating the NoMC mode, and the distortion SEnomc.

When the selection mode 131 from the comparing and selecting circuit 7f is the normal MC mode, the selector 4c outputs the motion vector 109 from the motion vector search circuit 3a, and the selector 4d outputs the prediction picture 110 from the motion vector search circuit 3a. When the selection mode 131 from the comparing and selecting circuit 7f is the priority MC mode, the selector 4c outputs the motion vector 126, which is the vector used for the preceding matching block, from the delay circuit 8, and the selector 4d outputs prediction picture 127 from the priority vector reference circuit 6. When the selection mode 131 from the comparing and selecting circuit 7f is the NOMC mode, the selector 4c outputs the zero vector, and the selector 4d outputs reference picture 103.

The comparing and selecting circuit 7b compares the distortion 132 from the comparing and selecting circuit 7f, and the variance 115 from the variance calculator 9, and selectively outputs the intra mode for performing intra-picture encoding, or the selection mode out from the comparing and selecting circuit 7f.

The modifications described in connection with the embodiment of FIG. 9 can also be applied to the embodiment of FIG. 11. Moreover, the evaluation function for determining the motion vector in the motion vector search circuit 3a may be a function containing, as its factors, the magnitude of the difference and the magnitude of the vector.

Furthermore, in the embodiment of FIG. 11, the motion vector in the immediately preceding matching block is used as the priority vector. However, the priority vector may be other than such a motion vector in the immediately preceding matching block, and may, for instance, be one or more of other adjacent matching blocks, such as a matching block directly above, or obliquely above the matching block in question, and the matching block to the left of the matching block, and the matching block at the same position in the display screen in the preceding field or frame.

In the embodiment of FIG. 11, the constant K used in the comparing and selecting circuit 7e is set to be larger than "0". However, it may be so arranged that K may be a variable which can assume a negative value. The value of K may be varied to vary the degree to which the priority vector is given priority depending on the content of the picture. In particular, when a number of small objects are moving throughout the screen, it is better not to select the priority vector. In such a case, K is set to be a negative value.

Another embodiment will next be described with reference to FIG. 12. This embodiment is similar to the embodiment of FIG. 9. However, in place of the motion vector search circuit 3a, a motion vector search circuit 3c is provided. A delay circuit 8, similar to the delay circuit 8 in FIG. 11 is provided. Its input is connected to the output of the selector 4a, and its output 126 is connected to the motion vector search circuit 3c.

The motion vector search circuit 3c finds the motion vector from the input picture 101 and the reference picture 103. That is, it finds the motion vector which minimizes the distortion for each of the matching blocks each of which consists for example of 16 pixels by 16 lines and into which the input picture is divided. The distortion is calculated in accordance with the predicted differences and distance from the motion vector for the immediately preceding matching block.

For the purpose of the following explanation, it is assumed, as in the embodiment of FIG. 9, that the whole picture consists of I pixels by J lines, and the input picture is represented by F(i,j) where i represents the pixel number in the horizontal direction and $0 \leq i < I$, and j represents the line number (pixel number in the vertical direction) and $0 \leq j < J$. The matching block do not overlap each other. Then, each matching block is represented by F(n*16+i, m*16+j) where $0 \leq i \leq 15$, and $0 \leq j \leq 15$, and (n, m) represent the position of the matching block ((n*16, m*16) represents the left, upper corner of the matching block). The (n, m)-th matching block is denoted by:

$$M(i,j)=F(n*16+i,m*16+j)(0 \leq i \leq 15, 0 \leq j \leq 15) \quad (F1)$$

The reference picture is represented by G(i,j) ($0 \leq i \leq I$, $0 \leq J$), and the vector between the input picture and the reference picture is represented by (H,V), the prediction picture PH,V(i,j) is given by:

$$PH,V(i,j)=G(n*16+i+H,m*16+j+V) \quad (F2)$$

The motion vector for the immediately preceding matching block is denoted by (Hp,Vp). Then, the distortion S is evaluated using the following evaluation function f;

$$S=f(M(i,j), PH,V(i,j), H-Hp, V-Vp) \quad (F15)$$

The motion vector search circuit 3c finds a vector (H,V) which minimizes the distortion S given by the above evaluation function f in the equation (F15), and regards this vector (H,V) as the motion vector, and outputs this motion vector (H,V) and the prediction picture PH,V(i,j).

The evaluation function may for example be as follows:

$$S = \sum_{i=0}^{15} \sum_{j=0}^{15} |M(i, j) - PH, V(i, j)| + \{|H - Hp| + |V - Vp|\} * \alpha \quad (F16)$$

where α denotes a constant (α>0), or $$S = \sum_{i=0}^{15} \sum_{j=0}^{15} \{M(i, j) - PH, V(i, j)\}^2 + \{(H - Hp)^2 + (V - Vp)^2\} * \beta \quad (F17)$$

where β denotes a constant (β>0), or $$S = \sum_{i=0}^{15} \sum_{j=0}^{15} |M(i, j) - PH, V(i, j)| + \max\{|H - Hp|, |V - Vp|\} * \gamma \quad (F18)$$

where γ denotes a constant (γ>0)

The distortion calculator 5a determines the sum SEmc of the squares of the differences between the prediction picture PH,V(i,j) and the input picture output from the motion vector search circuit 3c, in accordance with the following equation.

$$SEmc = \sum_{i=0}^{15} \sum_{j=0}^{15} \{M(i, j) - PH, V(i, j)\}^2 \quad (F13)$$

The distortion calculator 5b determines the distortion SEnomc defined as the sum of the squares of differences for each matching block, from the input picture and the reference picture G(i,j), in accordance with the following equation.

$$SEnomc = \sum_{i=0}^{15} \sum_{j=0}^{15} \{M(i, j) - G(n*16 + i, m*16 + j)\}^2 \quad (F14)$$

The distortion calculated by the distortion calculator 5b is identical to the distortion with the motion vector being "0".

When SEmc<SEnomc, the comparing and selecting circuit 7c outputs a signal 116 indicating the MC mode and the distortion SEmc. When SEmc≧SEnomc, the comparing and selecting circuit 7c outputs a signal 116 indicating the NoMC mode and the distortion SEnomc.

When the selection mode 116 output from the comparing and selecting circuit 7c is the MC mode, the selector 4a outputs the motion vector 109 from the motion vector search circuit 3c, and the selector 4b outputs the prediction picture 110 from the motion vector search circuit 3c. When the selection mode 116 output from the comparing and selecting circuit 7c is the NOMC mode, the selector 4a outputs the zero vector, and the selector 4b outputs the reference picture 103.

The modifications described with reference to the embodiments of FIG. 9, FIG. 10, and FIG. 11 are applicable to the embodiment of FIG. 12.

Moreover, in the embodiment of FIG. 11, the evaluating function in the motion vector search circuit 3c contains, as its factor, the distance from the motion vector for the immediately preceding matching block. However, the motion vector contained in the evaluation function may be other than such a motion vector for the immediately preceding matching block, and may, for instance, be a motion vector for one or more of other adjacent matching blocks, such as a matching block directly above, or obliquely above the matching block in question, and the matching block to the left of the matching block, and the matching block at the same position in the display screen in the preceding field or frame.

Figure 12:
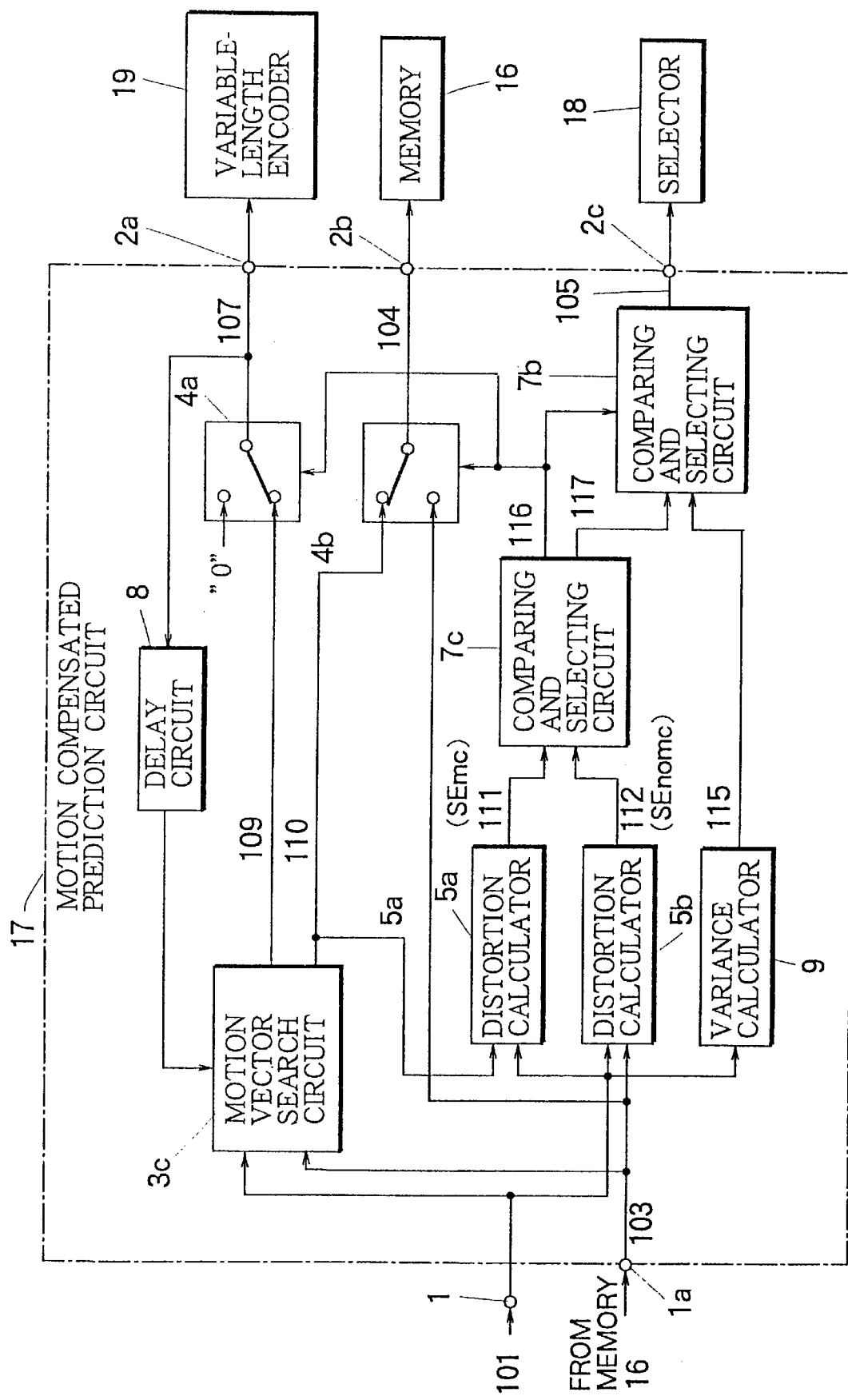
FIG. 12 is a block diagram showing a motion compensated prediction circuit used in another embodiment of the invention.

A motion compensated prediction circuit combining the features of the embodiment of FIG. 11 and the embodiment of FIG. 12 may be used. In particular, where it is difficult, from the viewpoint of the circuit configuration, or from the viewpoint of the signal processing time, for the evaluating function of the motion vector search circuit 3c to contain, as its factors, a given number of motion vectors, less than such a given number of motion vectors may be contained in the evaluating function, and the remaining motion vectors may be used as priority vectors, and evaluation may be made by means of a plurality of priority vector reference circuits. Where the evaluating function of the motion vector search circuit 3c is not equal nor substantially equal to the distortion calculated by the distortion calculator 5a, a priority vector reference circuit may be added to improve transmission efficiency of the motion vectors.

Figure 13:
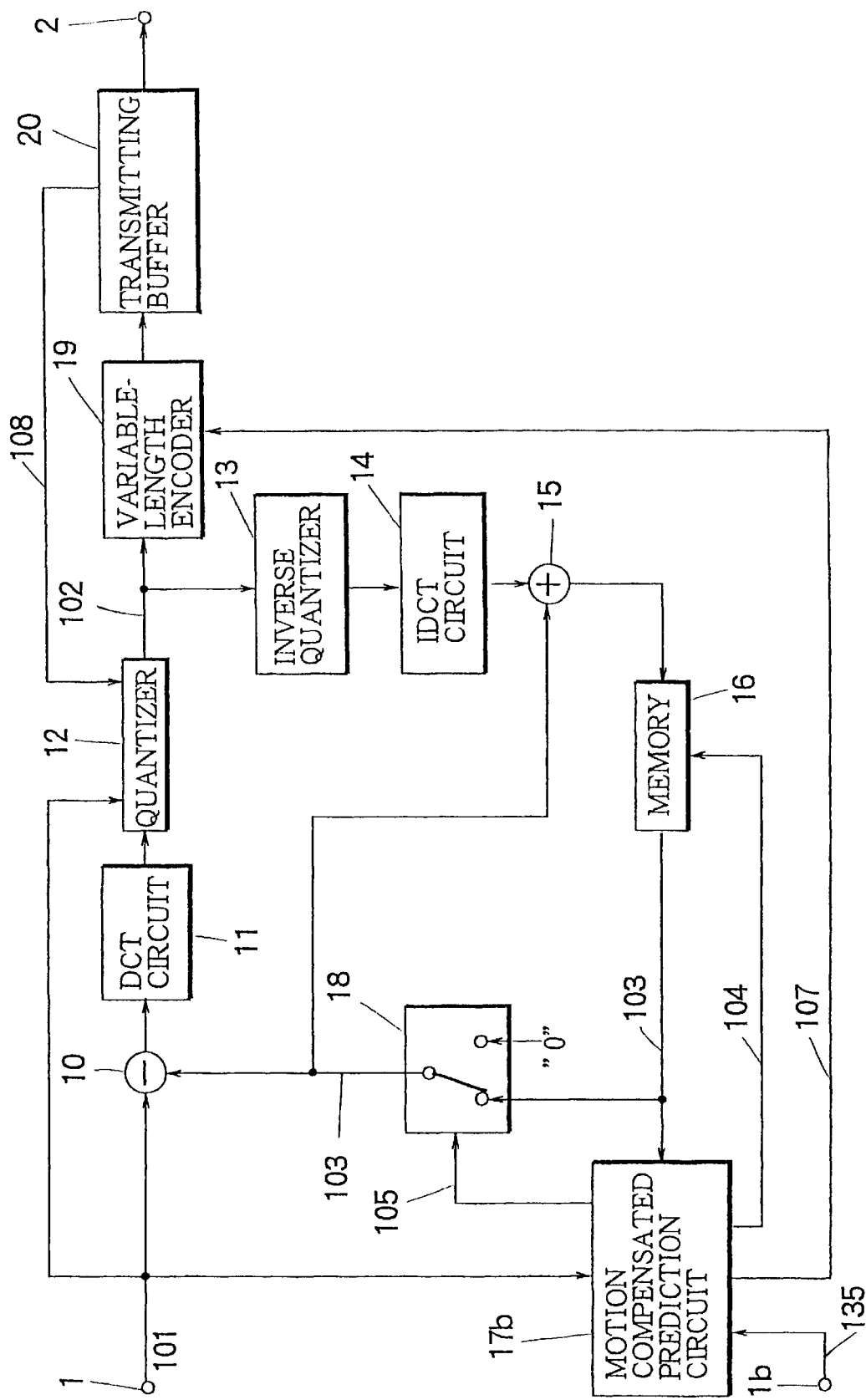
FIG. 13 is a block diagram showing an image signal encoding system of another embodiment of the invention.

Another embodiment will next be described with reference to FIG. 13, in which the reference numerals identical to those in FIG. 1 denote identical or corresponding elements. The configuration of the embodiment of FIG. 13 is similar to the configuration of FIG. 1. A difference is that the motion compensated prediction circuit 17 is replaced by a motion compensated prediction circuit 17b, which is similar to the motion compensated prediction circuit 17, but has an additional input, at which it receives an offset setting signal 135 via a terminal 1b.

Figure 14:
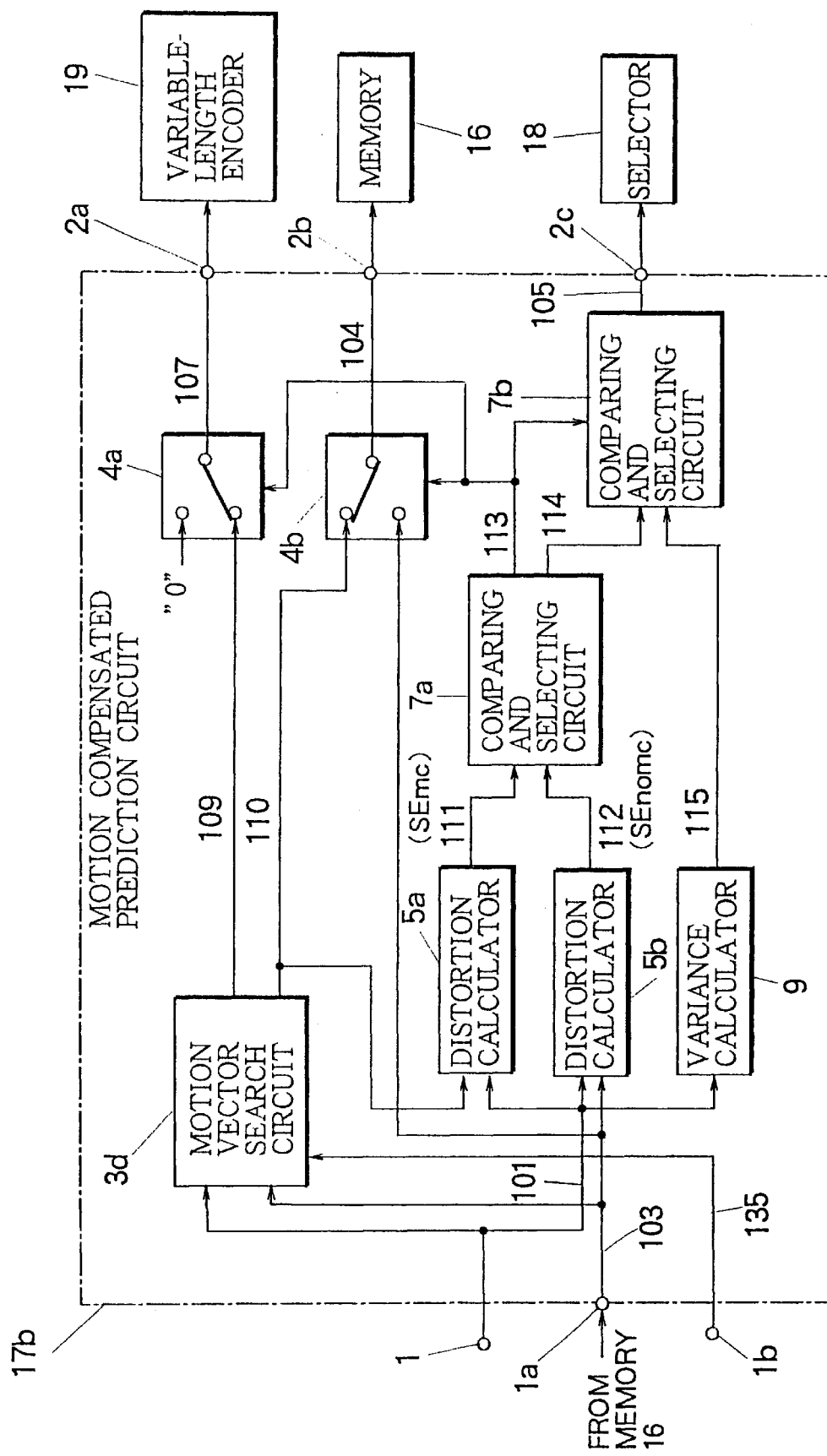
FIG. 14 is a block diagram showing a motion compensated prediction circuit used in the encoding system of FIG. 13.

An example of the motion compensated prediction circuit 17b is shown in FIG. 14, in which reference numerals identical to those in FIG. 9 denote identical or corresponding elements. The configuration shown in FIG. 14 is similar to that of FIG. 2. However, in place of the motion vector search circuit 3a, a motion vector search circuit 3d is provided. It is similar to the motion vector search circuit 3a, but has a third input, at which it receives the offset setting signal 135. The offset setting signal 135 is supplied from an external equipment, such as a computer (e.g., a personal computer), to which a command for the offset value is input manually, on the basis of experiences, or from a rotary switch which gives different values depending on its rotary position.

Figure 15:
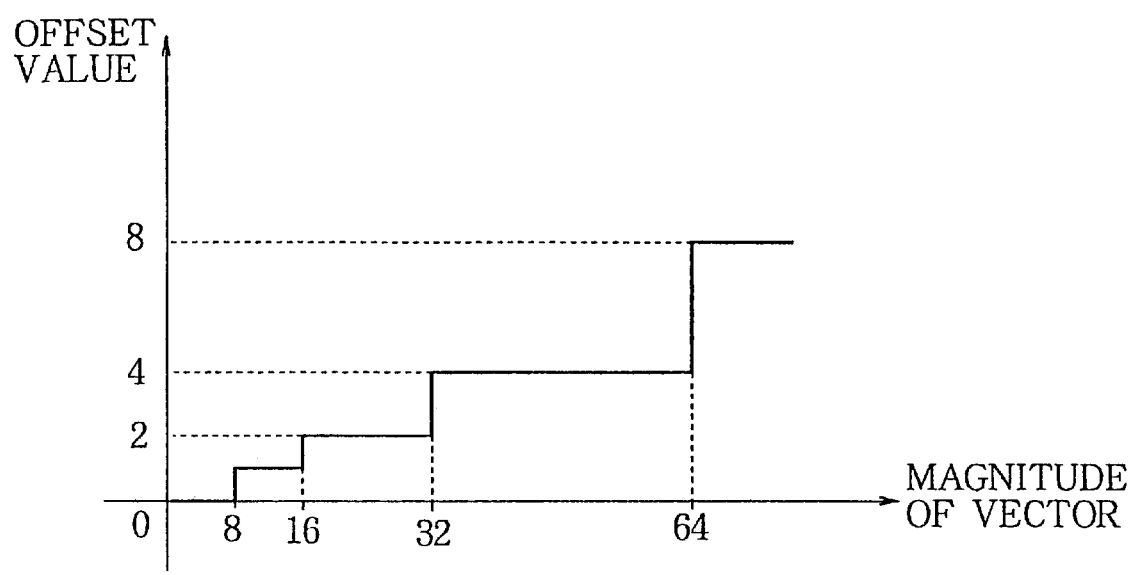
FIG. 15 is a diagram showing the offset value against the magnitude of the vector, used in another embodiment of the invention.

The offset setting signal 135 indicates an offset value C(α) to be used, which is a function of the magnitude α of the vector. An example of the function is shown in FIG. 15. As shown, the value of the offset value C(α) is 0, 1, 2, 4, and 8, respectively, when the magnitude of the vector is less than 8, not less than 8 and less than 16, not less than 16 and less than 32, not less than 32 and less than 64, and not less than 64.

The operation of the motion compensated prediction circuit 17b will next be described with reference to FIG. 14. The motion vector search circuit 3d determines or finds the motion vector in accordance with the input picture 101 and the reference picture 103. In accordance with the offset setting signal 135 input via the input terminal 1b, the offset value is set according to the magnitude of each vector, and the vector which minimizes the sum of the distortion and the offset value is selected as the motion vector, and the motion vector and the prediction picture are output.

For the purpose of the following explanation, it is assumed, as in the description of the embodiment of FIG. 10, that the whole picture consists of I pixels by J lines, and the input picture is represented by F(i,j) where i represents the pixel number in the horizontal direction and $0 \leq i < I$, and j represents the line number (pixel number in the vertical direction) and $0 \leq j < J$. The matching block do not overlap each other. Then, each matching block is represented by F(n*16+i, m*16+j) where $0 \leq i \leq 15$, and $0 \leq j \leq 15$, and (n, m) represent the position of the matching block ((n*16, m*16) represents the left, upper corner of the matching block). The (n, m)-th matching block is denoted by:

$$M(i,j)=F(n*16+i, m*16+j) (0 \leq i \leq 15, 0 \leq j \leq 15) \tag{F1}$$

The reference picture is represented by G(i,j) ($0 \leq i \leq I$, $0 \leq J$), and the vector between the input picture and the reference picture is represented by (H,V), the prediction picture PH,V(i,j) is given by:

$$PH,V(i,j)=G(n*16+i+H, m*16+j+V) \tag{F2}$$

The distortion S is evaluated using the following evaluation function:

$$S = \sum_{i=0}^{15} \sum_{j=0}^{15} |M(i, j) - PH, V(i, j)| \tag{F3}$$

The magnitude D(H,V) of the vector (H,V) is determined in accordance with $$D(H,V)=\max \{|H|, |V|\} \tag{F19}$$

The offset value set in accordance with the offset value setting signal 135 is added to the distortion S, to obtain the offset distortion S1, i.e., $$S1=S+C(D(H,V)) \tag{F20}$$

The motion vector search circuit 3d finds a vector (H,V) which minimizes the distortion S1 given by the above evaluation function (F20), and regards this vector H,V as the motion vector, and outputs this motion vector (H,V) and the prediction picture PH,V(i,j).

The operation of the distortion calculators 5a and 5b, the comparing and selecting circuits 7a and 7b, the variance calculator 9, the selectors 4a and 4b, and the variable-length encoder 19 is similar to that described with reference to the prior art example of FIG. 1 to FIG. 4.

In the embodiment of FIG. 13, the motion vector search circuit 3d determines the magnitude D(H,V) of the vector (H,V) in accordance with the equation (F19). The definition of the magnitude of the vector may alternatively be:

$$D(H,V)=|H|+|V|$$

or $$D(H,V)=|H|^2+|V|^2$$

or $$D(H,V)=\{|H|^2+|V|^2\}^{1/2}$$

In the above embodiment, the offset value C(α) for the vector having a magnitude α is set as illustrated in FIG. 15. As an alternative, the offset value may be determined in accordance with:

$$C(\alpha)=\alpha*k$$

where k is a constant.

Moreover, offset value may be determined on the basis of the one of the magnitude of each of the the horizontal component |H| and the vertical component |V| of the vector (H,V). For instance, the offset value may be determined as follows:

If |H|>63 then C'((H,V)=γ

If |V|>31 then C'((H,V)=δ

Otherwise, C'(H,V)=γ/(64* |H|+δ/32* |V|

Modifications described in connection with the preceding embodiments, in particular the embodiment of FIG. 9 are applicable to the embodiment of FIG. 13 to FIG. 15.

The offset value C(α) used in the embodiment of FIG. 13 to FIG. 15 may be variable. In particular, for pictures with small motions, when the vector exceeds a predetermined value β, the offset value may be set to be a value larger than the range of values which the distortion S can assume. In this way, the range of the motion vector can be effectively restrained within the range of β.

For instance, where the (n, m)-th matching block is denoted by the formula (F1), and the prediction picture PH,V(i,j) is given by the formula (F2), and the distortion S is evaluated by the formula (F3), as in the above embodiment, the maximum value of S is 256 times the range of the input image signal. That is, if the input image signal is represented by 8 bits, the maximum value of S is 65536. Accordingly, if

C(α)=65537 for α, satisfying α≧β, and

C(αφ)=0 for

α=0

Then, the offset distortion S1 is always

S1=S+C(D(H,V))=S+65537>65536 for a vector (H,V) having a magnitude greater than β.

The offset distortion S1 for a zero vector is S1=S+C(D (0,0))=S≦65536

Accordingly, the motion vector search circuit 3d will not select a vector having a magnitude greater than β.

The same effects are obtained if the offset value C(α) is made greater than 65537. That is, the maximum value of the offset value C(α) need not be larger than 65537, i.e., it may be fixed at 65537.

By setting a maximum value for the offset value C(α), the range of the motion vector search can be varied without changing the hardware.

Figure 16:
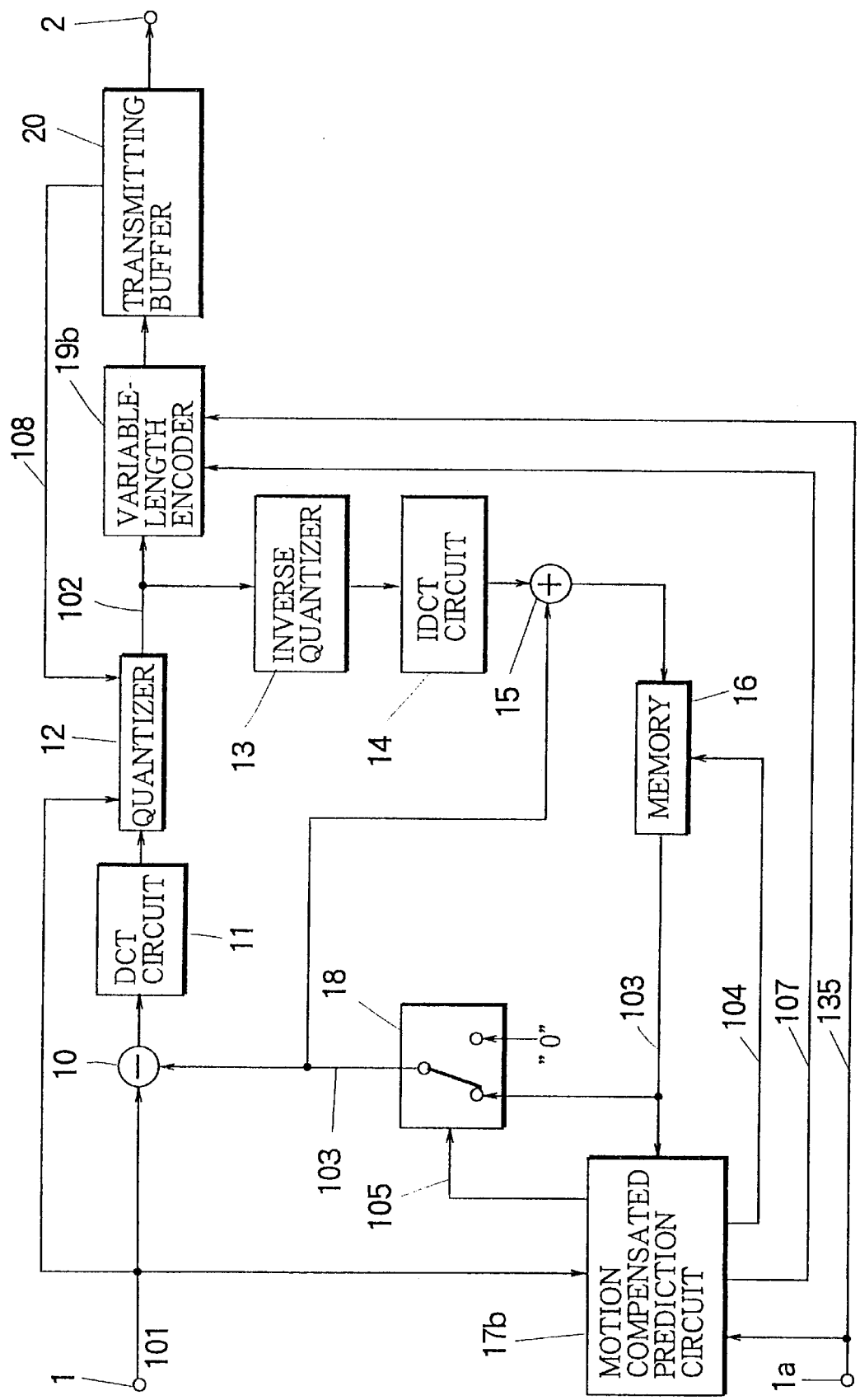
FIG. 16 is a block diagram showing an image signal encoding system of another embodiment.

FIG. 16 is a block diagram showing the image signal encoding system of another embodiment. Reference numerals identical to those in FIG. 13 denote identical or corresponding elements. The configuration of FIG. 16 is similar to that of FIG. 13. A difference is that in place of the variable-length encoder 19 of FIG. 13, a variable-length encoder 19b having a third input is provided, and the offset setting signal 135 is also applied to the third input of the variable-length encoder 19b.

Figure 17:
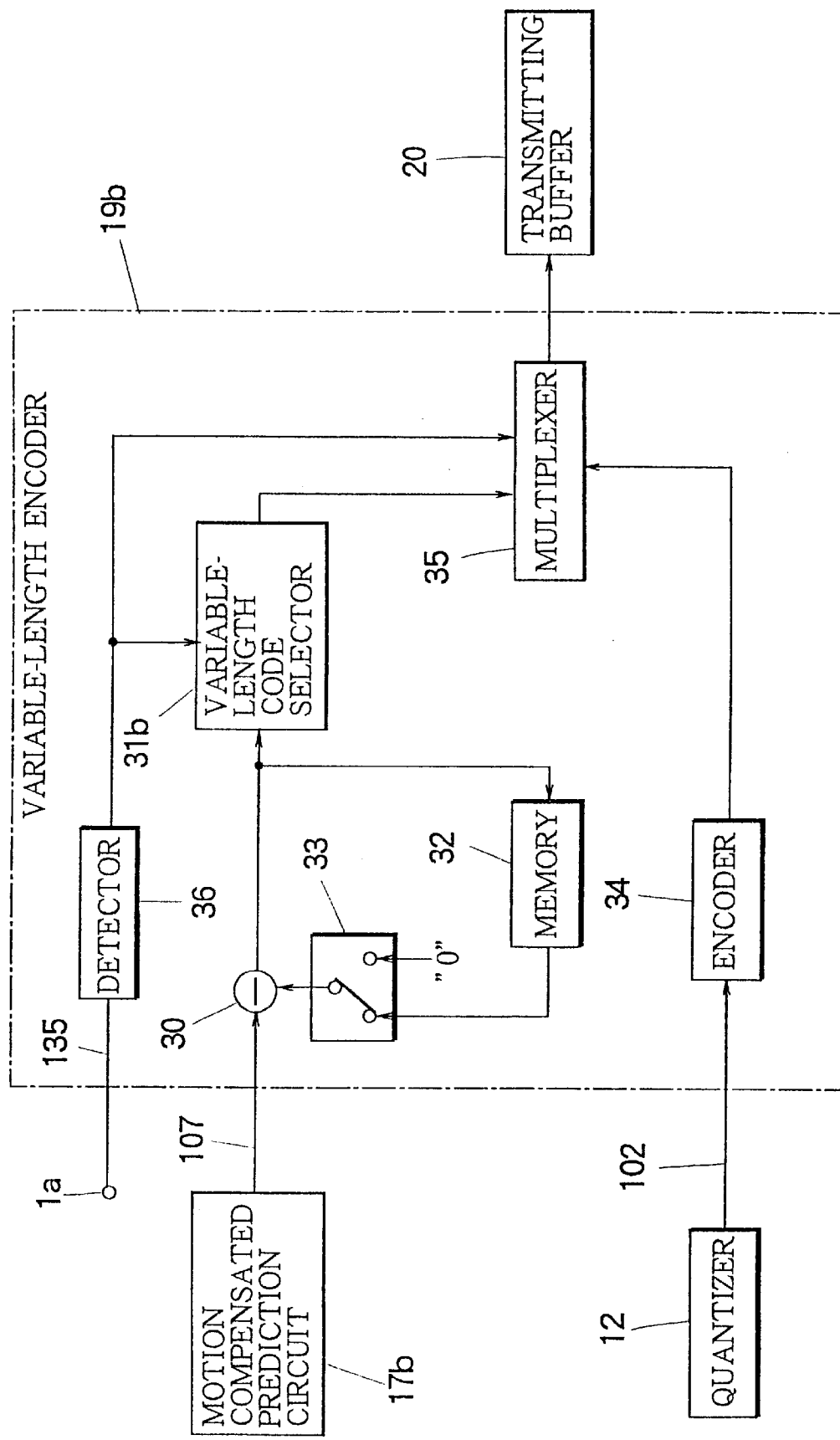
FIG. 17 is a block diagram showing an example of variable-length encoder used in the embodiment of FIG. 16.

FIG. 17 shows an example of the variable-length encoder 19b. Reference numerals identical to those in FIG. 2 denote identical or corresponding elements. The configuration of FIG. 17 is similar to that of the variable-length encoder 19 shown in FIG. 2, but a detector 36 is additionally provided, and its input is connected to receive the offset setting signal 135, and its output is connected to a second input of a variable-length code selector 31b, used in place of the variable-length code selector 31, and a third input of the multiplexer 35.

If the arrangement is such that when the vector is larger than a predetermined value β, the offset value is set to a value larger than the range of values which the motion vector can assume, as described above, the vector larger than the predetermined value β will not be selected for the motion vector (i.e., the value of the motion vector is limited to the range defined by β). By setting the value of β at a selected one of powers of 2, such as 8, 16, 32, and 64, the motion vector range may be limited, and the code used for expressing the motion vector may be selected from among codes of different lengths.

The detector 36 detects the limit of the range of the motion vector from the offset value C(α) defined by the offset setting signal 135, and outputs the limits of the range of the motion vector. The difference between the motion vector 107 for each matching block from the motion compensated prediction circuit 17b and the motion vector for the preceding matching block is determined, and a variable-length code corresponding to the difference vector is output from the variable-length code selector 31b.

The variable-length code selector 31b selects the code of the difference vector in accordance with the range of the motion vector output from the detector 36. For instance, if the motion vector were transmitted by fixed-length codes, and the range of the vector is ±7 pixels in the horizontal direction and ±7 lines in the vertical direction, only 4 bits are required for expressing each of the horizontal and vertical components. If the range of the vector is ±63 pixels in the horizontal direction and ±63 lines in the vertical direction, then 7 bits are required for expressing each of the horizontal and vertical components.

This is also the case when the motion vector is transmitted by variable-length codes, and the number of bits required for expressing the vector is smaller as the range of the motion vector is narrower.

The variable-length code selector therefore selects one of the codes having a length suitable for or matching the range of the motion vector limited by the value of β, which is supplied from the detector 36, and outputs the codes expressing the motion vector.

The output 102 of the quantizer 12 is variable-length-encoded at an encoder 34. An output of the encoder 34, an output of the variable-length code selector 31b, and an output of the detector 36 are multiplexed at a multiplexer 35, and supplied to the transmitting buffer 20.

Figure 2:
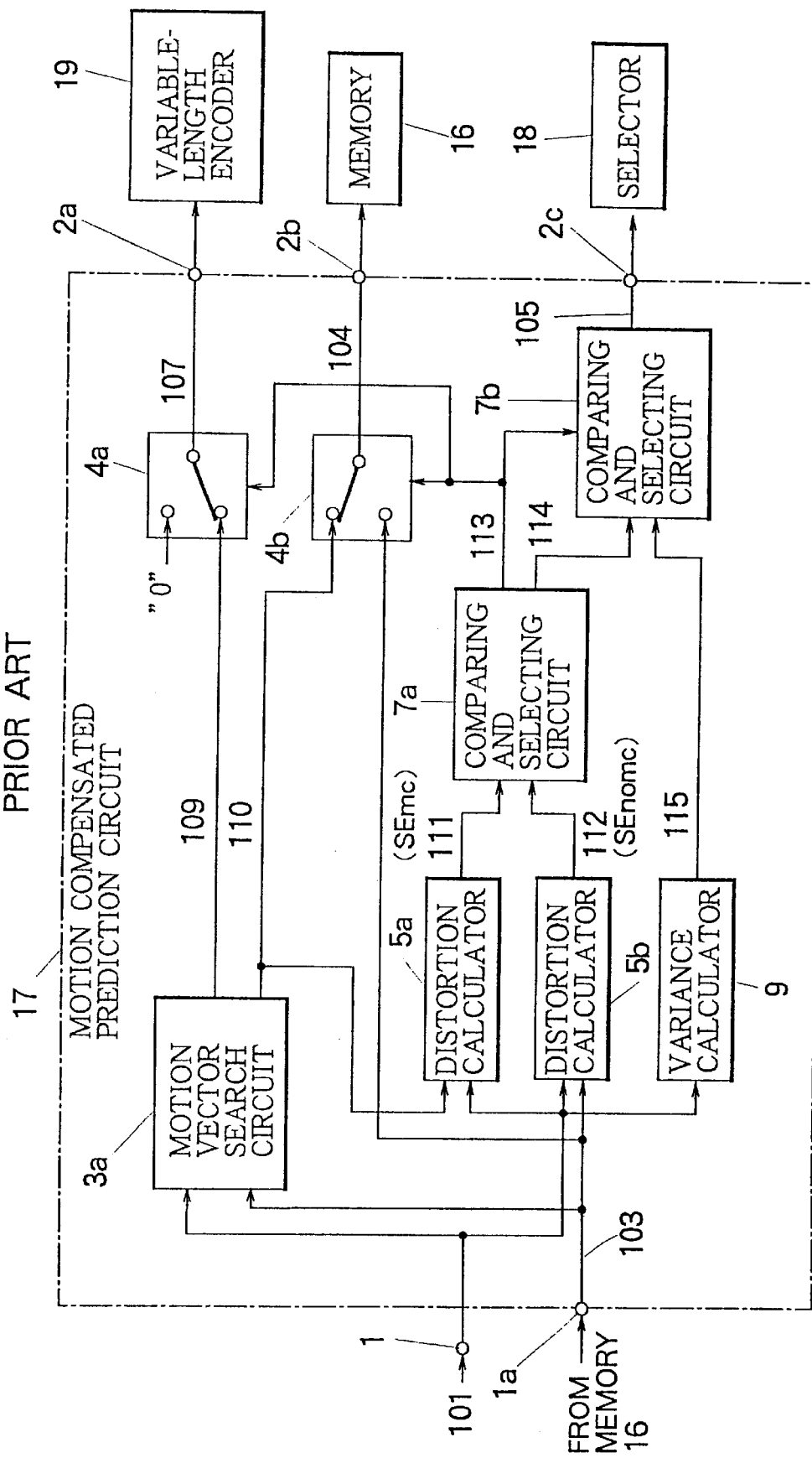
FIG. 2 is a block diagram showing an example of configuration of a conventional motion compensated prediction circuit.
Figure 3:
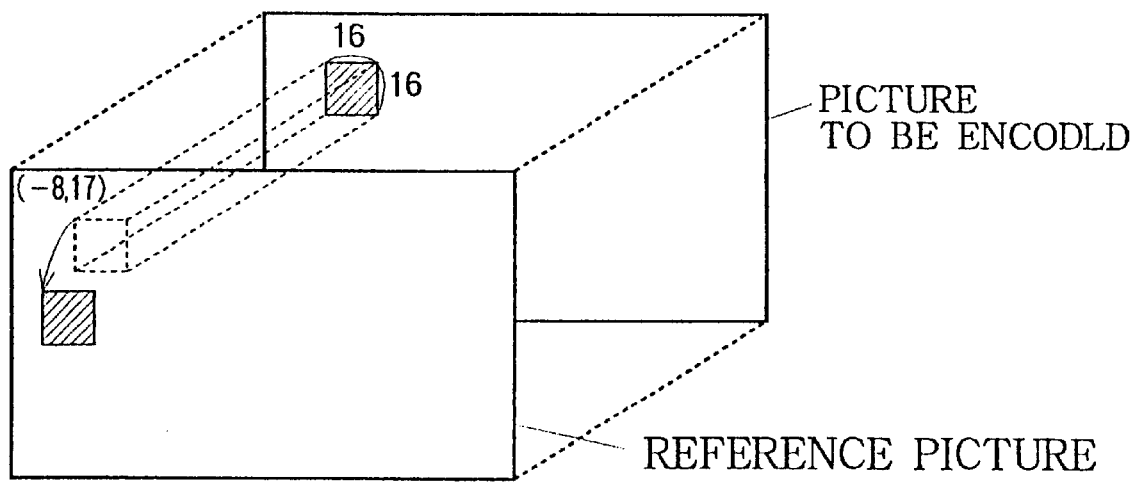
FIG. 3 is a schematic diagram showing motion compensated prediction.
Figure 4:
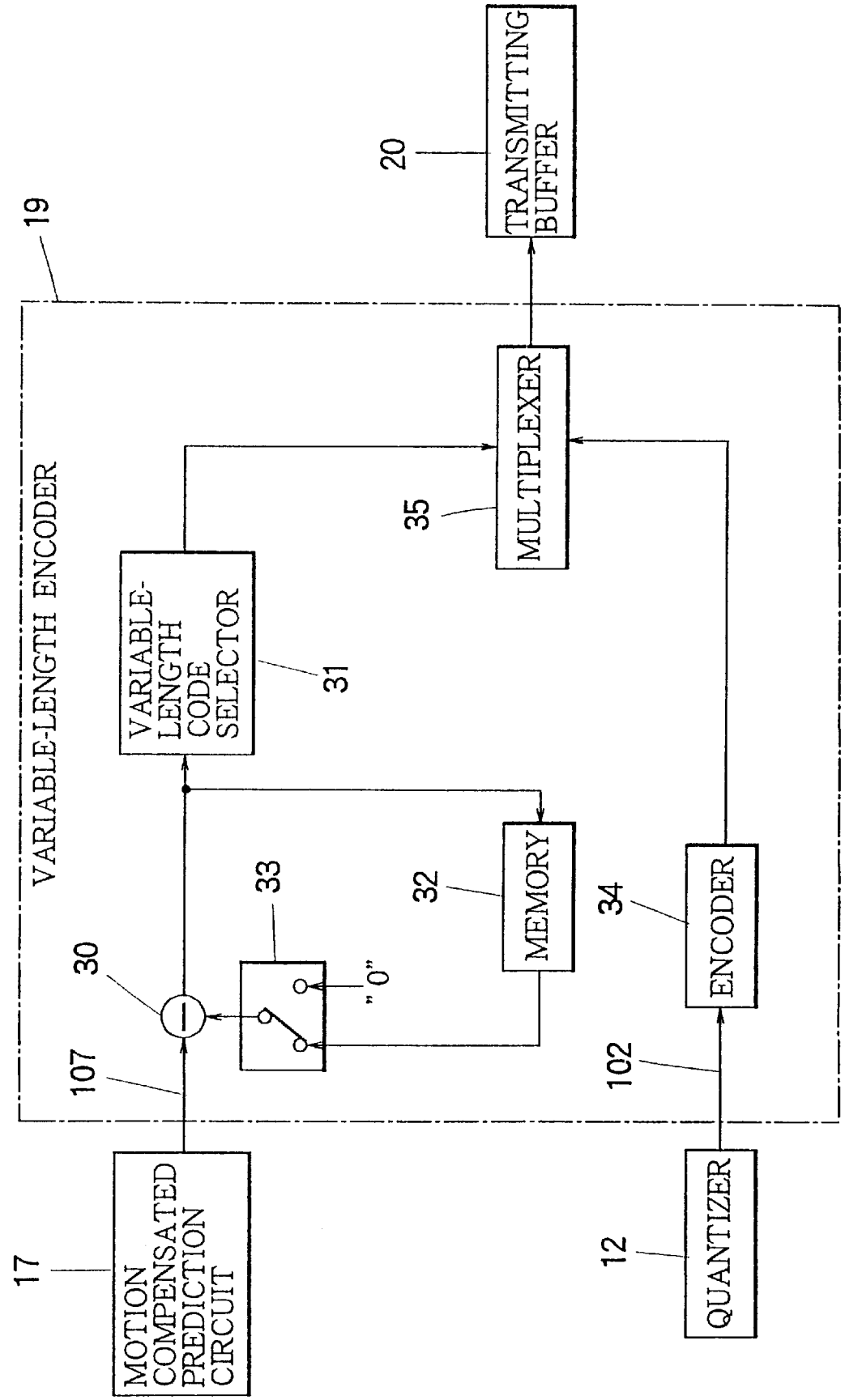
FIG. 4 is a block diagram showing an example of variable-length encoder.

The operation of the rest of the variable-length encoder 19b is similar to that of the variable-length encoder shown in FIG. 2.

The operation of the rest of the system is similar to that described with reference to the embodiment of FIG. 13 to FIG. 15.

Figure 18:
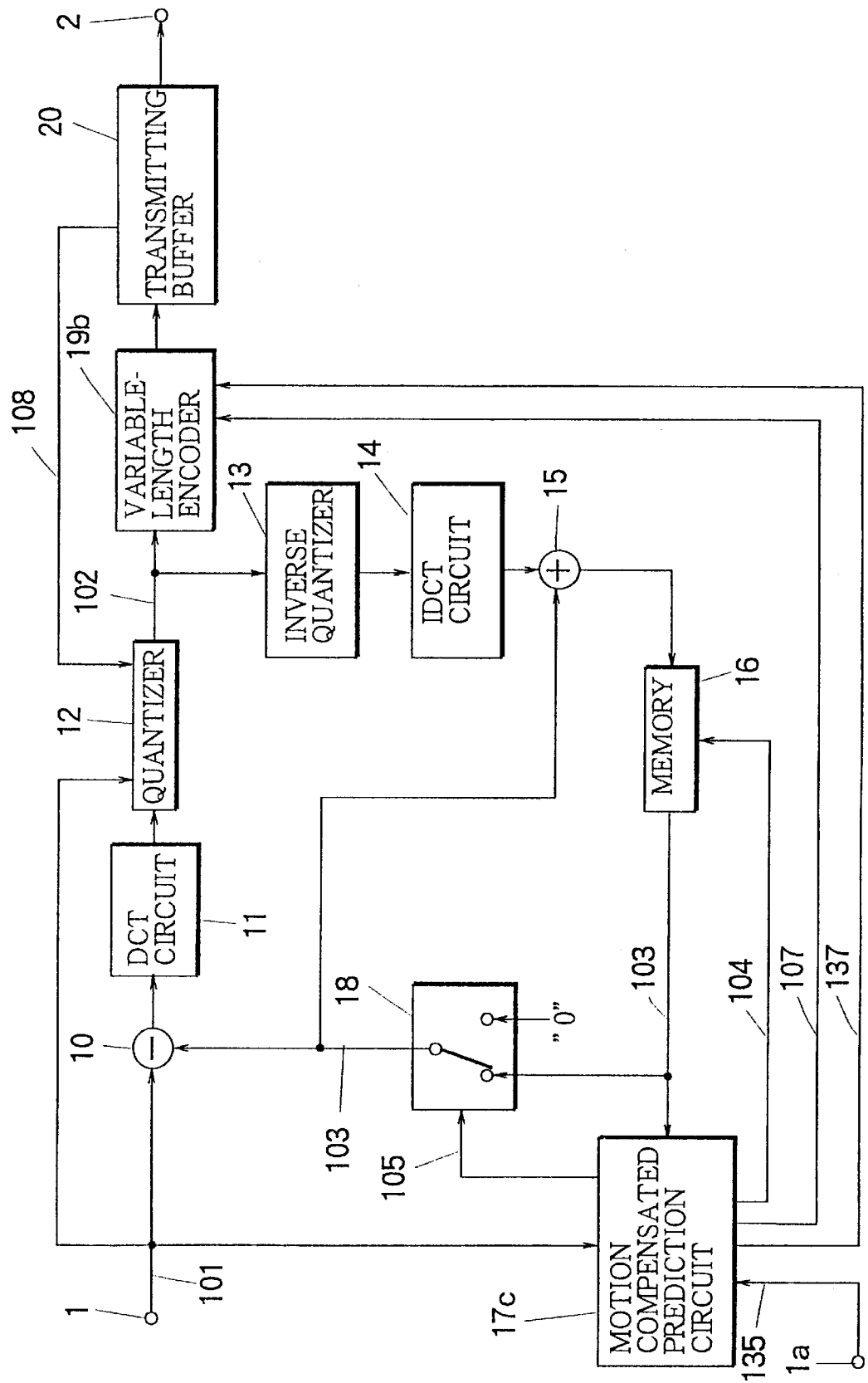
FIG. 18 is a block diagram showing an image signal encoding system of another embodiment; prediction circuit used in the embodiment of FIG. 18.

Another embodiment of the image signal encoding system is shown in FIG. 18. Reference numerals identical to those in FIG. 13 and FIG. 16 denote identical or corresponding elements. The motion compensated prediction circuit 17b in FIG. 13 or FIG. 16 is replaced by a motion compensated prediction circuit 17c, a fourth output 137 of which is supplied to a third input of the variable-length encoder 19b, which is similar to that of FIG. 16. The rest of the configuration is similar to that of FIG. 13 or FIG. 16.

Figure 19:
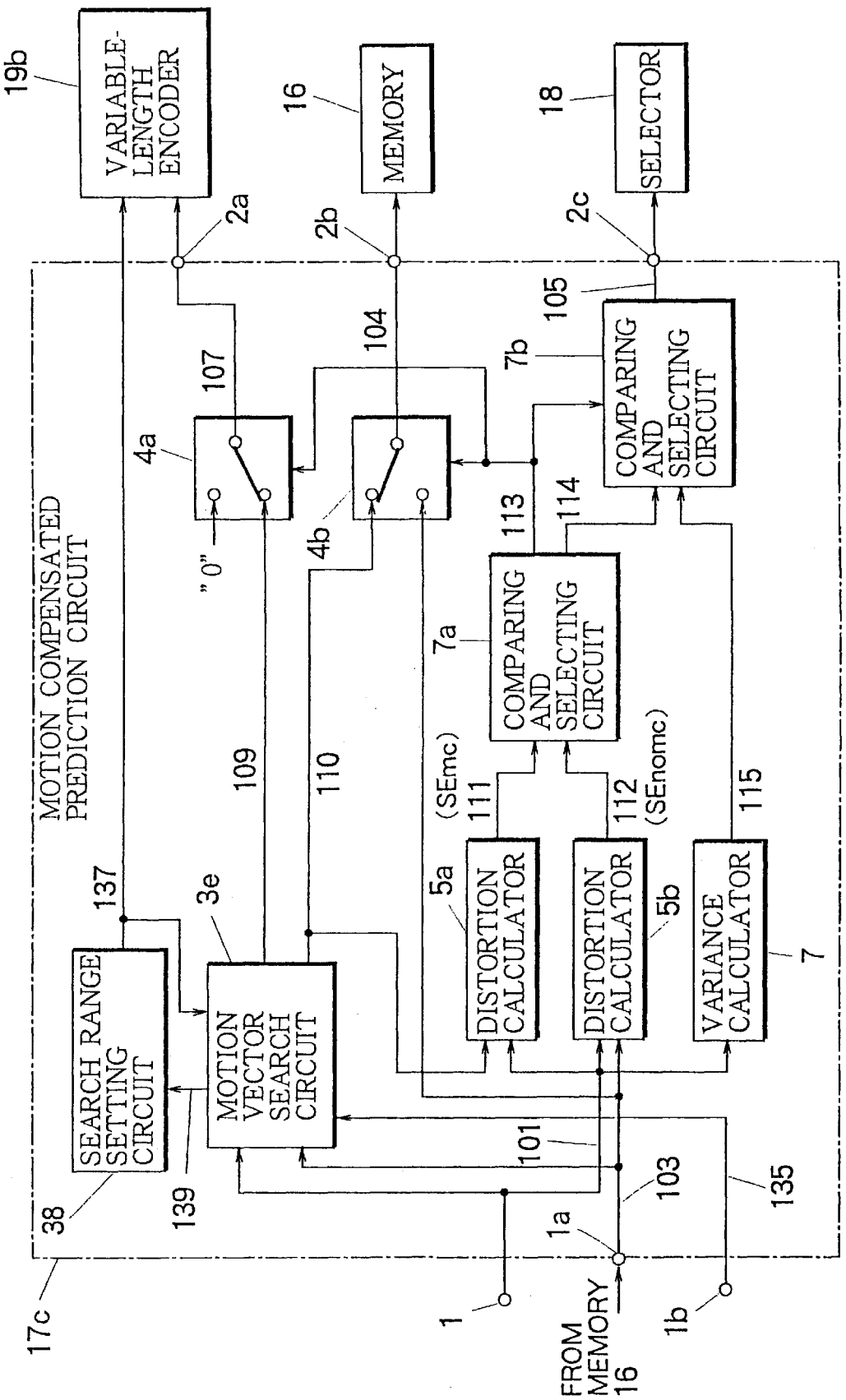
FIG. 19 is a block diagram showing a motion compensated prediction circuit used in the embodiment of FIG. 18.

FIG. 19 shows an example of the motion compensated prediction circuit 17c used in the embodiment of FIG. 18. Reference numerals identical to those in FIG. 14 denote identical or corresponding elements. The motion vector search circuit 3d is replaced by a motion vector search circuit 3e, and a search range setting circuit 38 is additionally provided. A third output 139 of the motion vector search circuit 3e is supplied to the search range setting circuit 38, and an output 137 of the search range setting circuit 38 is supplied to the variable-length encoder 19b, and also to a fourth input of the motion vector search circuit 3e. The rest of the configuration is similar to that of FIG. 14.

The range over which a search is made for the motion vector by the motion compensated prediction circuit 17c is adaptively varied. The motion compensated prediction circuit 17c determines the motion vector used for motion compensation in the variable range, and also makes a search for the motion vector over a fixed range, and determines the maximum value of the motion vectors for the pictures encoded in the past. For instance, if the image signal being encoded is one for a P-picture, the maximum value of the motion vector for the immediately preceding P-picture (in the display order shown in FIG. 6) is determined, and, if the image signal being encoded is one for a B-picture, the maximum value of the motion vector for the immediately succeeding P-picture (in the display order shown in FIG. 6) is determined. Alternatively, the maximum value of the motion vector for the immediately preceding B- or P-picture (in the display order shown in FIG. 6) may be used in place of the immediately succeeding P-picture, if the image signal being encoded is one for a B-picture.

In accordance with the thus determined maximum value of the motion vector encoded in the past, the motion compensated prediction circuit 17c determines the variable range of the motion vector for the current picture, and also outputs the range 137 of the motion vectors to the variable-length encoder 19b, which performs the variable-length encoding, using the codes (representing the vector) selected in accordance with the motion vector range 137. The operation of the motion compensated prediction circuit 17c will next be described with reference to FIG. 19.

In the same way as the embodiment of FIG. 13, the motion vector search circuit 3e divides the input picture F(i,j) into matching blocks, each consisting of 16 pixels by 16 lines. Then, each matching block is represented by:

$$M(i,j)=F(n*16+i, m*16+j)(0 \leq i \leq 15, 0 \leq j \leq 15) \quad (F1)$$

If the reference picture is represented by G(i,j) (0≤i≤I, 0≤J), and the vector between the input picture and the reference picture is represented by (H,V), then the prediction picture PH,V(i,j) is given by:

$$PH,V(i,j)=G(n*16+i+H, m*16+j+V) \quad (F2)$$

The distortion S is evaluated using the following evaluation function:

$$S = \sum_{i=0}^{15} \sum_{j=0}^{15} |M(i, j) - PH, V(i, j)| \quad (F3)$$

The magnitude D(H,V) of the vector (H,V) is determined in accordance with $$D(H,V)=\max\{|H|, |V|\} \quad (F19)$$

The offset value set in accordance with the offset setting signal 135 is added to the distortion S, to obtain the b offset distortion S1, i.e., $$S1=S+C(D(H,V)) \quad (F20)$$

The motion vector search circuit 3e finds a vector (H,V)=(H', V') which minimizes the distortion S1 given by the above evaluation function (F20), within a predetermined range of ±Mh pixels in the horizontal direction and of ±Mv lines in the vertical direction, defined in advance, and outputs this motion vector (H', V') to the search range setting circuit 38.

The motion vector search circuit 3e also finds a vector (H,V) which minimizes the distortion S1 within the range of:

$$|H| \leq Nh, |V| \leq Nv$$

where Nh and Nv represent the range of the vector output from the search range setting circuit 38, with Nh representing the number of pixels defining the range of the motion vector in the horizontal direction, and Nv representing the number of lines defining the range of the motion vector in the vector direction.

The motion vector search circuit 3e outputs this motion vector (H,V) and the prediction picture PH,V(i,j) as its first and second outputs.

The search range setting circuit 38 determines the maximum values of the respective components of the vector (H', V') found in the fixed search range (±Mh pixels by ±Mv lines), and determines the range Nh, Nv of the motion vector for the next picture. If, for instance, the maximum value of |H'| is 31, and the maximum value of |V'| is 15, Nh and Nv defining the range of the motion vector for the next picture will be 31 and 15, respectively.

It is also possible that if, for instance, the maximum value of |H'| is not more than $(2^k-1)$, and the maximum value of |V'| is not more than $(2^l-1)$, where k and l are integers, Nh and Nv defining the range of the motion vector for the next picture be set to $(2^k-1)$ and $(2^l-1)$, respectively. For instance, if the maximum value of |H'| is 30, and the maximum value of |V'| is 14, Nh and Nv defining the range of the motion vector for the next picture be set to 31 and 15, respectively. Setting Nh and Nv to be a value one less than a power of two is often convenient in digital data processing.

The search range setting circuit 38 determines the range of the motion vector for the next picture using the motion vector found through the search over a fixed, wide range, so that even when the range of the motion vector for the past pictures is made narrow, it is possible to find the magnitude of the vector when the motion becomes quick, and the range of the motion vector for the next picture can be widened.

The motion vector found through the search over a fixed wide range used in the search range setting circuit 38 is determined in the motion vector search circuit 3e which also determines the motion vector through the search over a variable motion vector search range. Accordingly, the amount of calculation does not increase significantly.

The reset of the operation is similar to the embodiment of FIG. 13 and FIG. 16.

Figure 20:
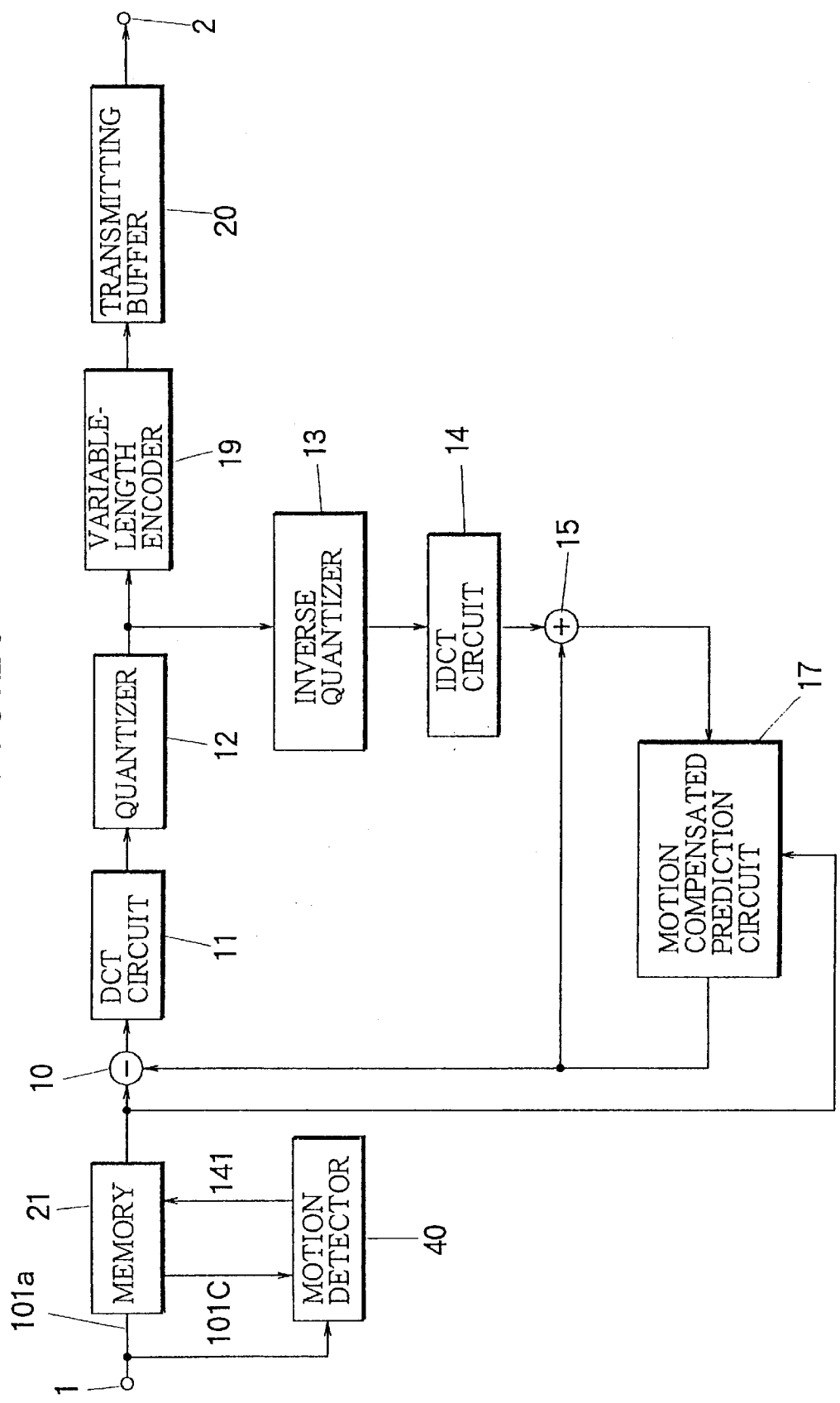
FIG. 20 is a block diagram showing an image signal encoding system of another embodiment of the invention.

FIG. 20 shows an image signal encoding system of another embodiment of the invention. Reference numerals identical to those in FIG. 5 denote identical or corresponding elements. The configuration of this embodiment is similar to that of FIG. 5. A difference is that a motion detector 40 is added. It receives a digital image signal 101a from the input terminal 1 and a second output 101c of the memory 21, and its output 141 is supplied to a second input of the memory 21.

Figure 21:
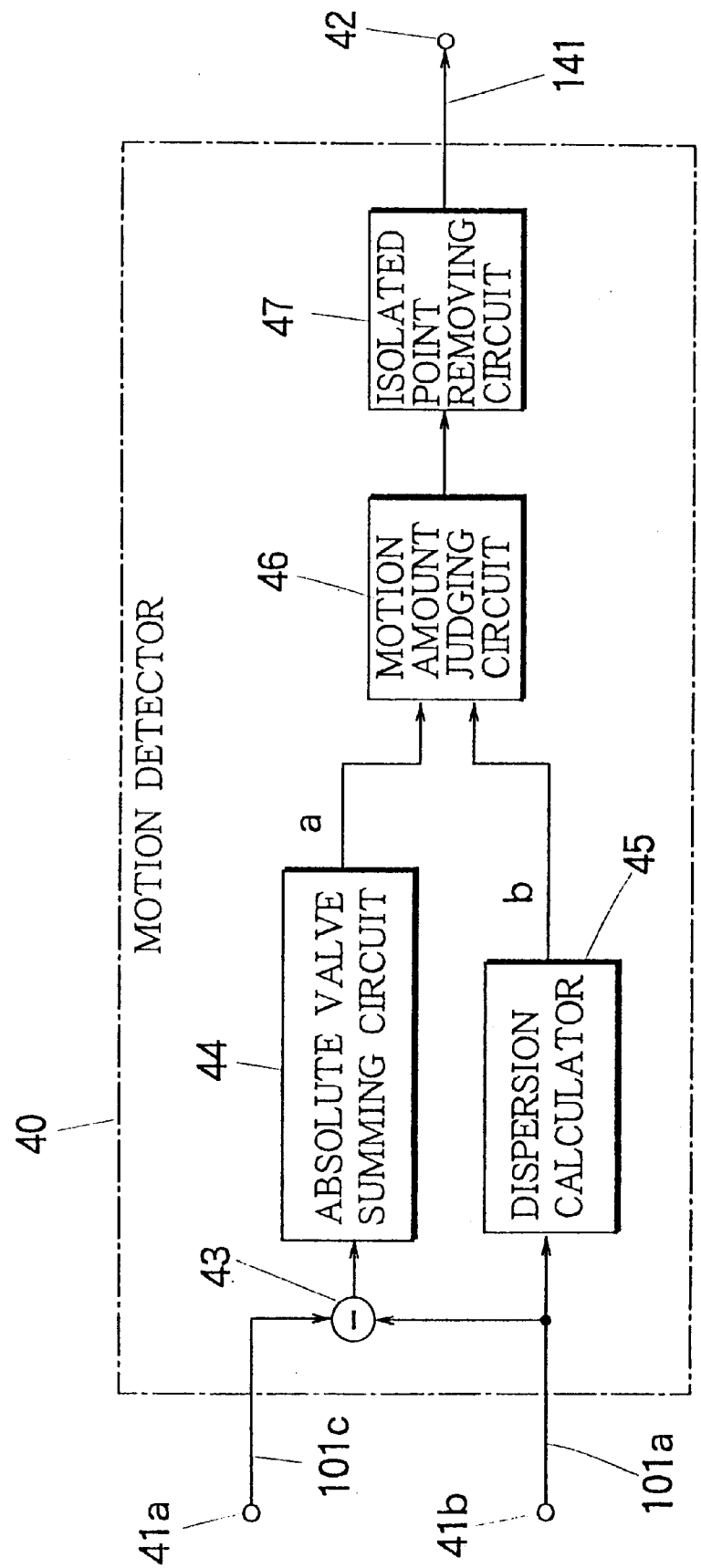
FIG. 21 is a block diagram showing an example of motion detector used in the embodiment of FIG. 20.

FIG. 21 is a block diagram showing an example of motion detector 40. As illustrated, the motion detector 40 has an input terminal 41a for receiving the first output 101c of the memory 21, and another input terminal 41b for receiving the input digital image signal 101a. The signals received at the input terminals 41a and 41b are respectively supplied to first and second inputs of a subtractor 43. The output of the subtractor 43 is input to an absolute value summing circuit 44, whose output is supplied to a first input of a motion amount judging circuit 46. The signal received at the input terminal 41b is also supplied to an input of a variance calculator 45, whose output is supplied to a second input of the motion amount judging circuit 46. An output of the motion amount judging circuit 46 is passed through an isolated point removing circuit 47, and output through an output terminal 42.

The motion detector 40 detects the speed of motion, in the following way. The subtractor 43 determines the difference between the input digital image signal 101a and the past picture 101c read out of the memory 21. The absolute value summing circuit 44 determines the sum of the absolute values of the differences from the subtractor 43, i.e., the sum of differences between corresponding pixels of adjacent pictures.

For the purpose of the following explanation, it is assumed that the whole picture consists of I pixels by J lines, and the input digital image signal is represented by f(i,j) where i represents the pixel number in the horizontal direction and $0 \leq i < I$, and j represents the line number (pixel number in the vertical direction) and $0 \leq j < J$, and the past picture 101c is represented by g(i,j).

The sum Sa of the absolute values of the differences is given by:

$$Sa = \sum_{i=0}^{I-1} \sum_{j=0}^{J-1} |f(i, j) - g(i, j)| \quad (F21)$$

The variance calculator 45 determines the variance Sb in accordance with the following equation.

$$Sb = \frac{1}{I*J}\sum_{i=0}^{I-1}\sum_{j=0}^{J-1} f(i, j)^2 - \left\{\frac{1}{I*J}\sum_{i=0}^{I-1}\sum_{j=0}^{J-1} f(i, j)\right\}^2 \quad (F22)$$

The motion amount judging circuit 46 uses the difference absolute value sum Sa and the variance Sb, to judge whether the speed of motion is high or low (whether the motion is quick or slow) on the basis of the past picture 101c and the input image signal 101a. The sum Sa generally corresponds to the speed of motion. That is, in case of a still picture, Sa=0, and with larger speed, Sa is greater. However, the sum Sa is also dependent on the activity of the input picture 101a: with a higher activity, Sa is greater. The value of the variance Sb is used to take account of this fact. For instance, using α0, β0 and γ0 (α0>γ0), the following judgment is made.

When Sa>α0, then the motion is quick.

When Sb<β0 and Sa>γ0, then the motion is quick. Otherwise, the motion is slow.

The result of the motion amount judging circuit 46 is input to the isolated point removing circuit 47, where isolated points are removed. That is, when only one or two pictures give a result different from the preceding and succeeding pictures, the results for these one or two pictures are changed to the the results identical to those for the preceding and succeeding pictures. For instance, it may be that the difference absolute value sum Sa is extraordinary large for a picture where scene change occurs. In such a case, the difference absolute value sum Sa will not be large for the preceding and succeeding pictures, so that the motion is judged to be slow for these pictures. Then, the motion is judged to be slow also for the picture at which the scene change occurs.

The results of the judgment is supplied to the memory 21.

When it is judged that the motion is quick, B-picture is not used, and the motion compensation is performed using the one-way prediction only. As a result, the prediction is made only from an immediately preceding picture, so that the search range need not be expanded, and yet it is possible to follow the quick motion.

When the motion is judged to be slow, the bi-directional prediction is also used, in the same way as in the prior art example. As a result, the encoding efficiency is maintained high.

Figure 22A:
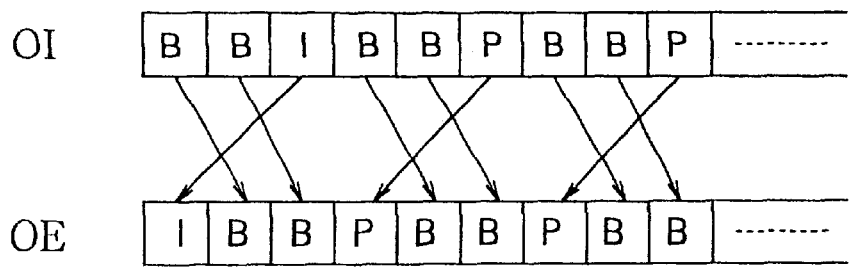
FIG. 22A to FIG. 22C are schematic diagrams showing the rearrangement of pictures.
Figure 22B:
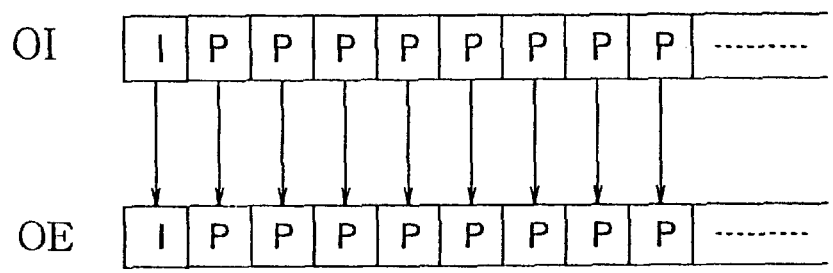
Figure 22C:
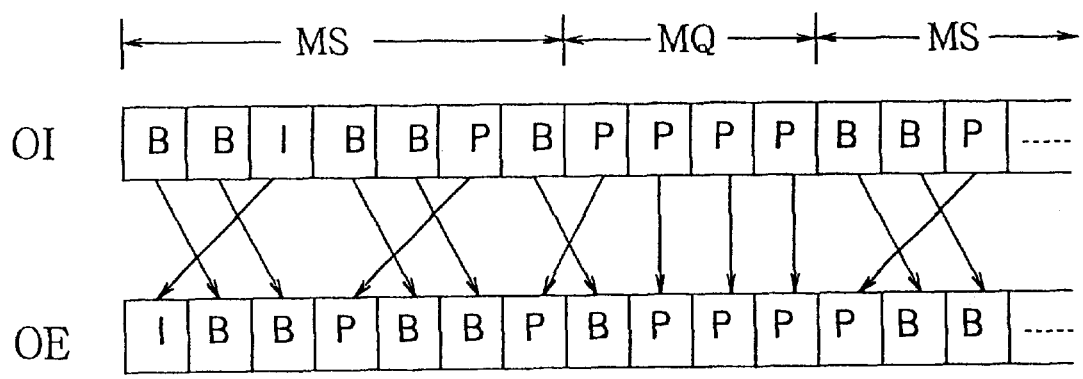

The memory 21 rearranges the input pictures 101a into the order of encoding, as shown in FIG. 22A to FIG. 22C, in which "OI" indicates the order of input, and "OE" indicates the order of encoding. For part of a sequence of pictures where the motion is judged to be slow at the motion detector 40, B-pictures are used, so that rearranging is made as shown in FIG. 22A. For part of the sequence of pictures where the motion is found to be quick, B-pictures are not used, so that no rearranging is made as shown in FIG. 22B. If the speed of motion is changed in the sequence of pictures, the rearranging is as shown in FIG. 22C. In FIG. 22C, "MQ" indicates a period when the motion is quick, and "MS" indicates a period when the motion is slow.

Figure 5:
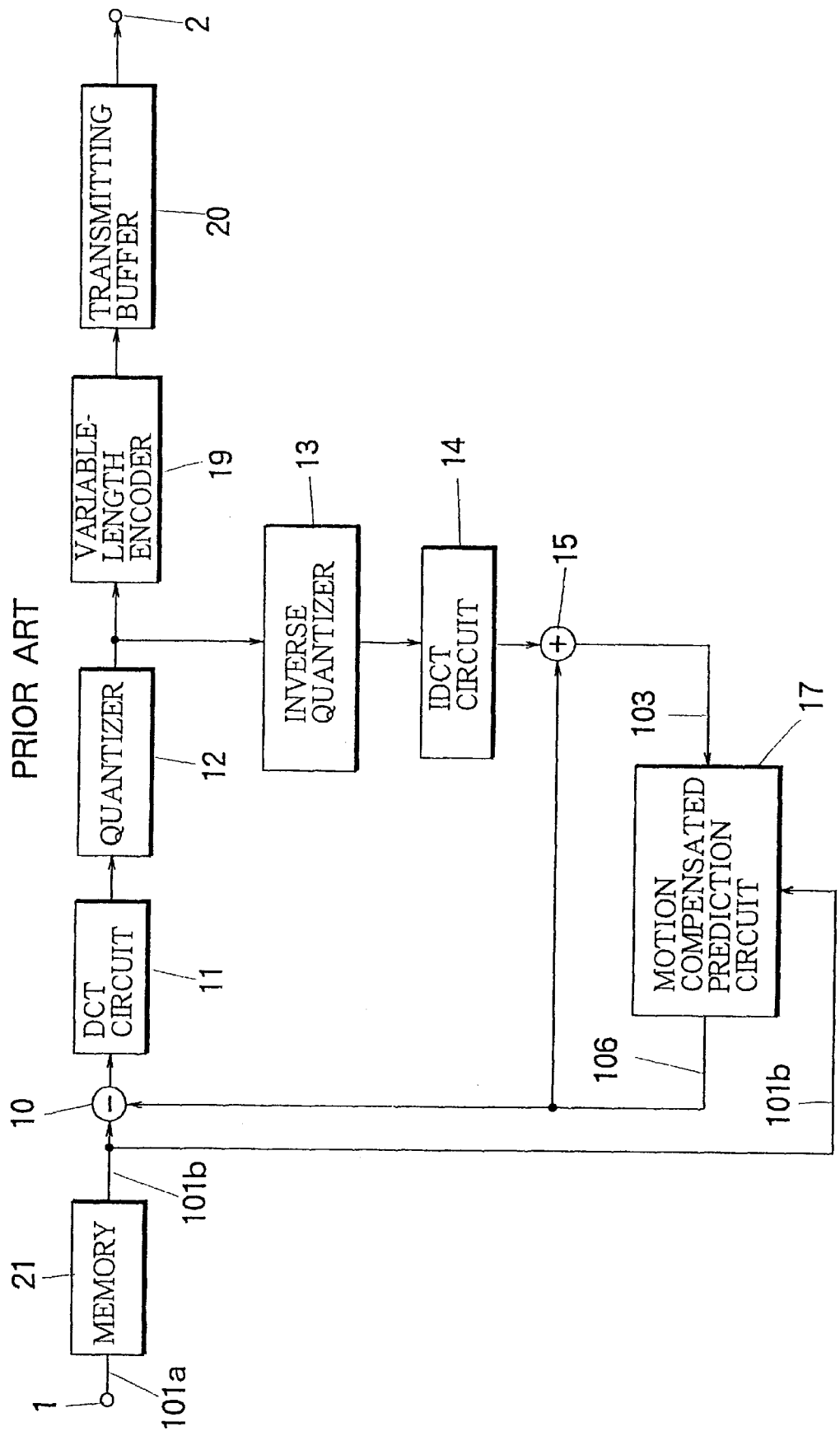
FIG. 5 is another block diagram showing the conventional image signal encoding system.

The rest of the operation of the system is identical to that described in connection with the prior art example of FIG. 5.

In the embodiment of FIG. 20 to FIG. 22C, the motion detector 40 uses the the sum Sa of absolute values of the differences between corresponding pixels of adjacent pictures, and the variance Sb within the picture. As an alternative, the sum of squares of the differences between corresponding pixels of adjacent pictures, the sum of absolute values of the differences between adjacent pixels within each picture, or the sum of squares of the differences between the adjacent pixels within each picture may be used.

In the embodiment of FIG. 20 to FIG. 22C, the interval M of the P-pictures is switched between M=1 and M=3. Alternatively, the detection of motion may be made in a plurality of levels (i.e., detection of motion may be made to find at which of a plurality of levels the motion is, and a plurality of intervals M=1,2,3,4 . . . may be selectively used according to the detected level of the motion.

Figure 23:
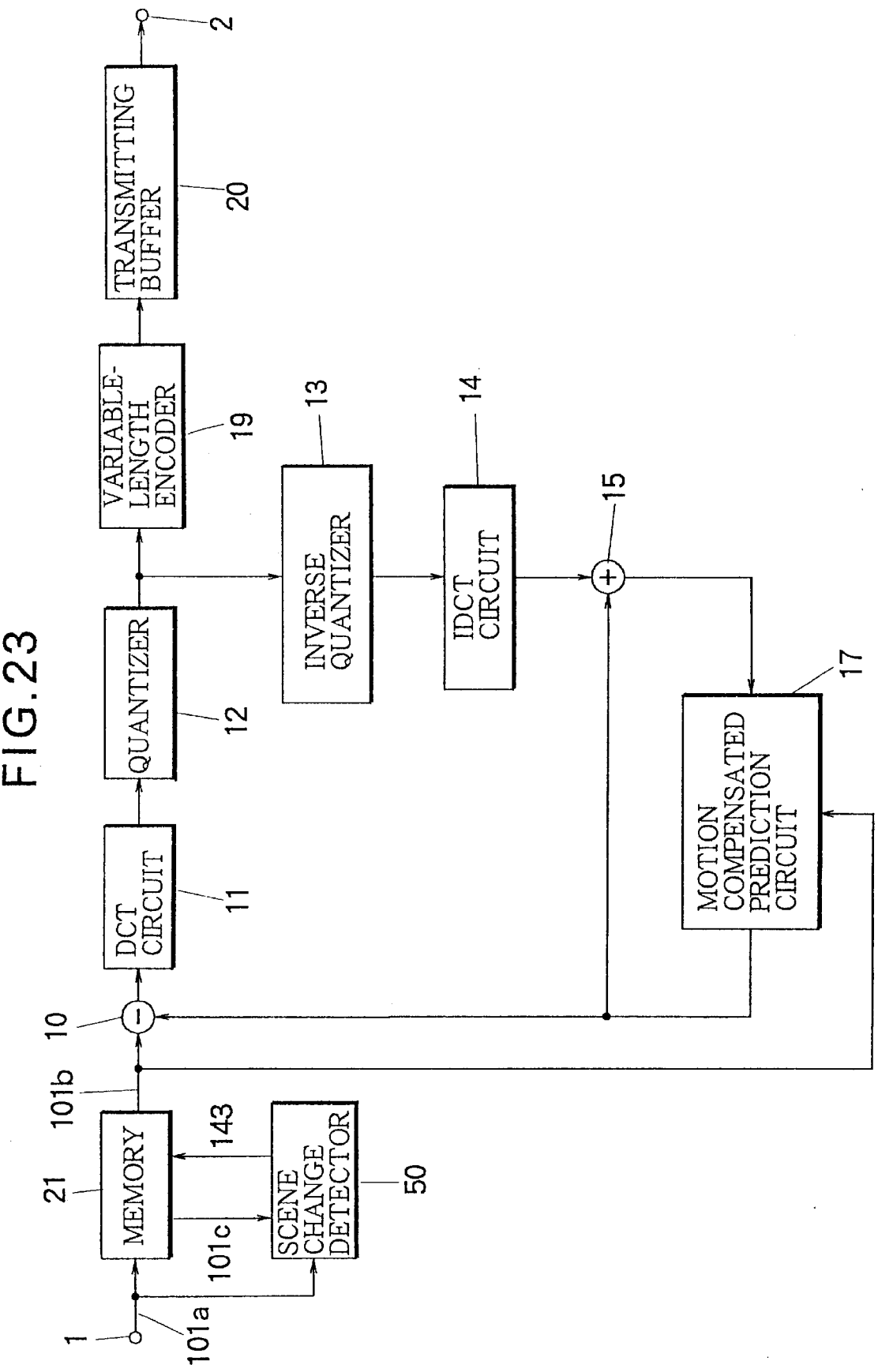
FIG. 23 is a block diagram showing an image signal encoding system of another embodiment of the invention.

FIG. 23 is a block diagram showing an image signal encoding system of another embodiment of the invention. Reference numerals identical to those in FIG. 20 denote identical or corresponding elements. The illustrated system is similar to that of FIG. 20, but in place of the motion detector 40 in FIG. 20, a scene change detector 50 is provided. The scene change detector 50 receives the digital image signal 101a from the input terminal 1 and an output 101c from the memory 21. The output 143 of the scene change detector 50 is supplied to a second input of the memory 21.

Figure 24:
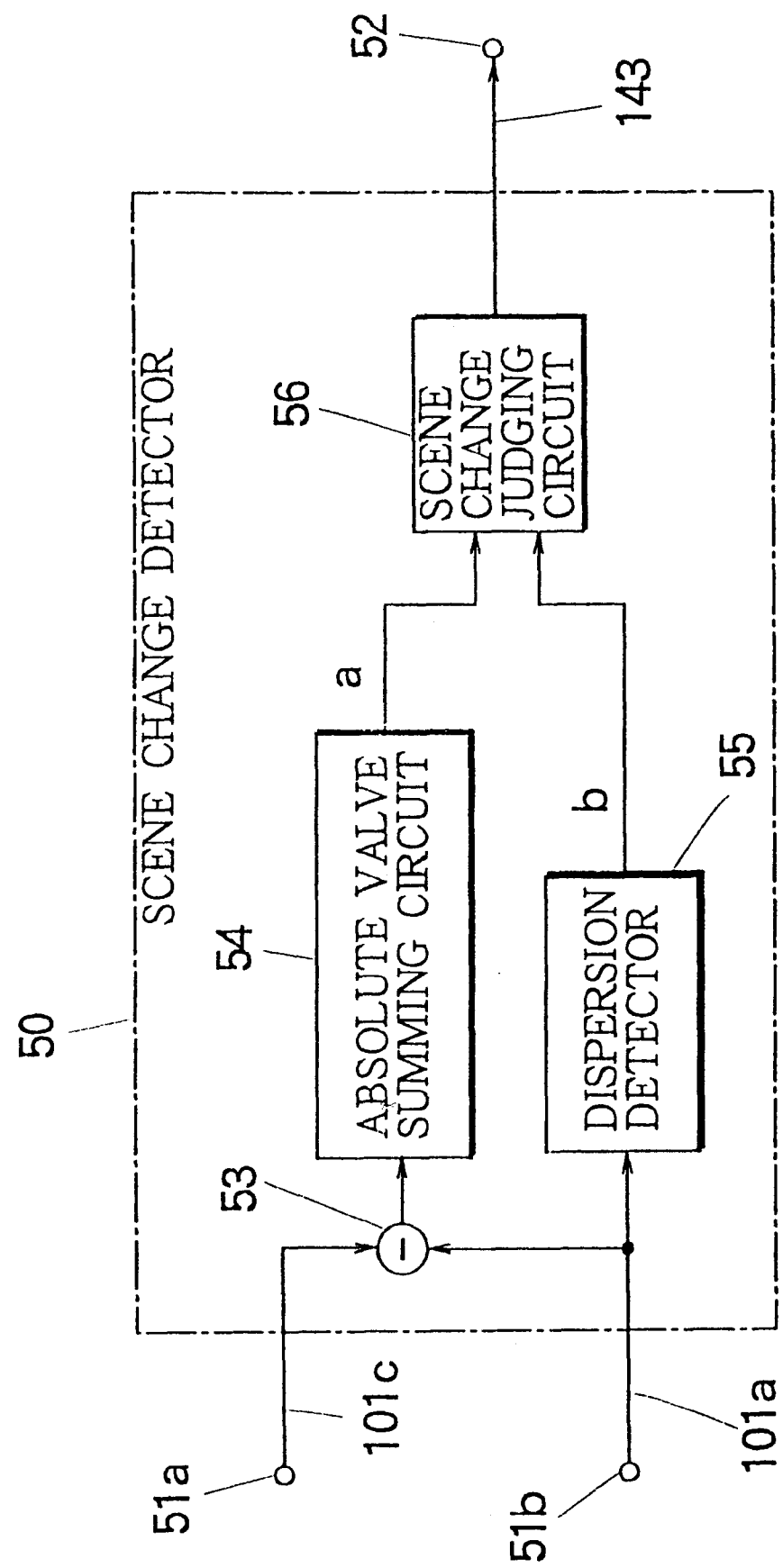
FIG. 24 is a block diagram showing an example of scene change detector used in the embodiment of FIG. 23.

FIG. 24 is a block diagram showing an example of scene change detector 50. As illustrated, the scene change detector 50 has an input terminal 51a for receiving the first output 101c of the memory 21 and another input terminal 51b for receiving the input digital image signal 101a. The signals 101c and 101a received at the input terminals 51a and 51b are respectively supplied to first and second inputs of a subtractor 53. The output of the subtractor 53 is input to an absolute value summing circuit 54, whose output is supplied to a first input of a scene change judging circuit 56. The signal 101a received at the input terminal 51b is also supplied to an input of a variance calculator 55, whose output is supplied to a second input of the scene change judging circuit 56. An output 143 of the scene change judging circuit 56 is output through an output terminal 52.

The scene change detector 50 detects the scene change, in the following way. The subtractor 53 determines the difference between the input digital image signal 101a and the past picture 101c read out of the memory 21, i.e., the difference between corresponding pixels of adjacent pictures in the series of pictures. The absolute value summing circuit 54 determines the sum of the absolute values of the differences from the subtractor 53, in the same way as explained in connection with the absolute value summing circuit 44 shown in FIG. 21.

The variance calculator 55 determines the variance Sb in the same way as explained in connection with the variance calculator 45 shown in FIG. 21.

The scene change judging circuit 56 uses the difference absolute value sum Sa and the variance Sb, to judge whether a scene change has occurred on the basis of the past picture 101c and the input image signal 101a. Whether a scene change has occurred or not can generally be determined on the basis of the sum Sa. That is, in case of a still picture, Sa=0, and with a scene change, Sa is very large. However, the sum Sa is also dependent on the activity of the input picture 101a: with a higher activity, Sa is greater. The value of the variance Sb is used to take account of this fact. For instance, using $\alpha 1$, $\beta 1$ and $\gamma 1$ ($\alpha 1 > \gamma 1$), the following judgment is made.

When Sa>$\alpha 1$, then there is a scene change.
When Sb<$\beta 1$ and Sa>$\gamma 1$, then there is a scene change.
Otherwise, there is no scene change.

The result of the scene change judging circuit 56 is supplied to the memory 21.

When it is judged that there is a scene change, the picture is encoded as an I-picture. Thereafter, every N-th picture is encoded as an I-picture, while other pictures are encoded as P-pictures and B-pictures. If another scene change is detected, the picture at which the scene change is detected is encoded as an I-picture, and the similar operation is thereafter repeated.

The memory 21 rearranges the input pictures 101a into the order of encoding, as shown in FIG. 25A to FIG. 25D, in which "OI" indicates the order of input, while "OE" indicates the order of encoding, and "DSC" indicates detection of a scene change. The manner of rearrangement is changed depending on whether a scene change is detected, or not detected, and at what type of picture the scene change is detected. Assume that one out of every N pictures is a encoded as an I-picture, and one out of every M pictures is encoded as a P-picture or an I-picture, and M is assumed to be 3.

Figure 25A:
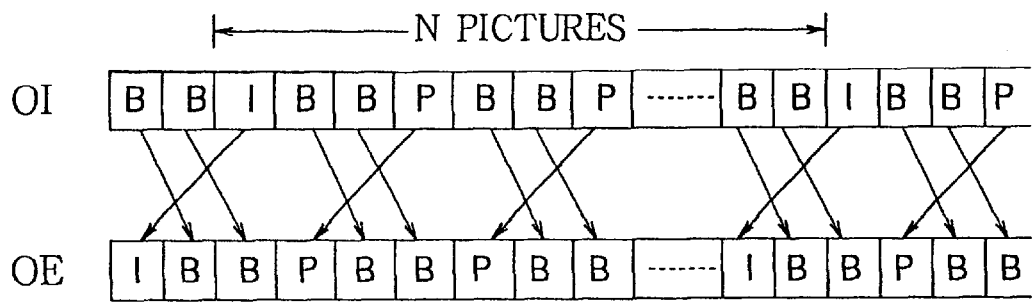
FIG. 25A to FIG. 25D, FIG. 26A to FIG. 26C, and FIG. 27A to FIG. 27C are schematic diagrams showing the rearrangement of pictures.

If no scene change is detected, the pictures are rearranged as shown in FIG. 25A.

Figure 25B:
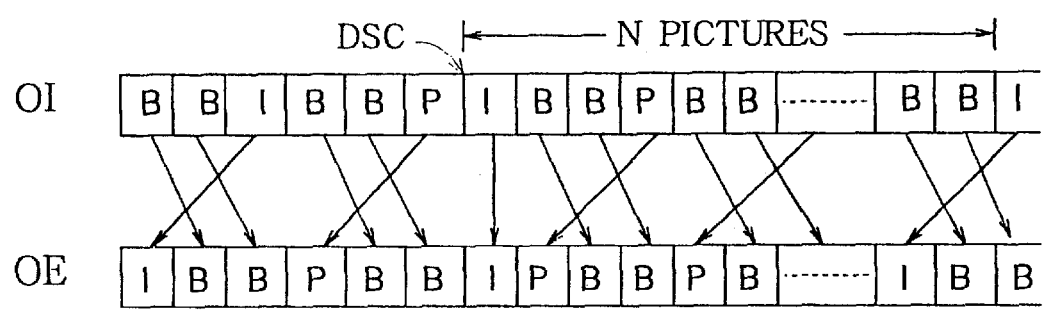

If a scene change is detected at a picture next to a P-picture, the pictures are rearranged as shown in FIG. 25B. A similar rearrangement is made if a scene change is detected at a picture next to an I-picture.

Figure 25C:
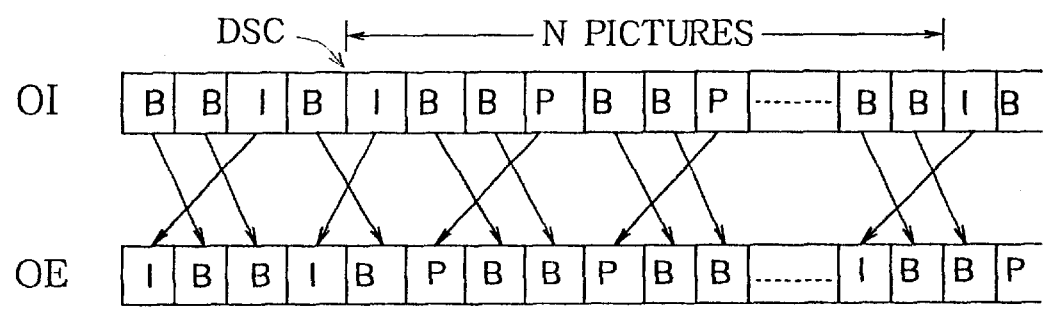

If a scene change is detected at a second picture as counted from an I-picture, the pictures are rearranged as shown in FIG. 25C. A similar rearrangement is made if a scene change is detected at a second picture as counted from a P-picture. If M is larger than 3, and a scene change is detected at a third or subsequent pictures as counted from an I- or P-picture, the rearrangement of the pictures is similar to that of FIG. 25C.

Figure 25D:
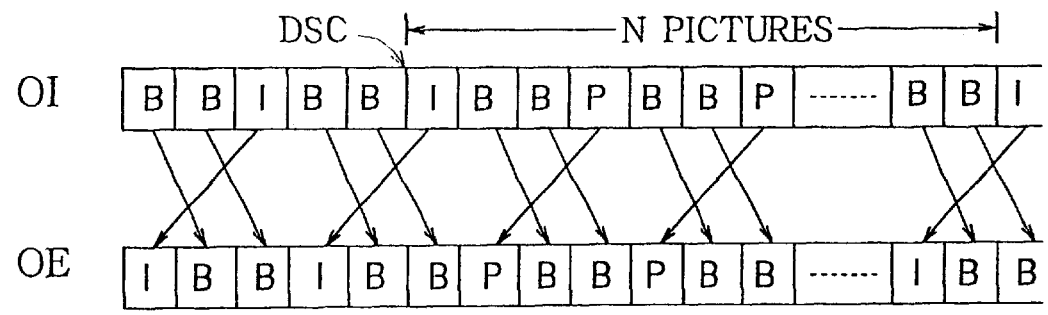

If a scene change is detected at a P-picture, the pictures are rearranged as shown in FIG. 25D.

If a scene change is detected at an I-picture, the rearrangement is identical to that shown in FIG. 25A.

The rest of the operation of the system is identical to that described in connection with the example of FIG. 20.

In the embodiment of FIG. 23 to FIG. 25D, the scene change detector 50 uses the sum Sa of absolute values of the differences between corresponding pixels in adjacent pictures, and the variance Sb within the picture. In place of the sum Sa of absolute values of the differences between corresponding pixels in adjacent pictures, the sum of squares of the differences between corresponding pixels in adjacent pictures, the sum of absolute values of the differences between adjacent pixels within each picture, or the sum of squares of the differences between the adjacent pixels within each picture may be used.

In the above description, the picture at which a scene change is detected is changed into an I-picture, and the input pictures are rearranged accordingly. It may alternatively so arranged that when a scene change is detected, the picture at which the scene change is detected is encoded as an I-picture, and one or more or the pictures preceding the picture at which the scene change is detected are changed into B- or P-pictures. The manner of rearrangement will next be described with reference to FIG. 25A, FIG. 25B, and FIG. 26A to FIG. 26C, in which "OI" indicates the order of input, "OE" indicates the order of encoding, and "DSC" indicates detection of a scene change.

For instance, let us assume one out of every N pictures are encoded as an I-picture, and one out of every M pictures are encoded as a P- or I-pictures.

Figure 26A:
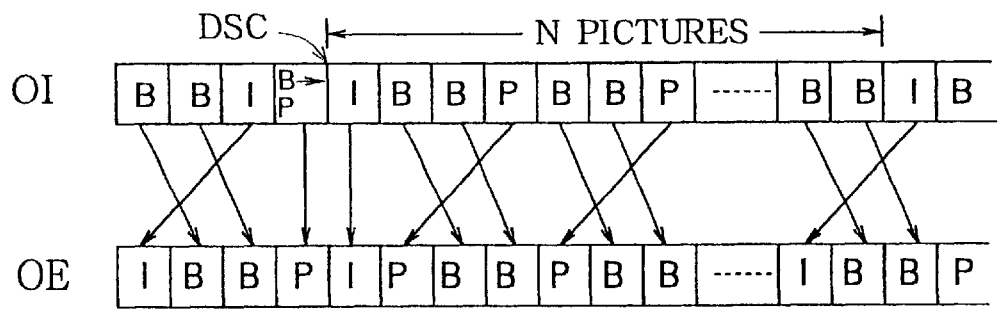

If a scene change is detected at an I-picture, or no scene change is detected, the memory 21 rearranges the pictures as shown in FIG. 25A. If a scene change is detected at a picture next to an I-picture or a P-picture, the pictures are rearranged as shown in FIG. 25B. When a scene change is detected at a second picture as counted from an I-picture or a P-picture, the pictures are rearranged as shown in FIG. 26A. If M is larger than 3, and a scene change is detected at a third or subsequent pictures as counted from an I- or P-picture, the rearrangement of the pictures is similar to that of FIG. 26A. FIG. 26A also shows that the B-picture immediately preceding the picture at which the scene change is detected is changed to a P-picture.

Figure 26B:
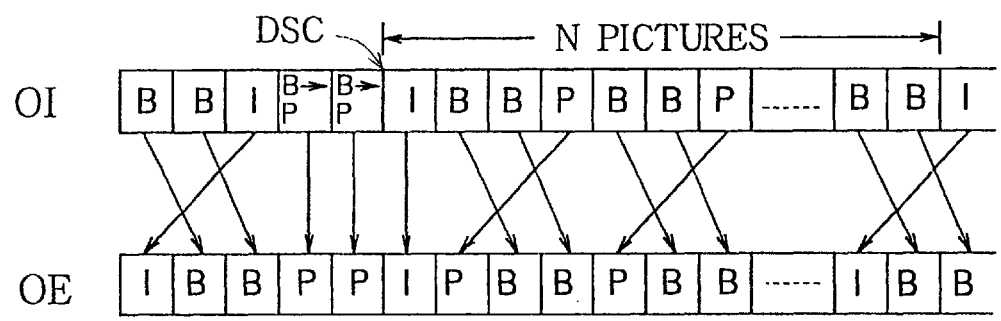
Figure 26C:
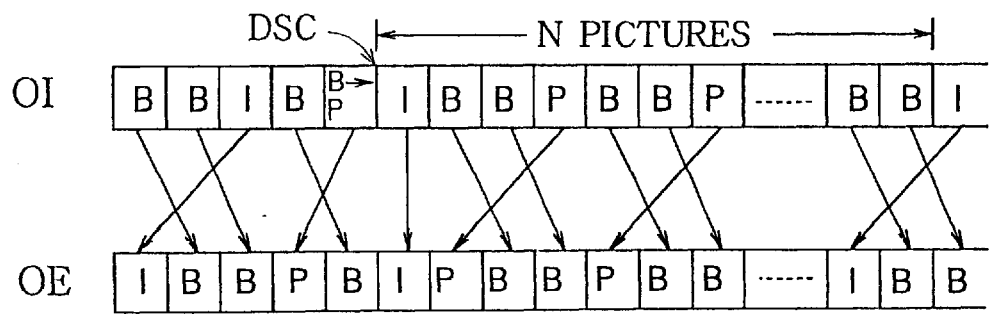

When a scene change is detected at a P-picture, the pictures are rearranged as shown in FIG. 26B. FIG. 26B also shows that the two B-pictures immediately preceding the picture at which the scene change is detected are changed to P-pictures. Instead of changing the two B-pictures to P-pictures, only one B-pictures which immediately precedes the picture at which the scene change is detected may be changed, and the second B-picture as counted backward from the picture at which the scene change is detected may be left as is, as shown in FIG. 26C.

Where M is more than 3, and a scene change is detected at a P-picture, only one of the B-pictures which immediately precedes the picture at which the scene change is detected may be changed to a P-picture, or two or more of the B-pictures preceding the picture at which the scene change is detected may be changed to P-pictures.

After the scene change is detected, every N-th picture is encoded as an I-picture, and the other pictures are not encoded as I-pictures, but as P- or B-pictures.

By changing the B-pictures preceding the scene change, the efficiency of encoding is improved. This is because predicting backward from a picture after the scene change does not contribute to improvement in the efficiency of efficiency, and may lower the efficiency. If the pictures before the scene change are encoded as P-pictures, as described above, the efficiency of the encoding is improved.

In a yet another modification, when a scene change is detected, a first P-picture after the scene change are changed to an I-picture, and thereafter every N-th picture is encoded as an I-picture, while other pictures are encoded as a P- or B-pictures. This is shown in FIG. 25A, and FIG. 27a to FIG. 27C, in which "OI" indicates the order of input, "OE" indicates the order of encoding, and "DSC" indicates detection of a scene change.

For instance, let us assume one out of every N pictures are encoded as an I-picture, and one out of every M pictures are encoded as a P- or I-pictures.

If a scene change is detected at an I-picture, or no scene change is detected, the memory 21 rearranges the pictures as shown in FIG. 25A.

Figure 27A:
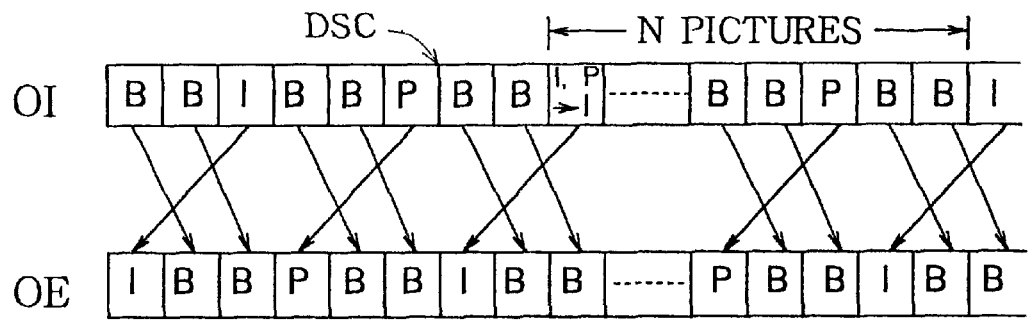

If a scene change is detected at a picture next to an I-picture or a P-picture, the pictures are rearranged as shown in FIG. 27A. FIG. 27A also shows that the first I- or P-picture after the detected scene change is encoded as an I-picture.

Figure 27B:
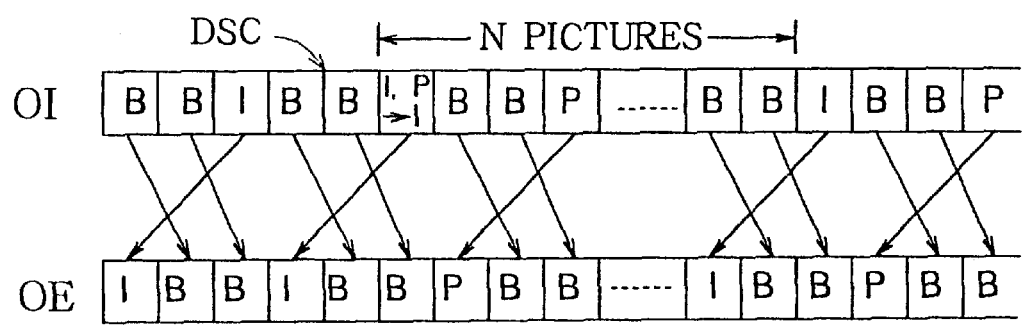

When a scene change is detected at a second picture as counted from an I-picture or a P-picture, the pictures are rearranged as shown in FIG. 27B. If M is larger than 3, and a scene change is detected at a third or subsequent pictures as counted from an I- or P-picture, the rearrangement of the pictures is similar to that of FIG. 27B. FIG. 27B also shows that the first I- or P-picture after the detected scene change is encoded as an I-picture.

Figure 27C:
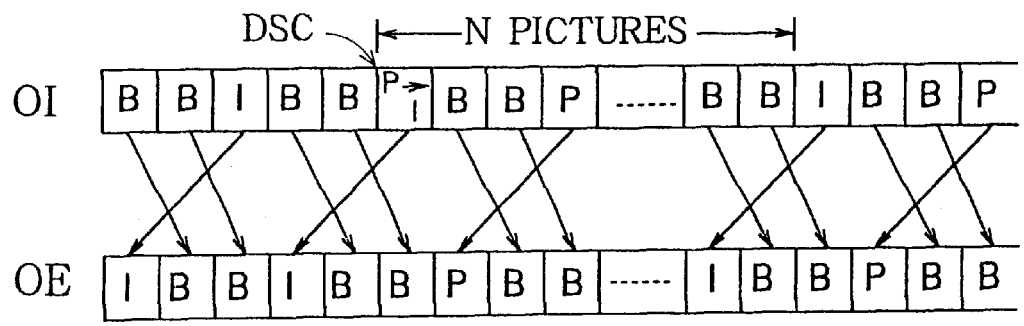

When a scene change is detected at a P-picture, the pictures are rearranged as shown in FIG. 27C. If M is larger than 3, and a scene change is detected at a third or subsequent pictures as counted from an I- or P-picture, the rearrangement of the pictures is similar to that of FIG. 27B. FIG. 27C also shows that the P-picture at which the scene change is detected is encoded as an I-picture.

After the first picture which has been changed to an I-picture, every N-th picture is encoded as an I-picture, and the other pictures are not encoded as I-pictures, but as P- or B-pictures.

By encoding the first P- or I-picture as an I-picture, and encoding every N-th picture thereafter as I-pictures, the intervals between P- or I-pictures are unchanged, and the processing is simplified.

The configurations shown in FIG. 20 and FIG. 23 are similar to each other, and they may be used in combination. Moreover, the motion detector 40 in FIG. 20 and the scene change detector 50 shown in FIG. 23 are similar in configuration, so that a circuit which can detect the motion speed and the scene change can be formed easily by combining the motion detector 40 and the scene change detector 50. Some of the components, including the subtractor (43, 53), the absolute value sum circuit (44, 54) and the variance calculator (45, 55) may be used in common for both of the detectors 40 and 50.

Figure 28:
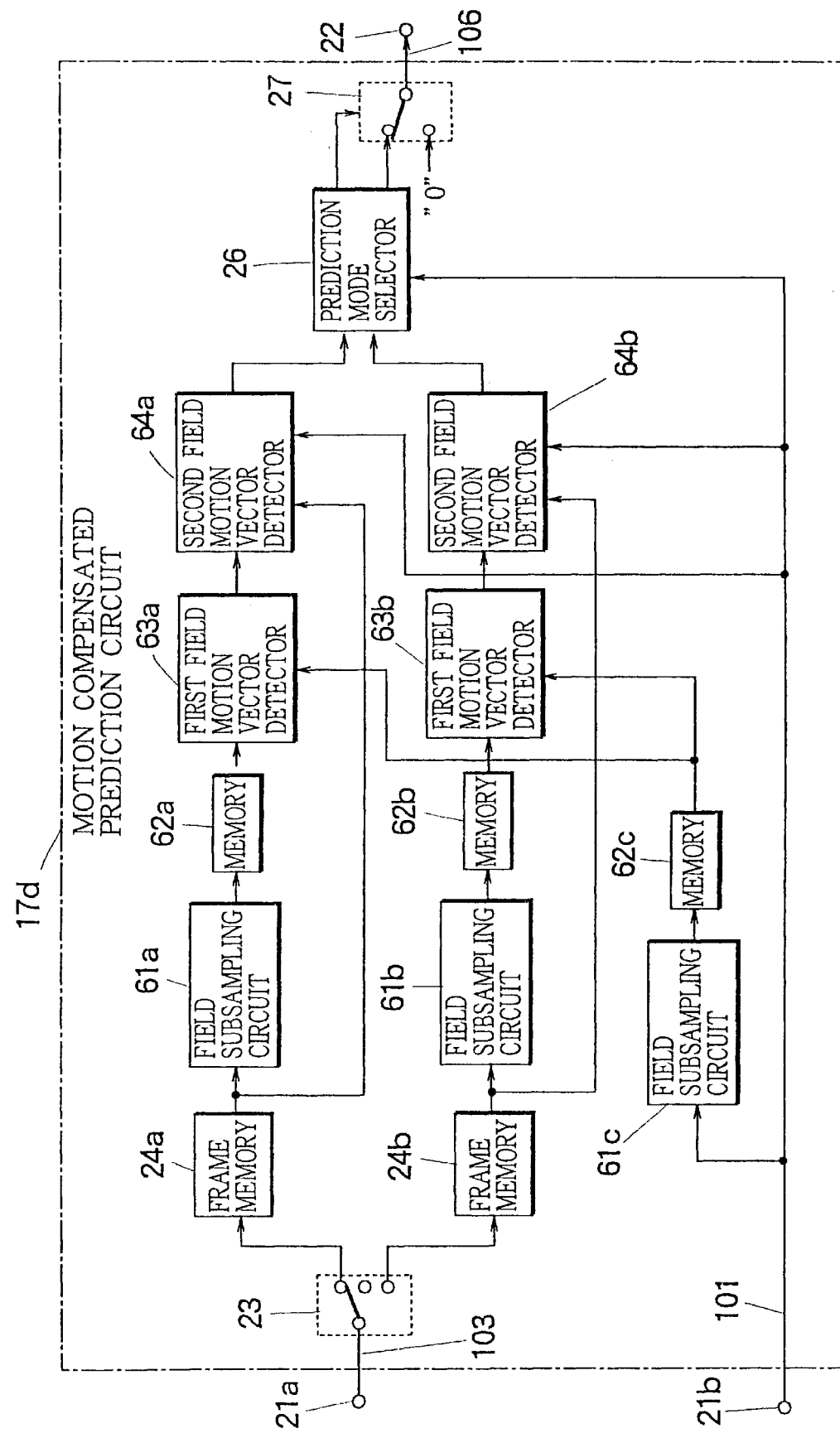
FIG. 28 is a block diagram showing a motion compensated prediction circuit used in another embodiment of the invention.

FIG. 28 is a block diagram showing a motion compensated prediction circuit 17d used in an image signal encoding system of another embodiment of the invention. The configuration of the entire image signal encoding system may be as shown in FIG. 5. The configuration of the motion compensated prediction circuit 17d is basically similar to that of the motion compensated prediction circuit 17 in FIG. 8, and reference numerals identical to those in FIG. 8 denote identical or corresponding elements.

The picture 103 from the adder 15 is received at the input terminal 21a and the picture 101 from the memory 21 is received at the input terminal 21b. The picture 103 received at the input terminal 21a is supplied via the selector 23 to the frame memory 24a or 24b. The reference picture from the frame memory 24a is supplied via a field subsampling circuit 61a to a memory 62a. The reference picture from the frame memory 24b is supplied via a field subsampling circuit 61b to a memory 62b.

The picture 101 received at the input terminal 21b is supplied via a field subsampling circuit 61c to a memory 62c.

An output of the memory 62a is supplied to a first input of the first field motion vector detector 63a. An output of the memory 62c is supplied to a second input of the first field motion vector detector 63a. An output of the first field motion vector detector 63a is supplied to a first input of a second field motion vector detector 64a. An output of the frame memory 24a is supplied to a second input of the second field motion vector detector 64a.

The picture 101 received at the input terminal 21b is also supplied to a third input of the second field motion vector detector 64a. An output of the second field motion vector detector 64a is supplied to a first input of a prediction mode selector 26.

An output of the memory 62b is supplied to a first input of a first field motion vector detector 63b. An output of the memory 62c is supplied to a second input of the first field motion vector detector 63b. An output of the first field motion vector detector 63b is supplied to a first input of a second field motion vector detector 64b. An output of a frame memory 24b is supplied to a second input of the second field motion vector detector 64b. The picture 101 received at the input terminal 21b is supplied to a third input of the second field motion vector detector 64b. An output of the second field motion vector detector 64b is supplied to a second input of the prediction mode selector 26.

The image signal 101 received at the input terminal 21b is supplied to a third input of the prediction mode selector 26. A first output of the prediction model selector 26 is supplied to a first input of a selector 27. A zero signal "0" is supplied to a second input of the selector 27. A second output of the prediction mode selector 26 is supplied to a third input of the selector 27. An output 106 of the selector 27 is output via an output terminal 22.

The operation will next be described. The configuration of the motion compensated prediction circuit 17d of this embodiment is different from that of the prior art example in the following respects. As explained in connection with the prior art, the motion compensated prediction circuit 17d uses two reference pictures stored in the memories 24a and 24b, and performs motion compensated prediction, and outputs an prediction picture 106.

The operation of the motion compensated prediction circuit 17d in this embodiment will next be described with reference to FIG. 28. The reference picture from the frame memory 24a is subsampled, for each field, at the field sampling circuit 61a. If the reference frame stored in the frame memory 24a, for example, is represented by G(i,j), where i represents the pixel number in the horizontal direction and $0 \leq i < I$, and j represents the pixel number in the vertical direction and $0 \leq j < J$, then a picture G'(i,j) is obtained by subsampling, with a decimation factor 1/2, in the horizontal direction, in accordance with:

$$G'(i,j) = \{G(2*i-1,j) + 2*G(2*i,j) + G(2*i+1,j)\}/4$$

Then, the picture Gs is obtained by subsampling, with a decimation factor 1/2, in the vertical direction, in accordance with:

$$Gs(i,2*j)=\{3*G'(i,4*j)+G'(i,4*j+2)\}/4$$

$$Gs(i,2*j+1)=\{G'(i,4*j+1)+3*G'(i,4*j+3)\}/4$$

where $0 \leq i < I/2$, and $0 \leq j < J/2$.

Figure 29:
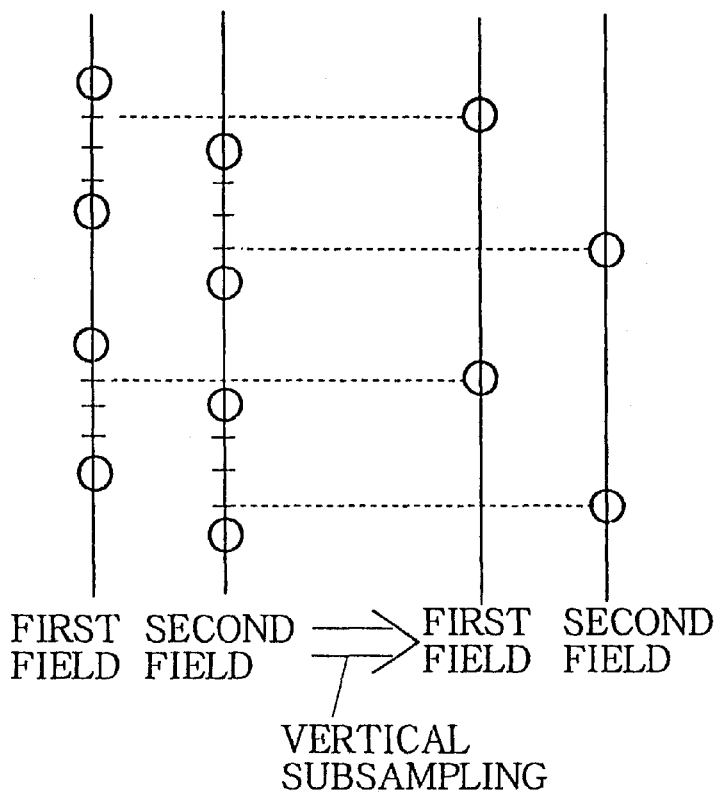
FIG. 29 is a schematic diagram showing the positions of the pixels in the pictures obtained by an example of vertical subsampling.

If subsampling is conducted applying filter coefficients of [3/4, 1/4], [1/4, 3/4], as described above, the interlace configuration shown in FIG. 29 is maintained. The picture Gs(i,j) obtained by subsampling is stored in the memory 62a.

The reference picture output from the frame memory 24b and the image signal 101 received at the input terminal 21b are similarly subsampled, and stored in the memories 62b and 62c, respectively.

If the picture stored in the memory 62c is represented by Fs(i,j) where $0 \leq i < I/2$, and $0 \leq j < J/2$, the first field motion vector detector 63a divides the picture Fs(i,j) into blocks Cn,m(i,j) each consisting of 8 pixels in the horizontal direction and 8 lines in the vertical directions, where n is an integer representing the position in the horizontal direction within the block and satisfying $0 \leq i < 8$, and m is an integer representing the position in the vertical direction within the block and satisfying $0 \leq m < 8$. The block Cn,m(i,j) satisfies the following relationship.

$$Cn,m(i,j)=Fs(n*8+i, m*8+j)$$

Accordingly, it corresponds to a picture obtained by subsampling the block Bn,m(i,j) of 16 pixels by 16 lines in the prior art.

For each field of the each block Cn,m(i,j), one of the blocks which is within the picture Gs(i,j) stored in the memory 62a and which minimizes the prediction distortion is selected by the block matching method, and the relative position of the selected block is output as a motion vector. That is, the prediction distortion Es1(Vh,Vv,f) (f=0,1) for the vector (Vh,Vv) for the first field of the block Cn,m(i,j) is calculated by:

$$Es1(Vh, Vv, 0) = \sum_{i=0}^{7}\sum_{j=0}^{3} |Cn, m(i, 2*j) - Gs(n*8+i+Vh, m*8+2*j+Vv)| \quad (F23)$$

$$Es1(Vh, Vv, 1) = \sum_{i=0}^{7}\sum_{j=0}^{3} |Cn, m(i, 2*j) - Gs(n*8+i+Vh, m*8+2*j+1+Vv)| \quad (F24)$$

If the motion vector search range of the field of the original picture is ±Nh pixels in the horizontal direction and ±Nv lines in the vertical direction, the vector (Vh, Vv)=(Wh1, Wv1) within the range of $-Nh/2 \leq Vh \leq Nh/2$, $-Nv/2 \leq Vv \leq Nv/2$, $0 \leq f \leq 1$, and f=f1 which in combination give the minimum Es1(Vh,Vv,f) are determined. f indicates whether the reference picture is of the first field or the second field. Similarly, the prediction distortion Es2(Vh,Vv, f) (f=0,1) for the vector (Vh,Vv) for the second field of the block Cn,m(i,j) is calculated by:

$$Es2(Vh, Vv, 0) = \sum_{i=0}^{7}\sum_{j=0}^{3} |Cn, m(i, 2*j+1) - Gs(n*8+i+Vh, m*8+2*j+Vv)| \quad (F25)$$

$$Es2(Vh, Vv, 1) = \sum_{i=0}^{7}\sum_{j=0}^{3} |Cn, m(i, 2*j+1) - Gs(n*8+i+Vh, m*8+2*j+1+Vv)| \quad (F26)$$

The vector (Vh,Vv)=(Wh2, Wv2) and f=f2 which give in combination the minimum Es2(Vh,Vv,f) are determined.

The second field motion vector detector 64a, performs motion compensated prediction of the image signal 101 received at the input terminal 21b, and using the reference picture G(i,j) stored in the frame memory 24a, through a motion vector search over a range centered on the position represented by the vector determined by the first field motion detector 63a. That is, the two vectors (Wh1, Wv1), (Wh2, Wv2) output from the first field motion vector detector 63a are doubled, since they are the vectors for the subsampled pictures.

The input image signal 101 represented by F(i,j) (i denotes a pixel number in the horizontal direction, and j denotes a pixel number in the vertical direction) is divided into blocks Bn,m(i,j) each consisting of 16 pixels in the horizontal direction by 16 lines in the vertical direction.

$$Bn,m(i,j)=F(n*16+i, m*16+j)$$

For the respective fields of the block Bn,m(i,j), a motion vector search is conducted for a range of ±1 pixels in the horizontal direction and ±1 lines in the vertical direction, centered on the positioned represented by the doubled vectors (Wh1*2, Wv1*2) and (Wh2*2, Wv*2), respectively. That is, for the first field of the block Bn,m(i,j), the prediction distortion E1(Vh,Vv,f1) for the vector (Vh,Vv) is calculated by:

$$E1(Vh, Vv, f1) = \sum_{i=0}^{15}\sum_{j=0}^{7} |Bn, m(i, 2*j) - G(n*16+i+Vh, m*16+2*j+f1+Vv)| \quad (F27)$$

The vector (Vh,Vv)=(Vh1,Vv1) within Wh1*2-1≤Vh≤Wh1*2+1, and Wv1*2-1≤Vv≤Wv1*2+1, and -Nh≤Vh≤Nh, -Nv≤Vv≤Nv, and giving the minimum value of E1(Vh,Vv,f1) is determined. Similarly, for the second field of the block Bn,m(i,j), the prediction distortion E2(Vh,Vv,f2) for the vector (Vh,Vv) is calculated by:

$$E2(Vh, Vv, f2) = \sum_{i=0}^{15}\sum_{j=0}^{7} |Bn, m(i, 2*j+1) - G(n*16+i+Vh, m*16+2*j+f2+Vv)| \quad (F28)$$

Figure 30:
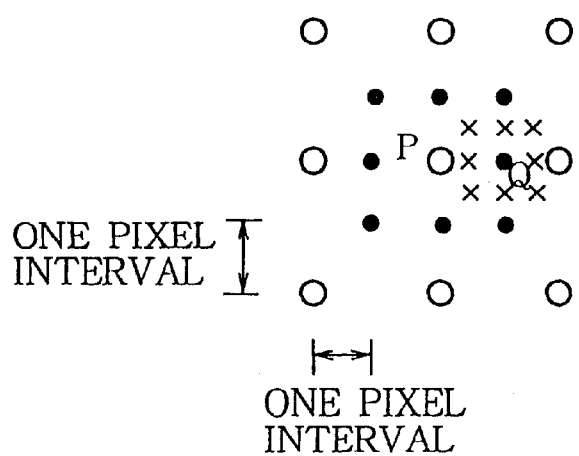
FIG. 30 is a schematic diagram showing the range of motion vector search in the embodiment of FIG. 28.

The vector (Vh,Vv)=(Vh2,Vv2) giving the minimum value of E2(Vh,Vv,f2) is determined. Finally, the two vectors (Vh1,Vv1) and (Vh2,Vv2) obtained, for each field, and f1 and f2 indicating the selected fields, and the corresponding motion compensated prediction picture B'n,m(i,j) given by the following formulae are output.

$$B'n,m(i,2*j)=G(n*16+i+Vh1, m*16+2*j+f1+Vv1)$$

$$B'n,m(i,2*j+1)=G(n*16+i+Vh2, m*16+2*j+f2+Vv2)$$

Where the second field motion vector detector 64*a* detects the motion vector with a half-pixel accuracy, interpolation is made using the reference picture G(i,j) for each field, and the motion vector search is conducted for a range of ±0.5 pixels in the horizontal direction and ±0.5 lines in the vertical direction. The vector determined by the search, f1 or f2 indicating the selected field, and the motion compensated prediction picture are output. FIG. 30 is a schematic diagram showing the fine motion vector search using the second field motion vector detector 64*a*. If the point P represents the vector output from the first field motion vector detector 63*a*, the second field motion vector detector 64*a* conducts a motion vector search with a one-pixel accuracy, over the range of 3 pixels by 3 lines centered on the point P. If the motion vector is denoted by Q, the second field motion vector detector 64*a* then conducts another motion vector search with a half-pixel accuracy, this time, over the range of 3 pixels by 3 lines.

The operation of the first field motion vector detector 63*b* is identical to that of the first field motion vector detector 63*a*, except that the reference picture is one stored in the memory 62*b*. The operation of the second field motion vector detector 64*b* is identical to that of the second field motion vector detector 64*a*, except that the reference picture is one stored in the frame memory 24*b*.

The prediction mode selector 26 selectively outputs the prediction picture on the basis of the two motion compensated prediction pictures output from the second motion vector detectors 64*a* and 64*b*. The rest of the operation is identical to that of the prior art example described with reference to FIG. 5 to FIG. 8.

In the prior art, the calculations (F5) to (F8) were conducted over the range of $-Nh \leq Vh \leq Nh$, and $-Nv \leq Vv \leq Nv$. In the embodiment described above with reference to FIG. 28 to FIG. 30, the calculations (F23) to (F26) are conducted for a quarter range, and the calculations (F27) and (F28) are conducted for a narrow range of 3 pixels by 3 lines, so that the amount of calculation is reduced to substantially 1/16, where the search range is very wide.

Figure 31:
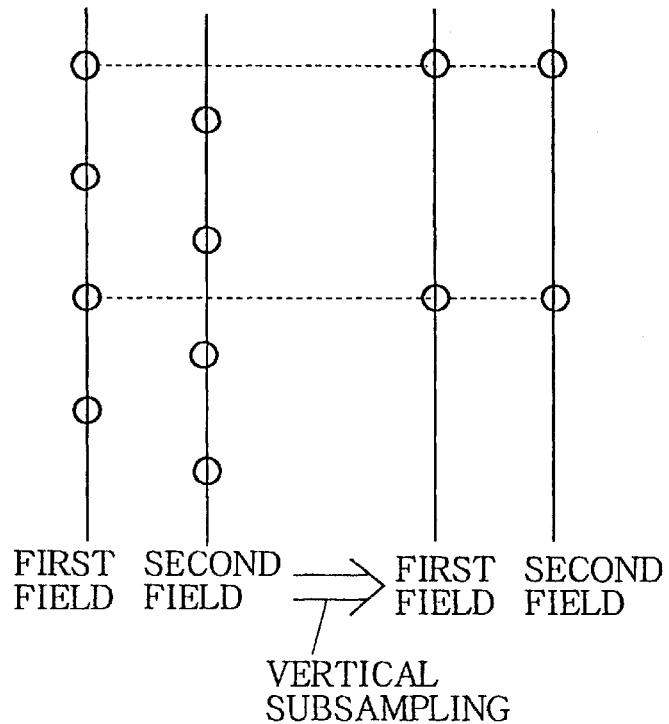
FIG. 31 is a schematic diagram showing the positions of the pixels in the pictures obtained by another example of vertical subsampling.

The field subsampling circuits 61*a*, 61*b* and 61*c* may be modified to operate in a different way. This is explained with reference to FIG. 31, which shows a vertical subsampling of the field subsampling circuit 61*a*. For instance, for the reference frame G(i,j) ($0 \leq i < I$, $0 \leq j < J$) stored in the frame memory 24*a*, a picture obtained by subsampling, with a decimation factor 1/2, in the horizontal direction is obtained in accordance with:

$$G'(i,j)=\{G(2*i-1,j)+2*G(2*i,j)+G(2*i+1,j)\}/4$$

A picture Gs(i,j) ($0 \leq i < I/2$, $0 \leq j < J/2$) obtained by subsampling in the vertical direction, with a decimation factor 1/2, for the respective fields is obtained in accordance with:

$$Gs(i,2*j)=\{G'(i,4*j-2)+2*G'(i,4*j)+G'(1,4*j+2)\}/4$$

for the first field, and $$Gs(i,2*j+1)=\{G'(i,4*j-1)+G'(1,4*j+1)\}/2$$

for the second field.

When subsampling is conducted, in the vertical direction by filtering, with filter coefficients of [1/4, 2/4, 1/4] and [1/2, 1/2] for the respective fields, the picture will be of a non-interlace configuration.

The operation of the field subsampling circuits 61*b* and 61*c* is similar to that of the field subsampling circuit 61*a*.

If the subsampling is conducted such that the picture is of a non-interlace configuration, as described above, motion vector can be determined accurately when motion compensation is performed between fields of different parities, and the picture quality can be improved.

Figure 32:
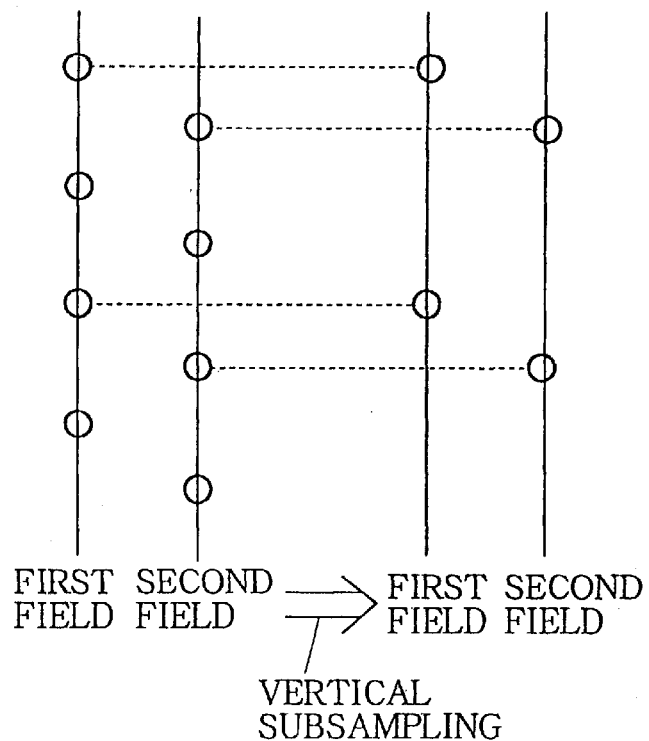
FIG. 32 is a schematic diagram showing the positions of the pixels in the pictures obtained by another example of vertical subsampling.

The field subsampling circuits 61*a*, 61*b* and 61*c* may be modified to operate in a still different way. This is explained with reference to FIG. 32, which shows a vertical subsampling of the field subsampling circuit 61*a*. For instance, for the reference frame G(i,j) ($0 \leq i < I$, $0 \leq j < J$) stored in the frame memory 24*a*, a picture obtained by subsampling, with a decimation factor 1/2, in the horizontal direction is obtained in accordance with:

$$G'(i,j)=\{G(2*i-1,j)+2*G(2*i,j)+G(2*i+1,j)\}/4$$

A picture Gs(i,j) ($0 \leq i < I/2$, $0 \leq j < J/2$) obtained by subsampling in the vertical direction, with a decimation factor 1/2, for the respective fields is obtained in accordance with:

$$Gs(i,2*j)=\{G'(i,4*j-2)+2*G'(i,4*j)+G'(1,4*j+2)\}/4$$

$$Gs(i,2*j+1)=\{G'(i,4*j-1)+2*G'(i,4*j+1)+G'(1,4*j+3)\}/4$$

When subsampling is conducted in the manner described above, the scanning lines of the resultant pictures are at the same positions of some of the scanning line of the original picture.

The operation of the field subsampling circuits 61*b* and 54*c* is similar to that of the field subsampling circuit 61*a*.

If the subsampling is conducted such that the scanning lines of the resultant picture coincide with some of the scanning lines of the original picture, as described above, the motion vector between the fields of the same parity, and the motion vector between the fields of different parities will have identical pixel accuracy, and motion compensation from the both fields will become easier.

Figure 33:
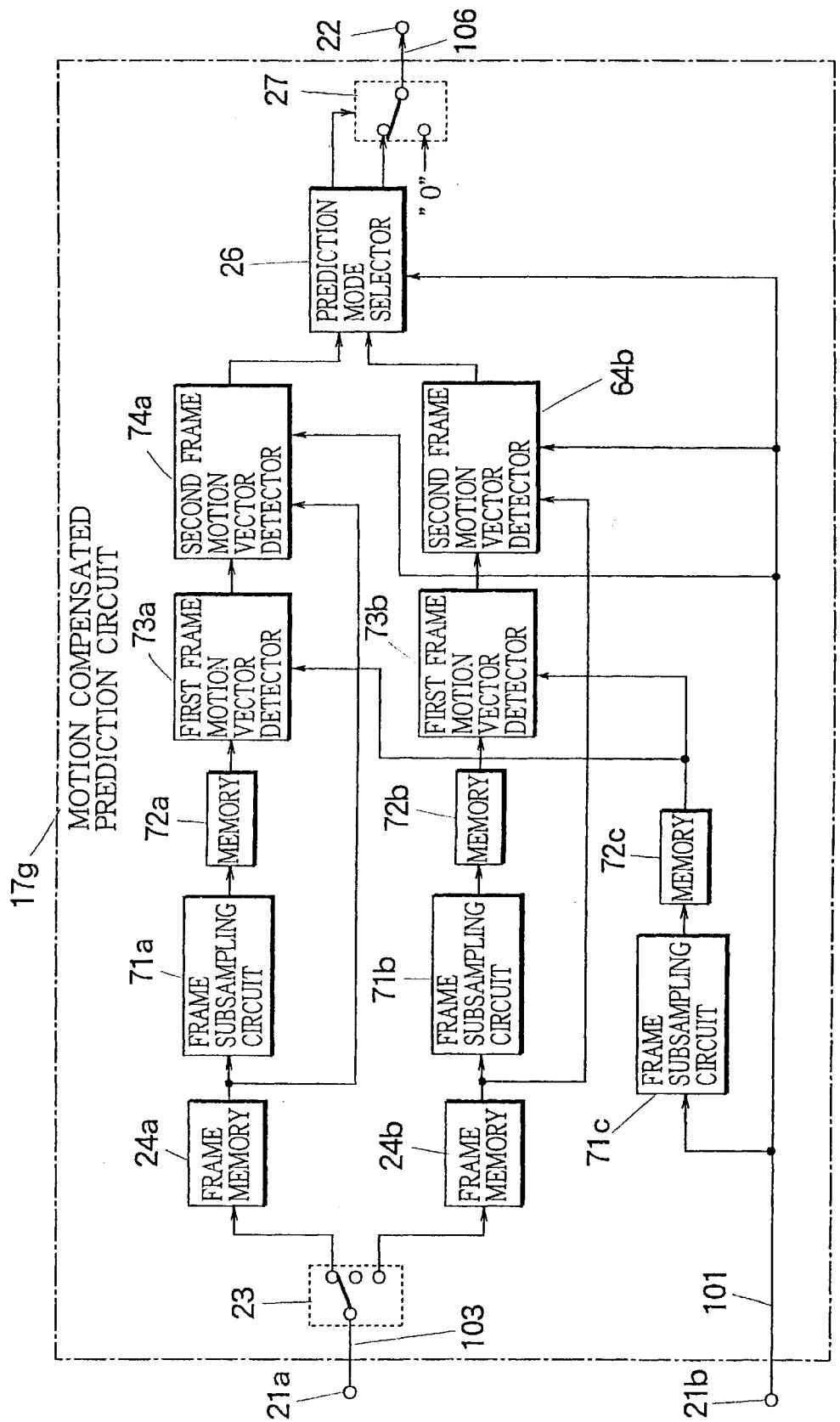
FIG. 33 is a block diagram showing a motion compensated prediction circuit used in another embodiment of the invention.

FIG. 33 shows an example of a motion compensated prediction circuit 17*e* used in another embodiment of the invention. Reference numerals identical to those in FIG. 28 denote identical or corresponding elements. Differences from the motion compensated prediction circuit 17*d* in FIG. 28 are that the field sampling circuits 61*a*, 61*b* and 61*c* are replaced by first frame sampling circuits 71*a* and 71*b*; the first field sampling circuits 63*a* and 63*b* are replaced by first frame sampling circuits 73*a* and 73*b*; and the second field sampling circuits 64*a* and 64*b* are replaced by second frame sampling circuits 74*a* and 74*b*. In addition, in place of memories 62*a*, 62*b* and 62*c*, memories 72*a*, 72*b* and 72*c* are used.

The motion compensated prediction circuit 17*e* uses two reference pictures stored in the frame memories 24*a* and 24*b*, to perform motion compensated prediction on the image signal 101 output from the memory 3, and outputs a prediction picture 106.

The operation of the motion compensated prediction circuit 17*e* in this embodiment will next be described. The reference picture from the frame memory 24*a* is subsampled, frame by frame, at the frame sampling circuit 71*a*. If the reference frame stored in the frame memory 24*a*, for example, is represented by G(i,j), where i represents the pixel number in the horizontal direction and $0 \leq i < I$, and j represents the pixel number in the vertical direction and $0 \leq j < J$, then a picture G'(i,j) is obtained by subsampling, with a decimation factor 1/2, in the horizontal direction, in accordance with:

$$G'(i,j)=\{G(2*i-1,j)+2*G(2*i,j)+G(2*i+1,j)\}/4$$

Then, the picture Gs(i,j) (0≤i<I/2, 0≤j<J/2) is obtained by subsampling, with a decimation factor 1/2, in the vertical direction, in accordance with:

$$Gt(i,j)=\{G'(i,2*j-1)+2*G'(i,2*j)+G'(i,2*j+1)\}/4$$

The picture Gt(i,j) obtained by the subsampling is stored in the memory 72a.

The reference picture output from the frame memory 24b and the image signal 101 received at the input terminal 21b are similarly subsampled, and stored in the memories 72b and 72c, respectively.

If the picture stored in the memory 72c is represented by Ft(i,j) where 0≤i<I/2, and 0≤j<J/2, the first frame motion vector detector 73a divides the picture Ft(i,j) into blocks Dn,m(i,j) each consisting of 8 pixels in the horizontal direction and 8 lines in the vertical directions, where n is an integer representing the horizontal direction within the block and satisfying 0≤i≤7, and m is an integer representing the vertical direction within the block and satisfying 0≤m≤7. The block Dn,m(i,j) is represented by:

$$Dn,m(i,j)=Ft(n*8+i,m*8+j)$$

Accordingly, it corresponds to a picture obtained by subsampling the block Bn,m(i,j) of 16 pixels by 16 lines in the prior art.

One of the blocks which is within the picture Gt(i,j) stored in the memory 72a and which minimizes the prediction distortion is selected by the block matching of the frame, and the relative position of the selected block is output as a motion vector. That is, the prediction distortion Es0(Vh,Vv) for the vector (Vh,Vv) for the block Dn,m(i,j) is calculated by:

$$Es0(Vh, Vv) = \sum_{i=0}^{7} \sum_{j=0}^{7} |Dn, m(i, j) - Gt(n*8 + i + Vh, m*8 + j + Vv)| \quad (F29)$$

If the motion vector search range of the frame of the original picture is ±Mh pixels in the horizontal direction and ±Mv lines in the vertical direction, the vector (Vh,Vv)=(Wh0, Wv0) within the range of −Mh/2≤Vh≤Mh/2, −Mv/2≤Vv≤Mv/2, 0≤f≤1 which gives the minimum Es0(Vh, Vv) is determined.

The second frame motion vector detector 74a performs motion compensated prediction on the image signal 101 received at the input terminal 21b, using the reference picture G(i,j) stored in the frame memory 24a, through a motion vector search over a range centered on the position represented by the vector determined by the first field motion detector 73a. That is, the vector (Wh0, Wv0) output from the first frame motion vector detector 73a is doubled, since it is the vector for the subsampled picture.

The input image signal 101 represented by F(i,J) (i denotes a pixel number in the horizontal direction, and j denotes a pixel number in the vertical direction) is divided into blocks Bn,m(i,j) each consisting of 16 pixels in the horizontal direction by 16 lines in the vertical direction. Each block Bn,m(i,j) is represented by:

$$Bn,m(i,j)=F(n*16+i, m*16+j)$$

A motion vector search is conducted for a range of ±1 pixels in the horizontal direction and ±1 lines in the vertical direction, centered on the doubled vector (wh0*2, Wv0*2).

The prediction distortion E0(Vh,Vv) for the vector (Vh,Vv) is calculated by:

$$E0(Vh, Vv) = \sum_{i=0}^{15} \sum_{j=0}^{15} |Bn, m(i, j) - G(n*16 + i + Vh, m*16 + 2*j + Vv)| \quad (F30)$$

The vector (Vh,Vv)=(Vh0,Vv0) within Wh0*2−1≤Vh≤Wh0*2+1, and Wv0*2−1≤Vv≤Wv0*2+1, and −Mh≤Vh≤Mh, −Mv≤Vv≤Mv, and giving the minimum value of E0(Vh,Vv) is determined.

Finally, the vector (Vh0,Vv0) obtained for each frame, and the corresponding motion compensated prediction picture B'n,m(i,j):

$$B'n,m(i,j)=G(n*16+i+Vh0, m*16+j+Vv0)$$

is output.

Where the second frame motion vector detector 74a detects the motion vector with a half-pixel accuracy, interpolation is made using the reference picture G(i,j) for each frame, and the motion vector search is conducted for a range of ±0.5 pixels in the horizontal direction and ±0.5 lines in the vertical direction. The vector determined by the search, and the motion compensated prediction picture are output.

The operation of the first frame motion vector detector 73b is identical to that of the first frame motion vector detector 73a, except that the reference picture is one stored in the memory 72b. The operation of the second frame motion vector detector 74b is identical to that of the second frame motion vector detector 74a, except that the reference picture is one stored in the frame memory 24b.

The prediction mode selector 26 selectively outputs the prediction picture on the basis of the two motion compensated prediction pictures output from the second motion vector detectors 74a and 74b. The rest of the operation is identical to that of the prior art example described with reference to FIG. 5 to FIG. 8.

In the prior art, the calculation (F4) was conducted over the range of −Mh≤Vh≤Mh, and −Mv≤Vv≤Mv. In the embodiment described above with reference to FIG. 33, the calculation (F29) is conducted for a quarter range and the calculation (F30) is conducted for a narrow range of 3 pixels by 3 lines, so that the amount of calculation is reduced to substantially 1/16, where the search range is very wide.

FIG. 34 shows an example of motion compensated prediction circuit 17f used in another embodiment of the image signal encoding system of the invention. Reference numerals identical to those in FIG. 28 and FIG. 33 denote identical or corresponding elements.

The motion compensated prediction circuit 17f shown in FIG. 34 is a combination of most of the elements in the motion compensated prediction circuits 17d and 17e shown in FIG. 28 and FIG. 33. That is, the circuits up to the second field motion vector detectors 64a, 64b, and the second frame motion vector detectors 74a, 74b operate in the same way, as described in connection with FIG. 28 and FIG. 33, respectively. A selector 76a selectively outputs the outputs of the motion vector detectors 64a and 74a. That is, it determines which of the prediction pictures from the motion vector detectors 64a and 74a has a smaller prediction distortion, and outputs the output of the motion vector detector 64a if the prediction picture from the motion vector detector 64a has a smaller prediction distortion, and outputs the output of the motion vector detector 74a if the prediction picture from the motion vector detector 74a has a smaller prediction distortion.

Similarly, a selector 76b selectively outputs the outputs of the motion vector detectors 64b and 74b. That is, it determines which of the prediction pictures from the motion vector detectors 64b and 74b has a smaller prediction distortion, and outputs the output of the motion vector detector 64b if the prediction picture from the motion vector detector 64b has a smaller prediction distortion, and outputs the output of the motion vector detector 74b if the prediction picture from the motion vector detector 74b has a smaller prediction distortion.

The prediction mode selector 26 selectively outputs the outputs of the selectors 76a and 76b on the basis of outputs of the selectors 76a and 76b. The rest of the operation is identical to that of the prior art example described with reference to FIG. 5 to FIG. 8.

In the prior art, the calculations (F4) to (F8) were conducted to find the field and frame motion vectors. In the embodiment of FIG. 34, the calculations (F23) to (F26) and (F29) are conducted for a quarter range and the calculations (F27), (F28) and (F30) are conducted for a narrow range of 3 pixels by 3 lines. The amount of calculation can thus be reduced to nearly 1/16, where the search range is very wide.

FIG. 35 shows an example of motion compensated prediction circuit 17g used in another embodiment of the image signal encoding system of the invention. Reference numerals identical to those in FIG. 28, FIG. 33 and FIG. 34 denote identical or corresponding elements.

The output of the memory 62a is supplied not only to the first input of the first field motion vector detector 63a, but also to the first input of the first frame motion vector detector 73a. Similarly, the output of the memory 62b is supplies not only to the first input of the first field motion vector detector 63b, but also to the first input of the first frame motion vector detector 73b. The output of the memory 62c is supplied not only to the second inputs of the first field motion vector detectors 63a and 63b, but also to the second inputs of the first frame motion vector detectors 73a and 73b.

The first field motion vector detector 63a and the first frame motion vector detector 73a in combination form a first motion vector detector 77a. Similarly, the first field motion vector detector 63b and the first frame motion vector detector 73b in combination form a first motion vector detector 77b.

The selector 76a selectively outputs the outputs of the second field motion vector detector 64a and the second frame motion vector detector 74a. The second field motion vector detector 64a, the second frame motion vector detector 74a, and the selector 76a in combination form a second motion vector detector 78a. Similarly, selector 76b selectively outputs the outputs of the second field motion vector detector 64b and the second frame motion vector detector 74b. The second field motion vector detector 64b, the second frame motion vector detector 74b, and the selector 76b in combination form a second motion vector detector 78b.

The motion compensated prediction circuit 17g shown in FIG. 35 is, in a way, a simplified form of the motion compensation prediction circuit 17f of FIG. 34. That is, in the motion compensated prediction circuit 17f shown in FIG. 34, the motion compensated prediction picture for each field is obtained by field subsampling, and the motion compensated prediction picture for each field and the motion compensated prediction picture for each frame which has a smaller distortion is output. In the embodiment of FIG. 35, both of the motion compensated prediction picture for each field and the motion compensation prediction picture for each frame are obtained using a picture obtained by field subsampling, and one of the motion compensation prediction picture for each frame which has a small distortion is output.

As explained in connection with the embodiment of FIG. 28, the reference picture output from the frame memory 24a is subsampled at the field subsampling circuit 61a, while maintaining the interlace configuration, and stored in the memory 62a. The image signal received at the input terminal 21b is similarly subsampled, and stored in the memory 62c. The first motion vector detector 77a divides the picture Fs(i,j) stored in the memory 62c into blocks Cn,m(i,j) each consisting of 8 pixels in the horizontal direction by 8 lines in the vertical direction. Cn,m(i,j) is represented by:

$$Cn,m(i,j)=Fs(n*8+i, m*8+j)$$

It corresponds to a picture obtained by subsampling a conventional block Bn,m(i,j) consisting of 16 pixels in the horizontal direction by 16 lines in the vertical direction.

For each block Cn,m(i,j), the block within the picture Gs(i,j) stored in the memory 62a which minimizes the prediction distortion is selected by block matching for both each frame and for each field, and the relative position of the selected block is output as the motion vector. That is, when block matching is conducted for each frame, the prediction distortion Es0(Vh,Vv) for the vector (Vh,Vv) is calculated by:

$$Es0(Vh, Vv) = \sum_{i=0}^{7} \sum_{j=0}^{7} |Cn, m(i, j) - Gs(n*8 + i + Vh, m*8 + j + Vv)| \quad (F31)$$

If the motion vector search range of the frame of the original picture is ±Mh pixels in the horizontal direction and ±Mv lines in the vertical direction, the vector (Vh,Vv)=(Wh0, Wv0) within the range of −Mh/2≦Vh≦Mh/2, −Mv/2≦Vv≦Mv/2, which gives the minimum Es0(Vh,Vv) is determined. es0 is defined as this Es0(Vh,Vv), i.e., Es0(Vh, Vv)=es0.

When the block matching is conducted for each field, the block Cn,m(i,j) is divided into a first field and a second field. For the first field of the block Cn,m(i,j), the prediction distortion Es1(Vh,Vv,f) (f=0,1) for the vector (Vh,Vv) is calculated using the equations (F23) and (F24). If the motion vector search range of the frame of the original picture is ±Nh pixels in the horizontal direction and ±Nv lines in the vertical direction, the vector (Vh,Vv)=(Wh1,Wv1) within the range of −Nh/2≦Vh≦Nh/2, −Nv/2≦Vv≦Nv/2, 0≦f≦1 and f=f1 which in combination give the minimum Es1(Vh, Vv,f) is determined. es1 is defined as this Es1(Vh1,Vv1,f1), i.e., Es1(Vh1,Vv1,f1)=es1. f indicates whether the reference picture is of the first field or of the second field.

Similarly, for the second field of the block Cn,m(i,j), the prediction distortion Es2(Vh,Vv,f) (f=0,1) for the vector (Vh,Vv) is calculated using the equations (F25) and (F26). The vector (Vh,VV)=(Wh2,Wv2) and f=f2 which in combination give the minimum Es2(Vh,Vv,f) is determined. es2 is defined as Es2(Vh2,Vv2,f2), i.e., Es2(Vh2,Vv2,f2)=es2.

The second motion vector detector 78a performs motion compensated prediction on the image signal 101 received at the input terminal 21b, and using the reference picture G(i,j) stored in the frame memory 24a, through a motion vector search over a range centered on the position represented by the vector determined by the first motion vector detector 77a. That is, the vector output from the first motion vector detector 77a is doubled, since it is the vector for the subsampled picture. If the input image signal 101 represented by F(i,j) is divided into blocks Bn,m(i,j) each consisting of 16 pixels in the horizontal direction by 16 lines in the vertical direction.

$$B_{n,m}(i,j)=F(n*16+i,m*16+j)$$

A motion vector search is conducted for a range of ±1 pixels in the horizontal direction and ±1 lines in the vertical direction, centered on the doubled vector. That is, the prediction distortion E0(Vh,Vv) of the block Bn,m(i,j) when the vector representing the relative position is assumed to be (Vh,Vv) is calculated in accordance with the equation (F30), and the vector (Vh,Vv)=(Vh0,Vv0) within Wh0*2−1≦Vh≦Wh0*2+1, and Wv0*2−1≦Vv≦Wv0*2+1, and −Mh≦Vh≦Mh, −Mv≦Vv≦Mv and giving the minimum value of E0(Vh,Vv) is determined.

Where the second motion vector detector 78*a* detects the motion vector with a half-pixel accuracy, interpolation is made using the reference picture G(i,j) for each frame, and the motion vector search is conducted for a range of ±0.5 pixels in the horizontal direction and ±0.5 lines in the vertical direction.

Next, for the first field of the block Bn,m(i,j), the prediction distortion E1(Vh,Vv,f1) for the vector (Vh,Vv), centered on the position represented by the field motion vector (Wh1*2,Wv1*2) is calculated in accordance with the equation (F27), and the vector (Vh,Vv)=(Vh1,Vv1) within Wh1*2−1≦Vh≦Wh1*2+1, Wv1*2−1≦Vv≦Wv*2+1 and giving the minimum value of E1(Vh,Vv,f1) is determined. Similarly, for the second field of the block Bn,m(i,j), the prediction distortion E2(Vh,Vv,f2) for the vector (Vh,Vv), centered on the position represented by the field motion vector (Wh2*2,Wv2*2) is calculated in accordance with the equation (F28), and the vector (Vh,Vv)=(Vh2,Vv2) giving the minimum value of E2(Vh,Vv,f2) is determined.

Where the second motion vector detector 78*a* detects the motion vector with a half-pixel accuracy, interpolation is made using the reference picture G(i,j) for each field, and the motion vector search is conducted for a range of ±0.5 pixels in the horizontal direction and ±0.5 lines in the vertical direction.

Finally, the motion compensation using the frame motion vector or the motion compensation using the field motion compensation which gives a smaller prediction distortion is selected, and the selected vector and the prediction picture are output.

The operation of the first motion vector detector 77*b* is identical to that of the first motion vector detector 77*a*, except that the reference picture is the one stored in the memory 62*b*. The operation of the second motion vector detector 78*b* is identical to that of the second motion vector detector 78*a*, except that the reference picture is the one stored in the frame memory 24*b*.

The prediction mode selector 26 receives the two motion compensated prediction pictures from the second motion vector detectors 78*a* and 78*b*, and selectively outputs them. The rest of the operation is identical to that of the prior art example described with reference to FIG. 36 to FIG. 8.

In this embodiment, the amount of calculation required to obtain frame motion vectors and field motion vectors is reduced to nearly 1/6 of that in the prior art. Moreover, two fields of pictures obtained by field subsampling are combined to form a frame-subsampled picture. Accordingly, both of the field subsampling and the frame subsampling can be conducted using a simple hardware.

In the embodiments of FIG. 34 and FIG. 35, the second motion vector detector selects one of the frame subsampling motion compensation and the field subsampling motion compensation which gives a smaller prediction distortion.

As an alternative, the arrangement may be such that where a non-interlace signal is input, the frame subsampling motion compensation is always selected. For a non-interlace signal, the frame subsampling gives a higher resolution than the field subsampling, so that the motion vector can be detected with a higher accuracy, and the picture quality can be improved.

The motion compensated prediction circuit 17*d* shown in FIG. 28 may be configured to operate in a manner different from that described earlier with reference to FIG. 30. In particular, the operation of the second field motion vector detectors 64*a* and 64*b* may be different. In the embodiment described earlier, when the second field motion vector detector 64*a* determines the motion vector with a half-pixel accuracy, a motion vector search was conducted with a one-pixel accuracy over a range of 3 pixels by 3 lines centered on a point P representing by the vector output from the first field motion vector detector 63*a*, and then another motion vector search was conducted with a half-pixel accuracy over the range of 3 pixels by 3 lines centered on a point Q representing the detected motion vector determined by the first motion vector search.

Figure 36:
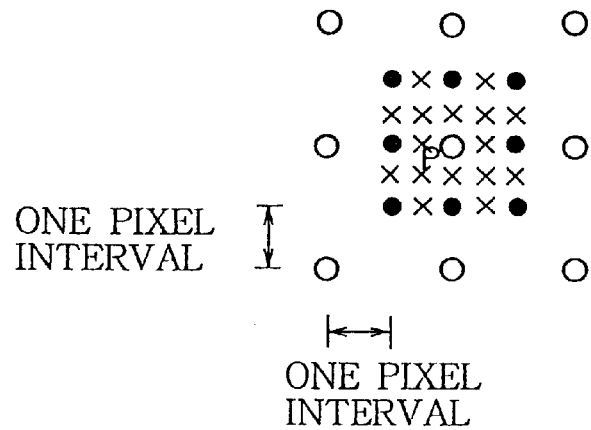
FIG. 36 is a schematic diagram showing the range of motion vector search in another embodiment of the invention.

An alternative method is shown in FIG. 36, illustrating the operation of the second field motion vector detector 64*a*. In this example, the second field motion vector detector 64*a* interpolates the reference picture, centered on the point P representing the vector output from the first field motion vector detector 63*a*, and a motion vector search is conducted with a half-pixel accuracy over a range of 5 pixels by 5 lines. The operation of the second field motion vector detector 64*b* is similar to that of the second field motion vector detector 64*a*.

In such a configuration, the motion vector search is conducted over the entire search range with a half-pixel accuracy, so that the accuracy of the motion vector determination is increased, and the picture quality is improved.

Figure 6:
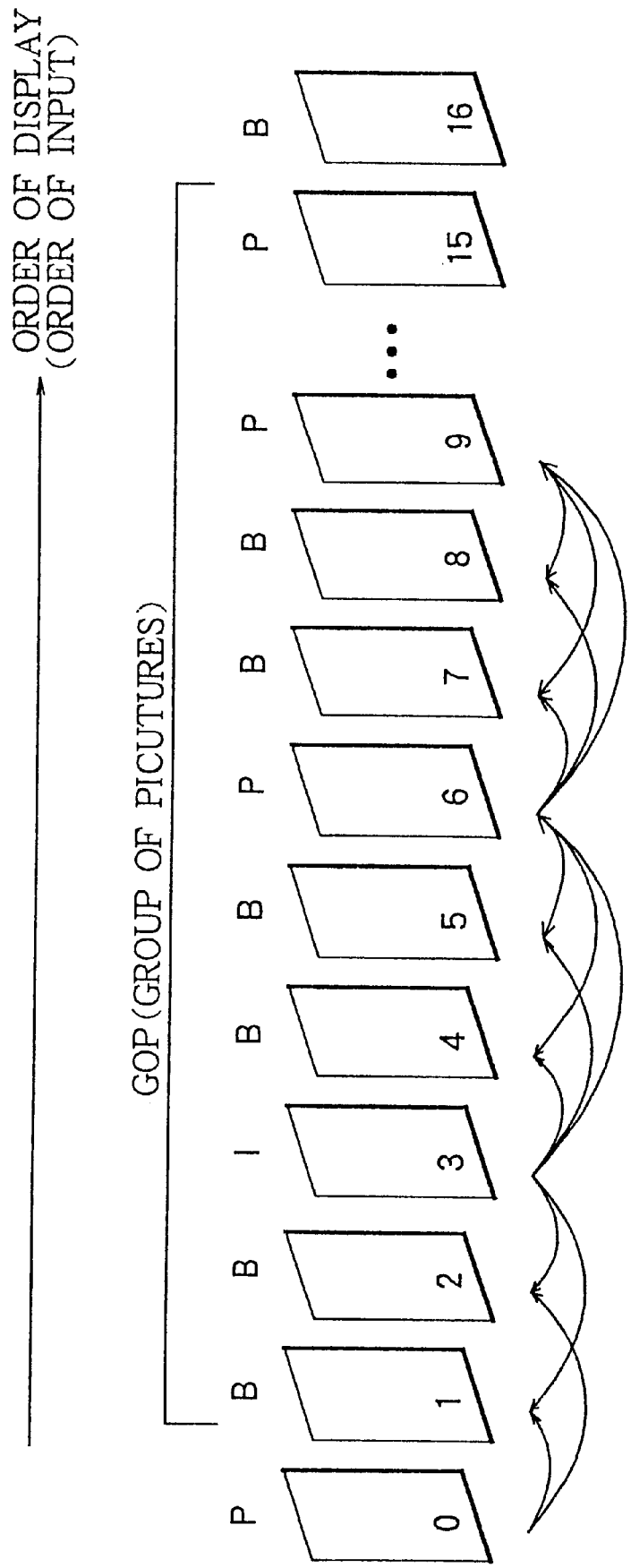
FIG. 6 is a schematic diagram showing the concept of motion compensated prediction in the prior art image signal encoding system.
Figure 7:
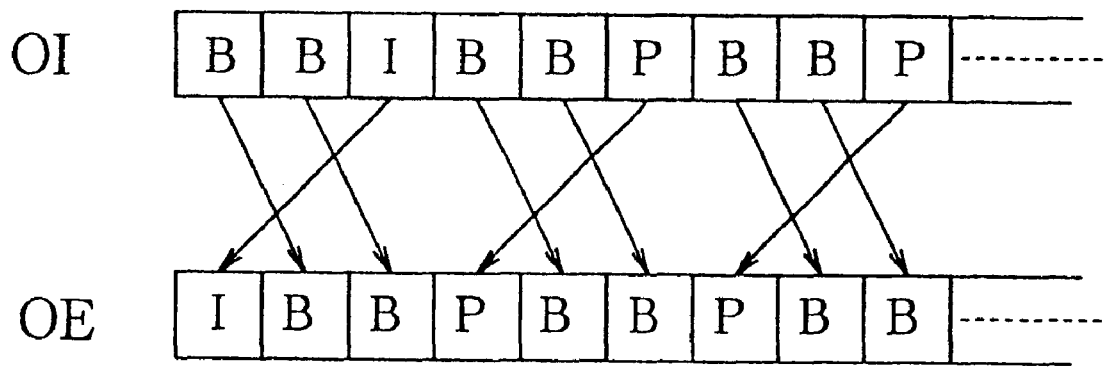
FIG. 7 is a schematic diagram showing the operation of the rearrangement of the pictures.
Figure 8:
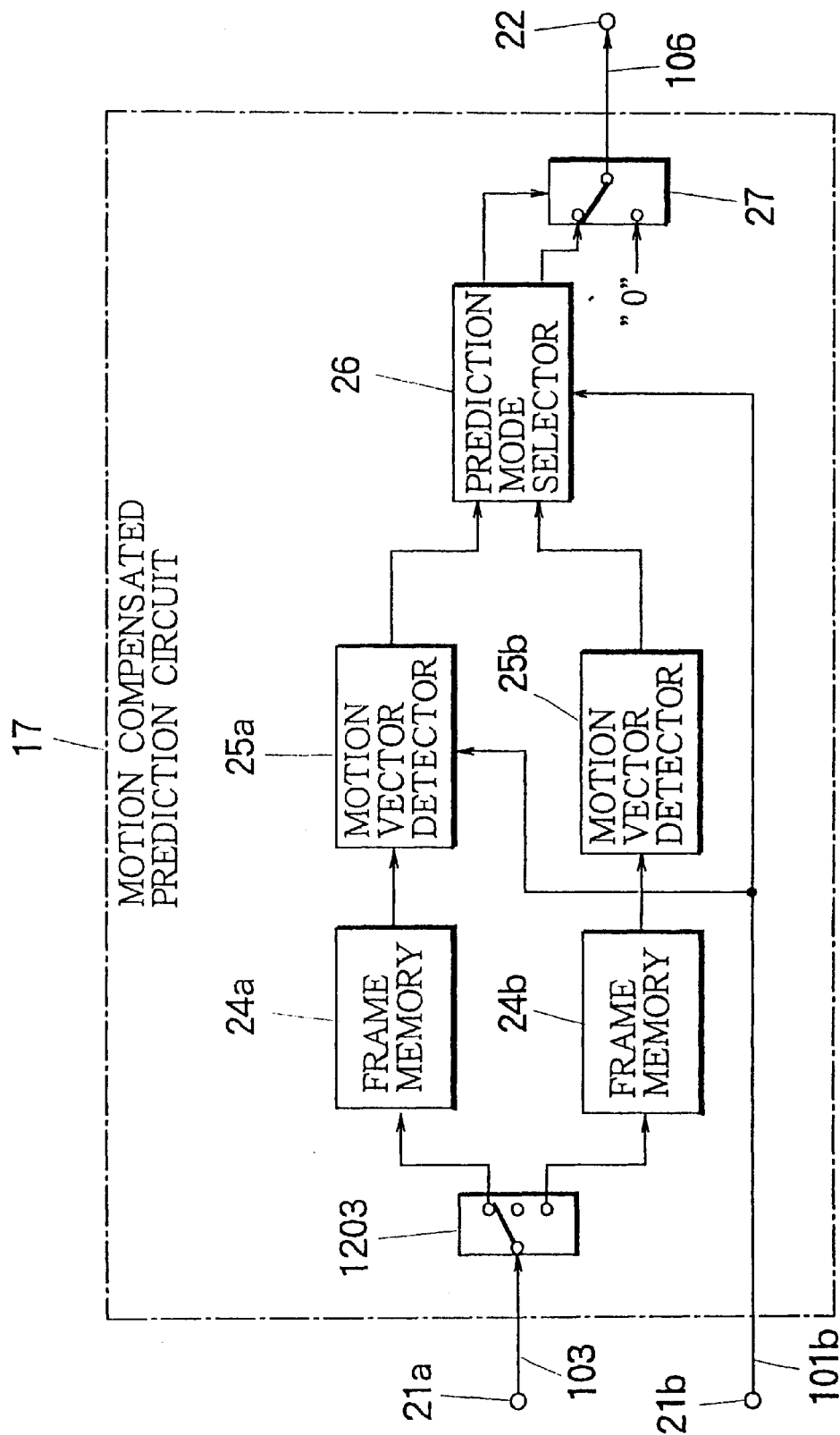
FIG. 8 is a block diagram showing an example of motion compensated prediction circuit.

The concept described above with reference to FIG. 36 may be applied to the embodiments of FIG. 6, FIG. 7 and FIG. 8, and yet similar results are attained.

As a still another modification, the motion vector prediction circuit may be configured to operate in a manner different from that described with reference to FIG. 30 or FIG. 36. In particular, the operation of the second field motion vector detectors 64*a* and 64*b* may be as follows. In the embodiment earlier described with reference to FIG. 35, the second field motion vector detector 64*a* conducted a motion vector search over a range of ±1 pixel by ±line centered on the point representing the vector output from the vector output from the first field motion vector detector 63*a*. This is because the factors of decimation at the field subsampling circuit 61*a* in the horizontal and vertical directions were both 1/2. If the factors of decimation at the field subsampling circuit 61*a* in the horizontal and vertical directions are 1/K and 1/L (K, L being natural numbers), to cover the entire search range, the motion vector detector 64*a* needs to conduct a search over ±(K-1) pixels in the horizontal direction, and ±(L-1) lines in the vertical direction. However, since the first field motion vector detector 63*a* determines the motion vector on a rough basis using the picture obtained by subsampling, so that the accuracy is low.

As an improvement, the second field motion vector detector 64*a* is configured to conduct a motion vector search over a range wider than the range of ±(K-1) pixels in the horizontal direction, and ±(L-1) lines in the vertical direction.

Figure 37:
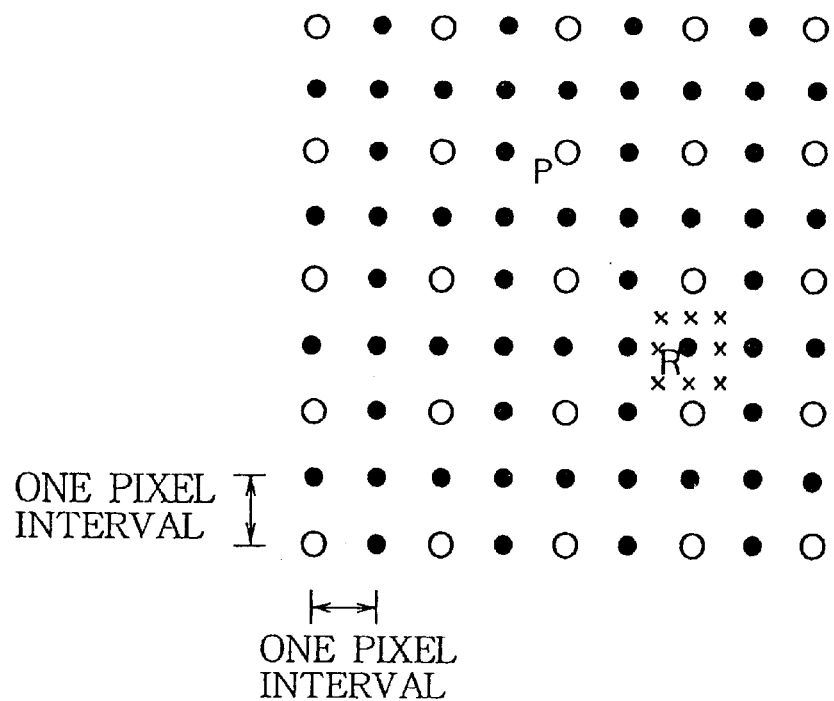
FIG. 37 is a schematic diagram showing the range of motion vector search in another embodiment of the invention.

For instance, if the factors of decimation at the field subsampling circuit 61*a* in the horizontal and vertical directions are both 1/2, the second field motion vector detector 64a conducts a motion vector search over a range of ±4 pixels in the horizontal direction, and ±4 lines in the vertical direction. That is, the second field motion vector detector 64a conducts a motion vector search with a one-pixel accuracy over a range of 9 pixels by 9 lines centered on a point P, as shown in FIG. 37, representing the vector output from the first field motion vector detector 63a, and then conducts another motion vector search with a half-pixel accuracy over a range of 3 pixels by 3 lines centered on a point R representing the vector determined through the first motion vector search.

The operation of the second field motion vector detector 64b is similar to that of the second field motion vector detector 64a.

With the above arrangement, when the motion search is conducted over a range equal to or wider than a range of ±K pixels by ±L lines, where the factors of decimation at the subsampling circuit in the horizontal and vertical directions are 1/K and 1/L, respectively, so that the roughness of the motion vector search by the first motion vector detector can be compensation for, and the motion vector can be detected accurately, and the picture quality can be improved.

The concept described above with reference to FIG. 37 may be applied to the embodiments of FIG. 6, FIG. 7 and FIG. 8, and yet similar results are attained.

What is claimed is:

1. An image signal encoding method for performing motion compensation inter-picture prediction encoding on an image signal, comprising the steps of:
    subsampling the image signal for each field; and
    determining a motion vector using the field-subsampled image signal,
    wherein the subsampling is conducted such that the picture of said field subsamples maintains a substantially equispaced interlace configuration.

2. The image signal encoding method according to claim 1, wherein a first field and a second field of said subsampled picture maintains a substantially equispaced interlaced configuration between and adjacent to said first field and said second field of said subsampled picture.

3. An image signal encoding method for performing motion compensation inter-picture prediction encoding on an image signal, comprising the steps of:
    subsampling the image signal for each field; and
    determining a motion vector using the field-subsampled image signal,
    wherein the subsampling is conducted such that the picture of the field subsamples has a non-interlace configuration.

* * * * *